US008675589B2

(12) United States Patent
Ko et al.

(10) Patent No.: US 8,675,589 B2
(45) Date of Patent: Mar. 18, 2014

(54) METHOD AND DEVICE FOR TRANSMITTING A DOWNLINK REFERENCE SIGNAL IN A WIRELESS COMMUNICATION SYSTEM SUPPORTING MULTIPLE ANTENNAS

(75) Inventors: Hyun Soo Ko, Anyang-si (KR); Seung Hee Han, Anyang-si (KR); Jae Hoon Chung, Anyang-si (KR); Bin Chul Ihm, Anyang-si (KR); Moon Il Lee, Anyang-si (KR)

(73) Assignee: LG Electronics Inc., Seoul (KR)

(*) Notice: Subject to any disclaimer, the term of this patent is extended or adjusted under 35 U.S.C. 154(b) by 120 days.

(21) Appl. No.: 13/386,022

(22) PCT Filed: Aug. 13, 2010

(86) PCT No.: PCT/KR2010/005351
§ 371 (c)(1),
(2), (4) Date: Jan. 19, 2012

(87) PCT Pub. No.: WO2011/019242
PCT Pub. Date: Feb. 17, 2011

(65) Prior Publication Data
US 2012/0120905 A1    May 17, 2012

Related U.S. Application Data

(60) Provisional application No. 61/346,044, filed on May 19, 2010, provisional application No. 61/333,719, filed on May 11, 2010, provisional application No. 61/299,354, filed on Jan. 29, 2010, provisional application No. 61/233,843, filed on Aug. 14, 2010.

(30) Foreign Application Priority Data

Aug. 13, 2010    (KR) .................. 10-2010-0078057

(51) Int. Cl.
*H04W 4/00*    (2009.01)
(52) U.S. Cl.
USPC ........................................ 370/329
(58) Field of Classification Search
USPC ................ 370/252, 328–330, 336, 260–262, 370/270–271, 312, 389–390, 395.2, 395.5, 370/395.64, 465–467
See application file for complete search history.

(56) References Cited

U.S. PATENT DOCUMENTS

2007/0248113 A1    10/2007  Ko et al.
2010/0124297 A1    5/2010   Papasakellariou et al.
(Continued)

FOREIGN PATENT DOCUMENTS

CN    102362443    2/2012
EP    2413516      2/2012
(Continued)

OTHER PUBLICATIONS

LG Electronics, "Intra-Cell CSI-RS Pattern Design", R1-103967, 3GPP TSG RAN WG1 Meeting #61bis, Jun. 2010, XP050449448, 7 pages.
(Continued)

*Primary Examiner* — Andrew Chriss
*Assistant Examiner* — Peter Mak
(74) *Attorney, Agent, or Firm* — Lee, Hong, Degerman, Kang & Waimey

(57) ABSTRACT

A method for a base station to transmit a channel-state-information reference signal for up to 8 antenna ports includes mapping, in accordance with a predetermined pattern, the channel-state-information reference signal for up to 8 antenna ports onto a data region of a downlink subframe having an extended cyclic prefix (CP) structure, and transmitting the downlink subframe onto which the channel-state-information reference signal for up to 8 antenna ports has been mapped; and, in the predetermined pattern, the channel-state-information reference signal for up to 8 antenna ports in mapped onto 2 OFDM symbols on the data region of the downlink subframe, with a definition for mapping onto at least one of 4 subcarrier wave positions in each of the 2 OFDM symbols, and the 4 subcarrier wave positions defined in the predetermined pattern can be disposed at 3 subcarrier wave intervals.

11 Claims, 50 Drawing Sheets

(56) References Cited

U.S. PATENT DOCUMENTS

| | | | |
|---|---|---|---|
| 2010/0254471 A1* | 10/2010 | Ko et al. | 375/260 |
| 2012/0039287 A1* | 2/2012 | Ko et al. | 370/329 |
| 2012/0082119 A1* | 4/2012 | Chung et al. | 370/329 |

FOREIGN PATENT DOCUMENTS

| | | |
|---|---|---|
| KR | 10-2008-0033060 | 4/2008 |
| KR | 10-2010-0010890 | 2/2010 |

OTHER PUBLICATIONS

Nokia et al., "Intra-cell CSI-RS design", R1-103799, 3GPP TSG RAN WG1 Meeting #61bis, Jun. 2010, XP050449224, 10 pages.

Zte, "CSI-RS Pattern Design in Extended-CP Subframe", R1-103589, 3GPP TSG RAN WG1 Meeting #61bis, Jun. 2010, XP050449411, 6 pages.

Alcatel-Lucent, "The reduced-latency DL RS for FDD E-UTRA compared with the modified working assumption", R1-071422, 3GPP TSG RAN WG1 Meeting #48bis, Mar. 2007, XP050105362, 12 pages.

European Patent Office Application U.S. Appl. No. 10808391.6, Search Report dated Feb. 27, 2013, 13 pages.

Ko, et al., U.S. Appl. No. 61/163,874, filed Mar. 27, 2009, 76 pages.

\* cited by examiner

FIG. 7
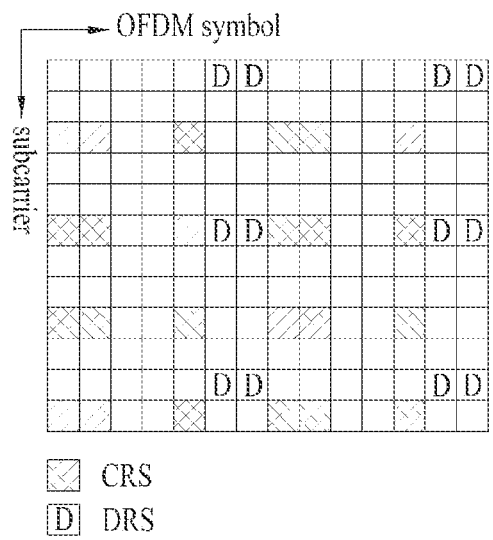
(a)
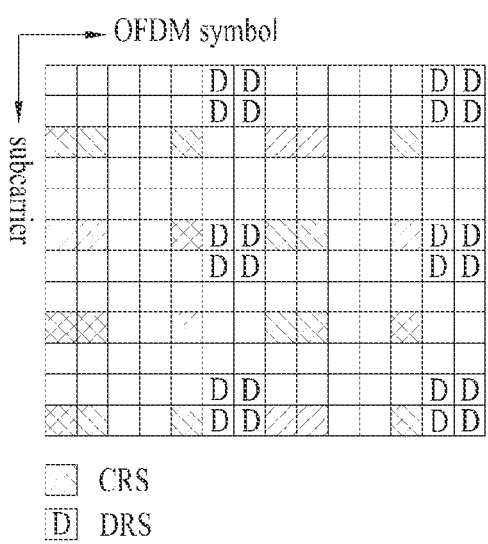
(b)

FIG. 8
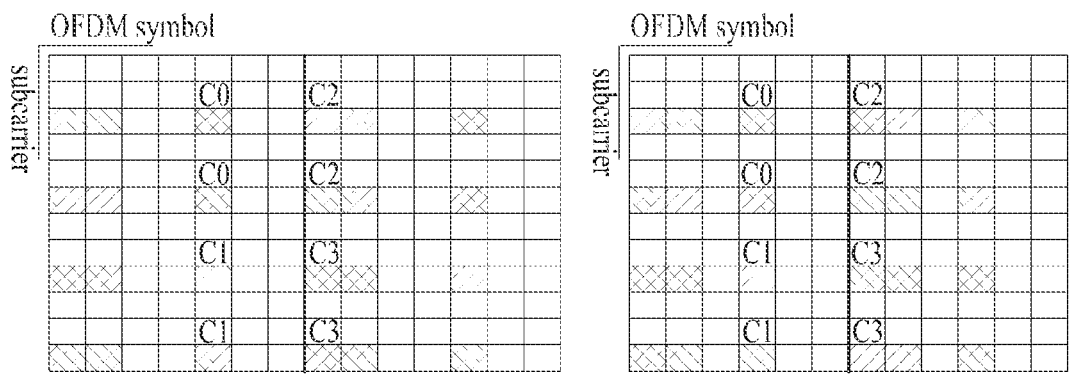
(a)
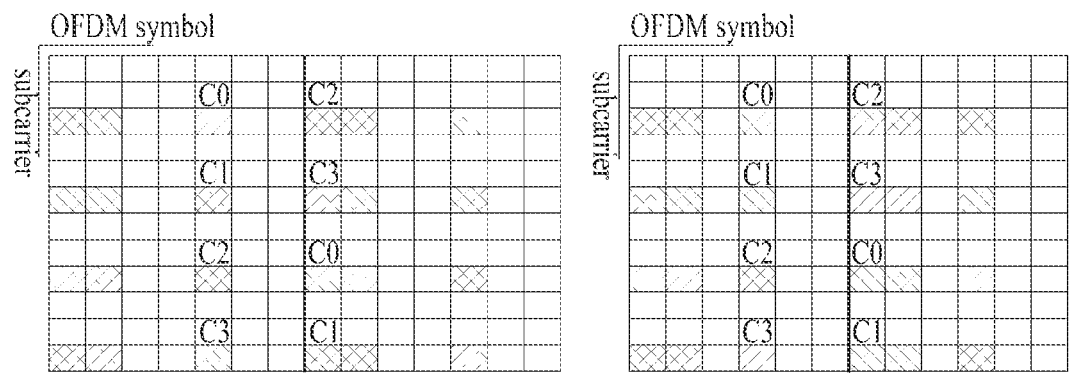
(b)
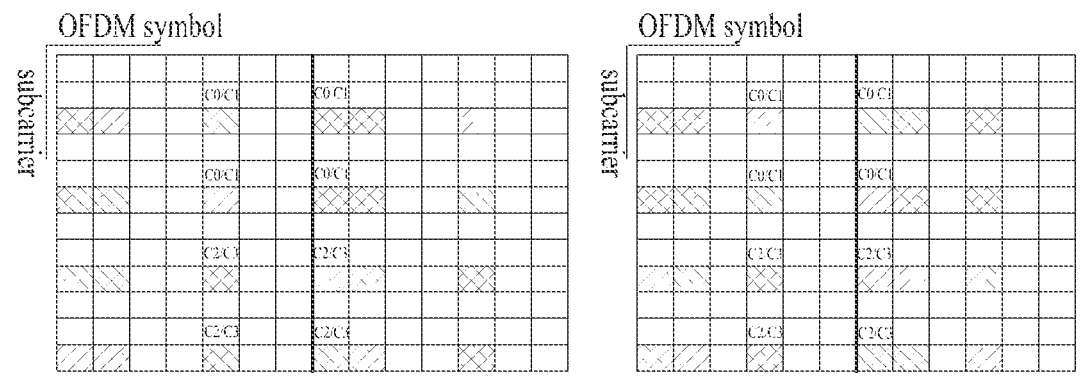
(c)

FIG. 9
☒ CRS
C CSI-RS
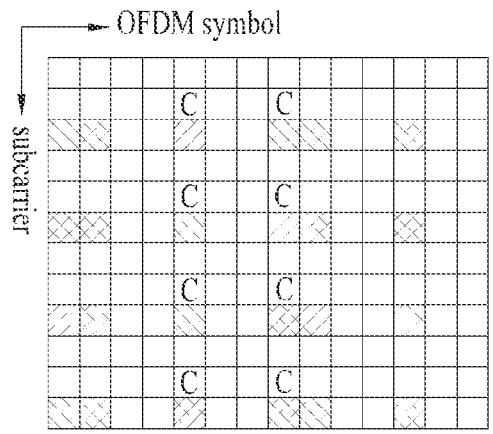
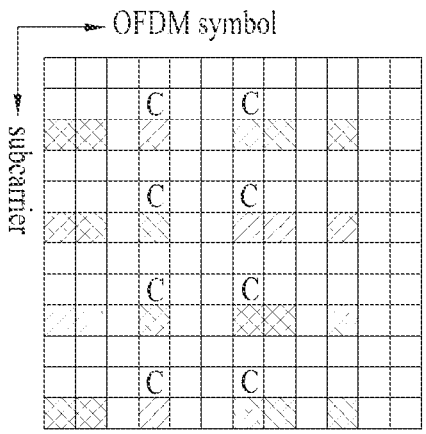
(a)
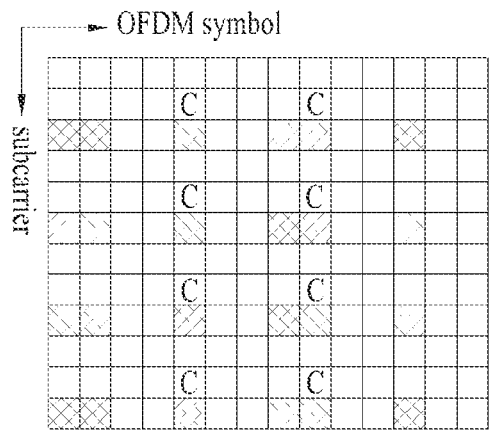
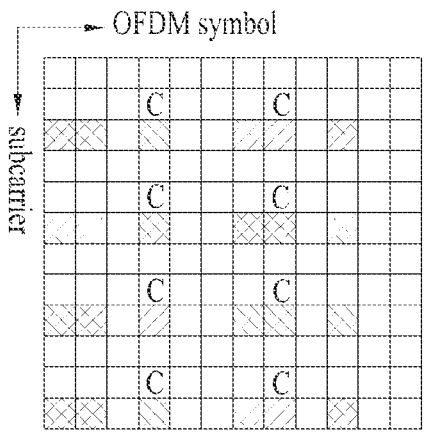
(b)
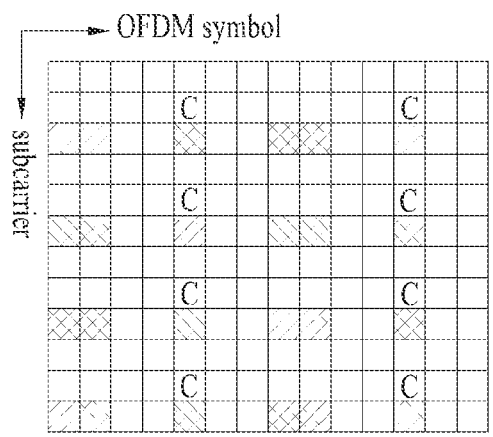
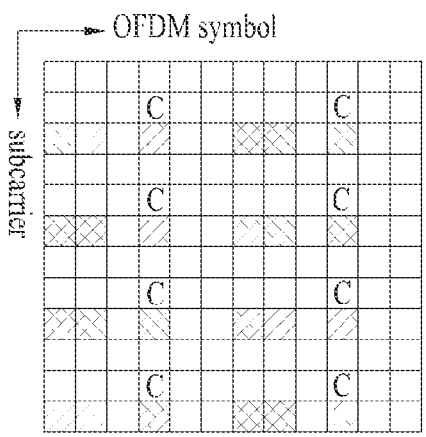
(c)

FIG. 10
☐ CRS
C CSI-RS
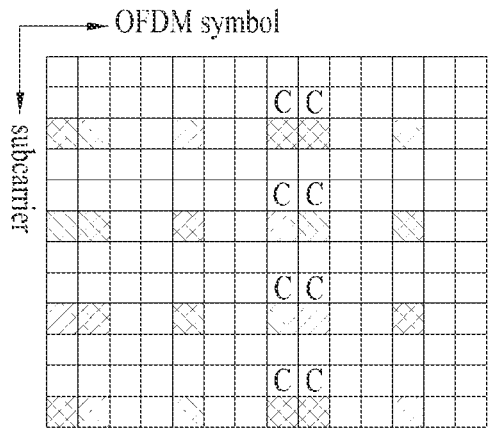
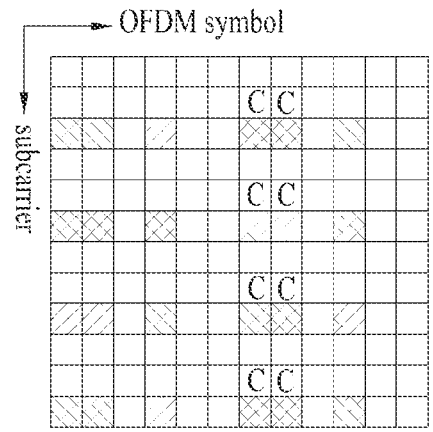
(a)
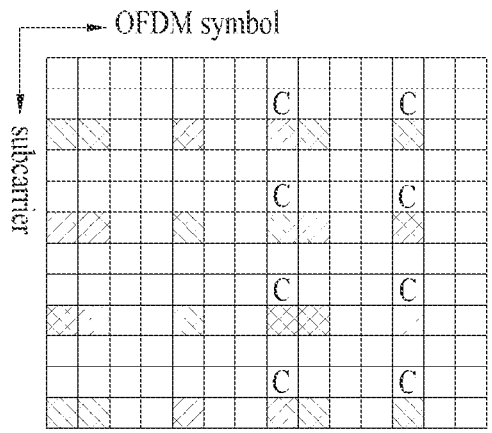
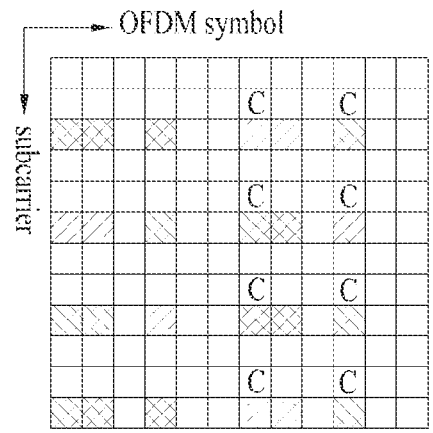
(b)
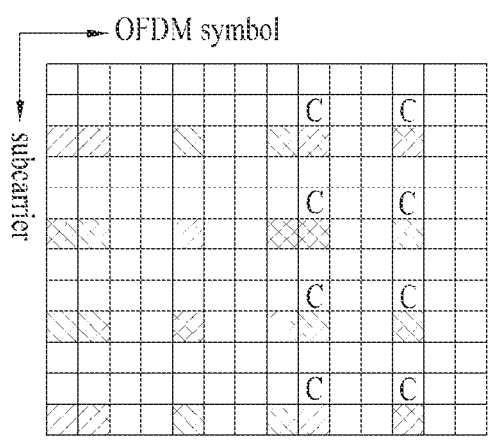
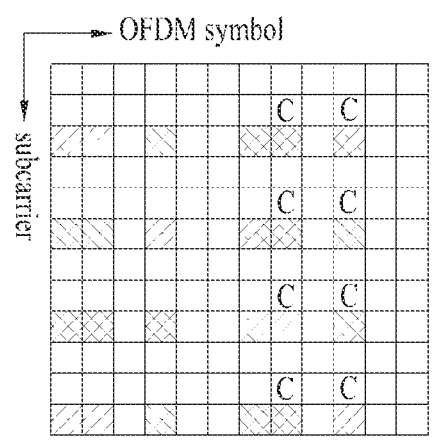
(c)

FIG. 11
☐ CRS
[C] CSI-RS
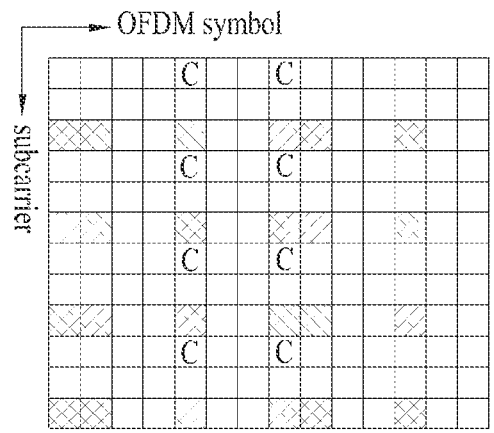
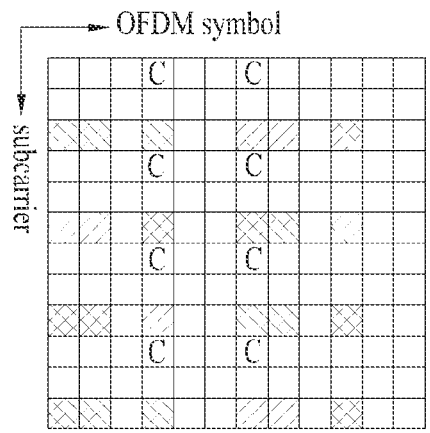
(a)
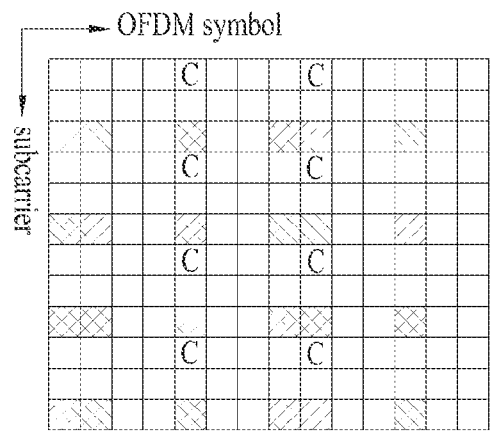
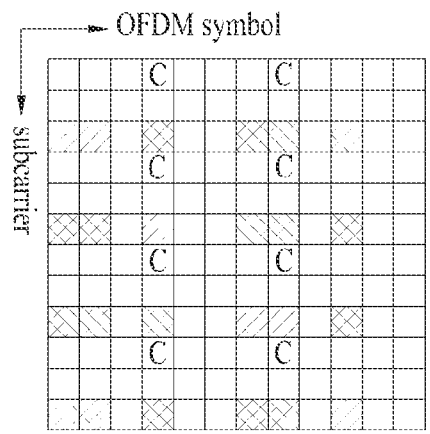
(b)
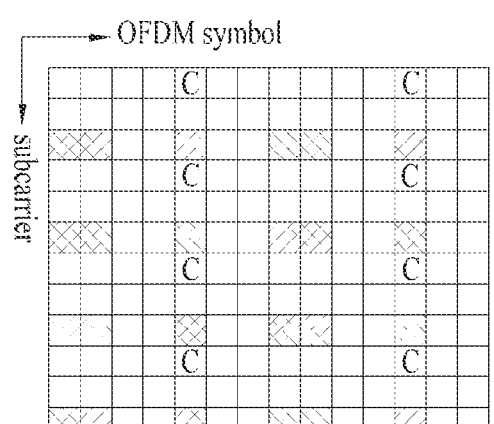
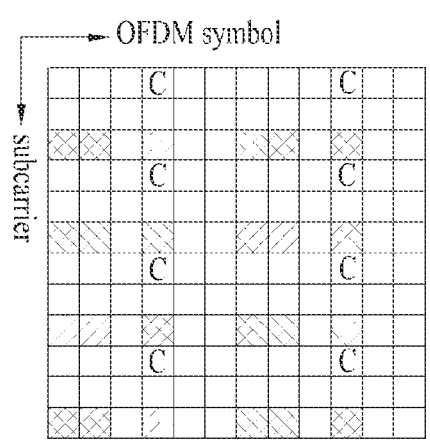
(c)

FIG. 12
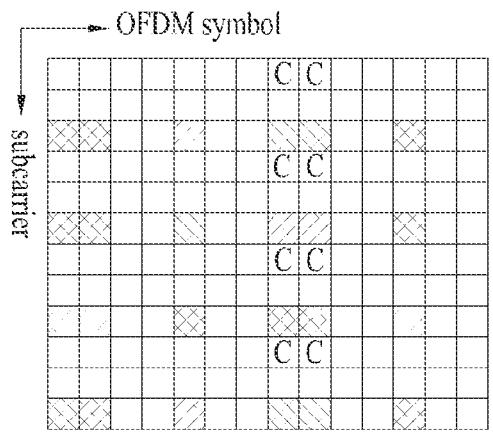
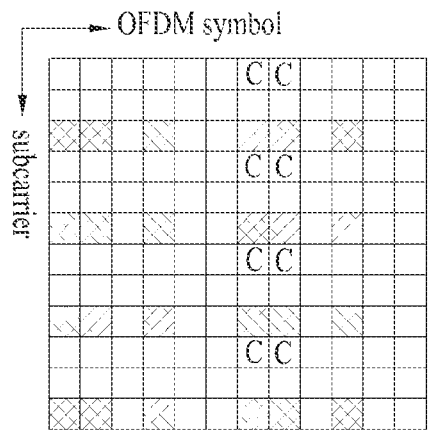
(a)
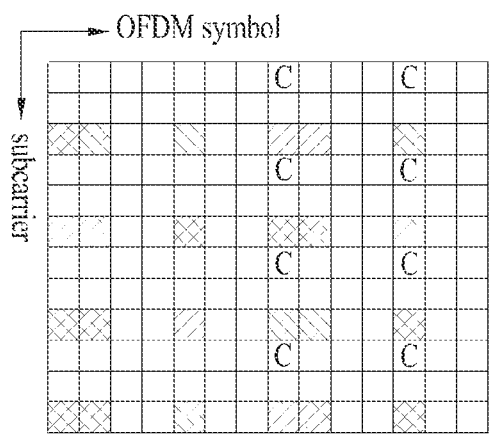
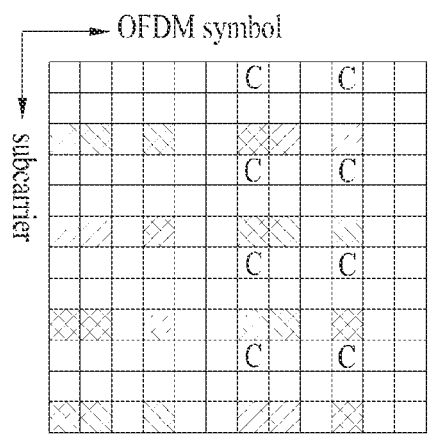
(b)
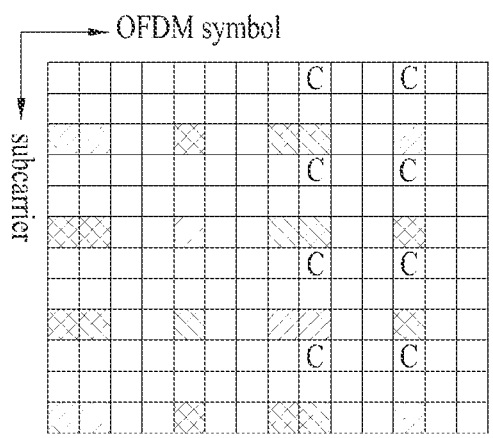
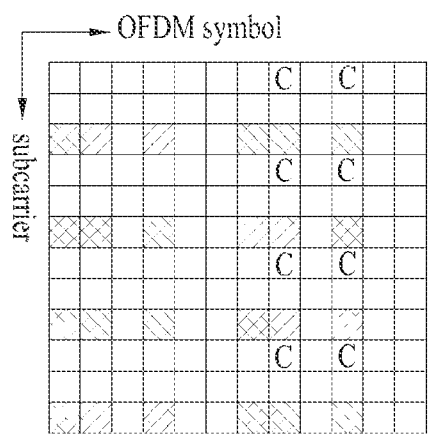
(c)

FIG. 14
⊠ CRS
C CSI-RS
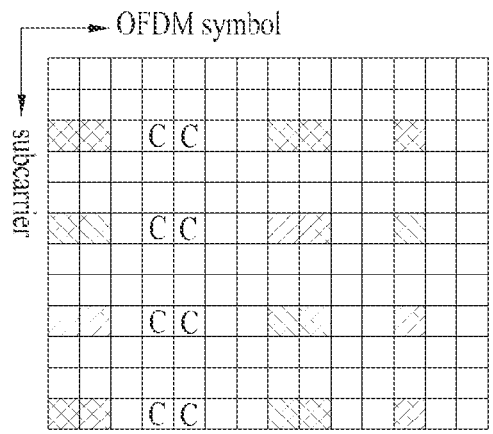
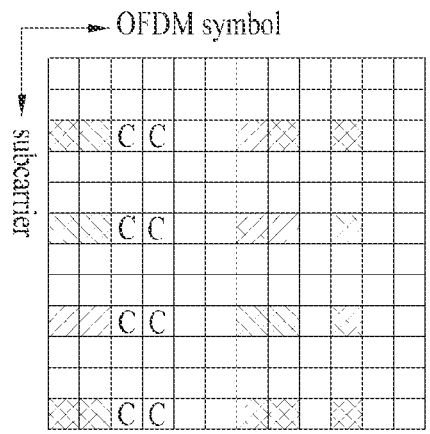
(a)
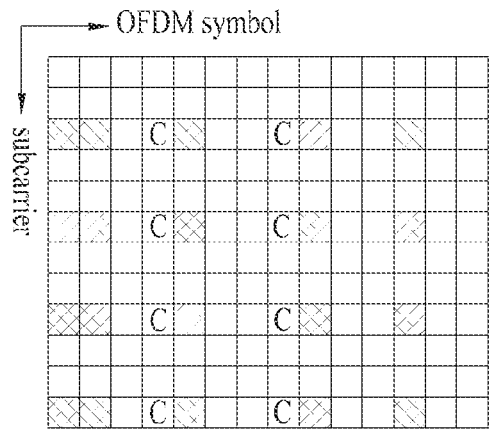
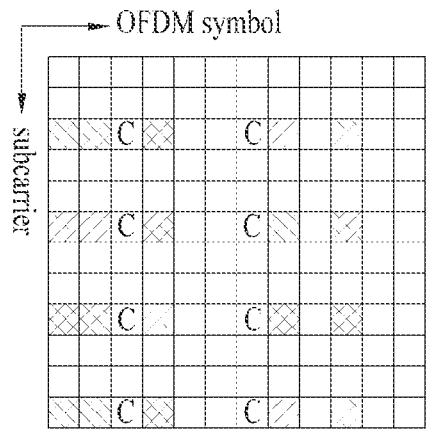
(b)
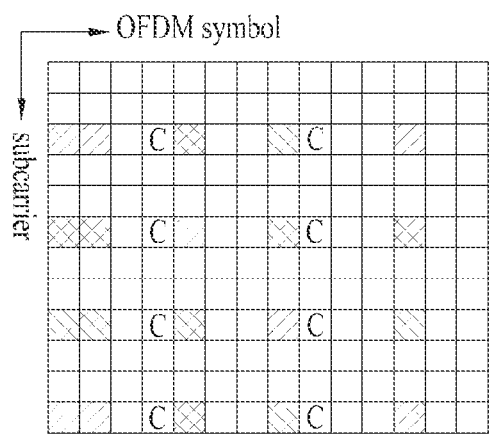
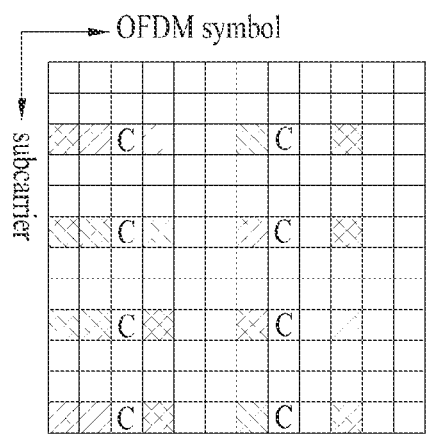
(c)

FIG. 15
☒ CRS
[C] CSI-RS
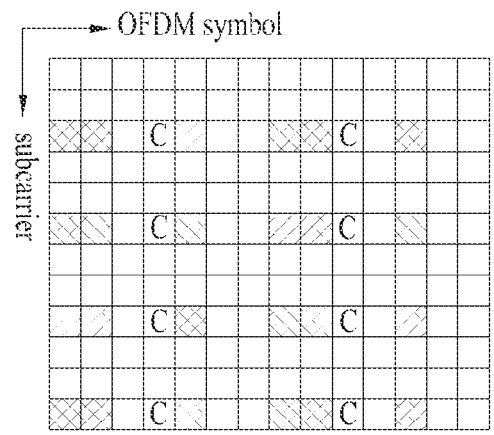
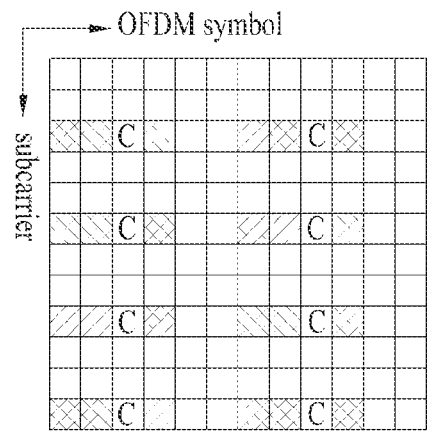
(a)
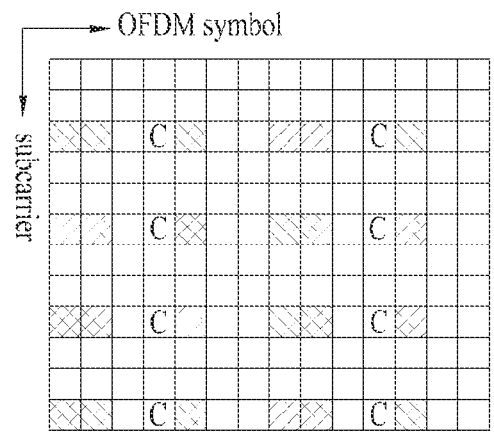
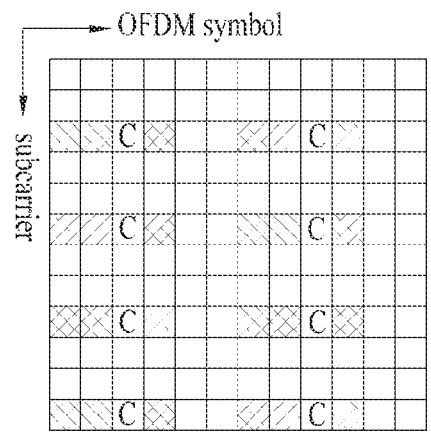
(b)
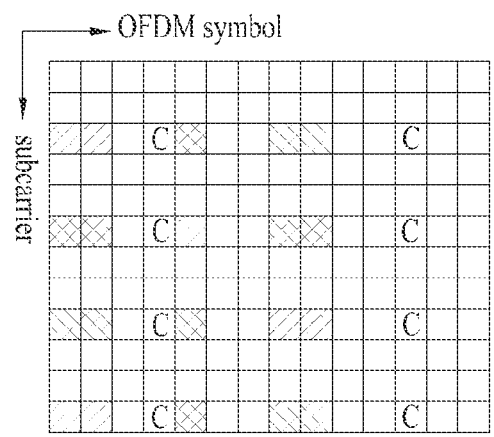
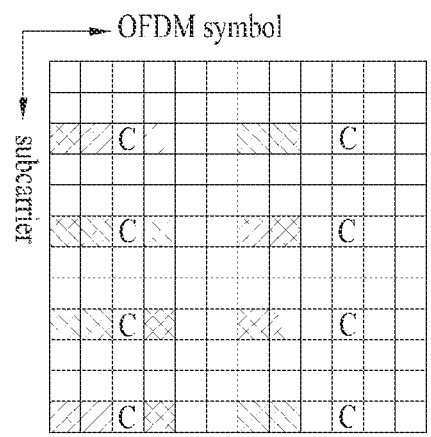
(c)

FIG. 16
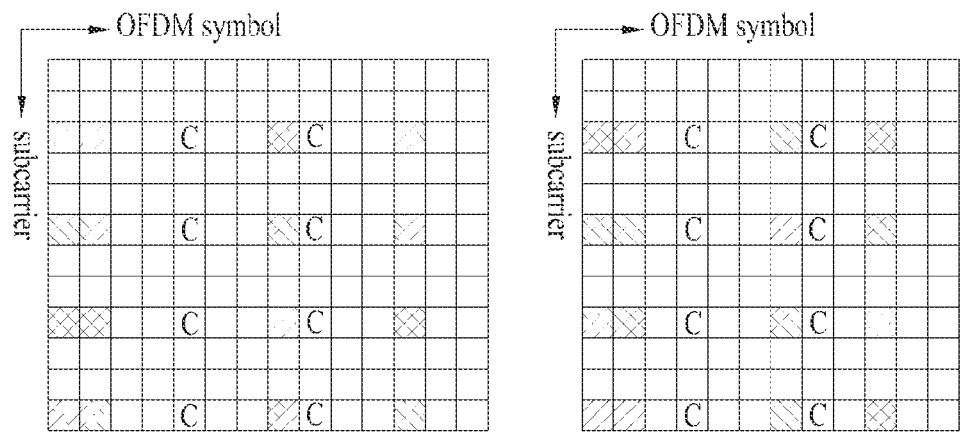
(a)
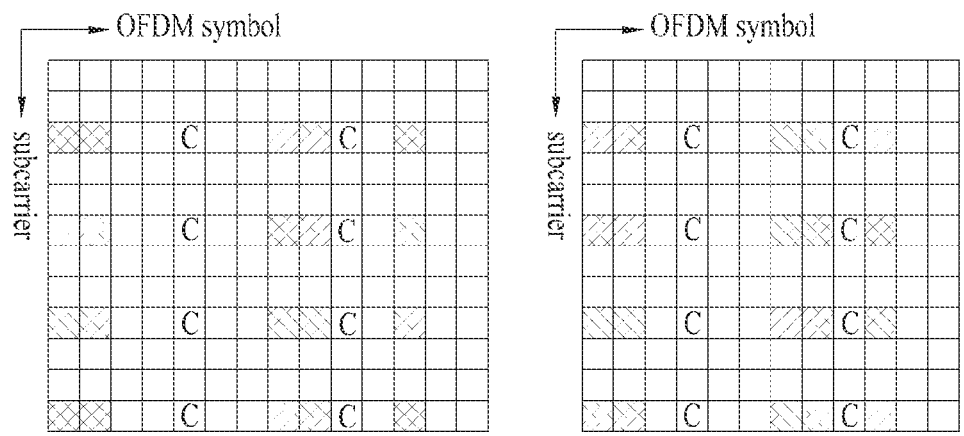
(b)
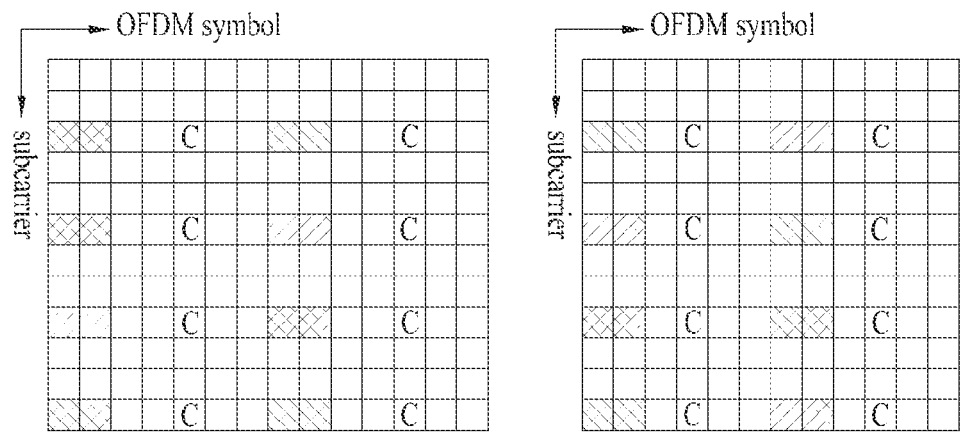
(c)

FIG. 17
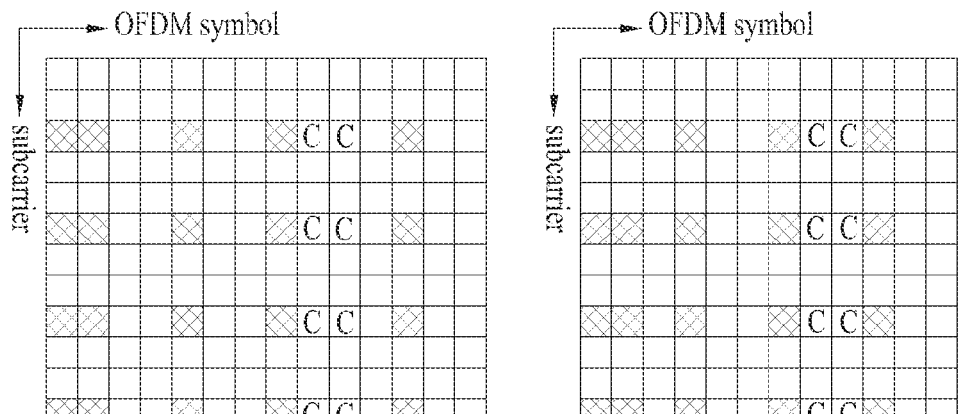
(a)
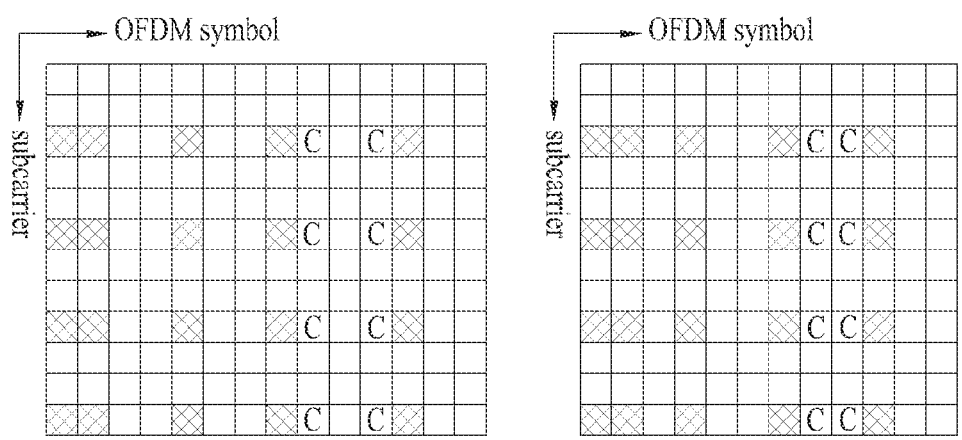
(b)
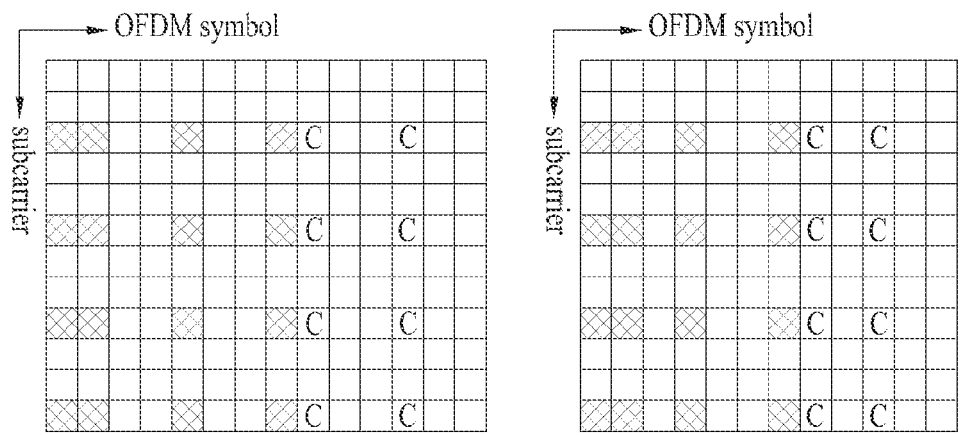
(c)

FIG. 18
☒ CRS
C CSI-RS
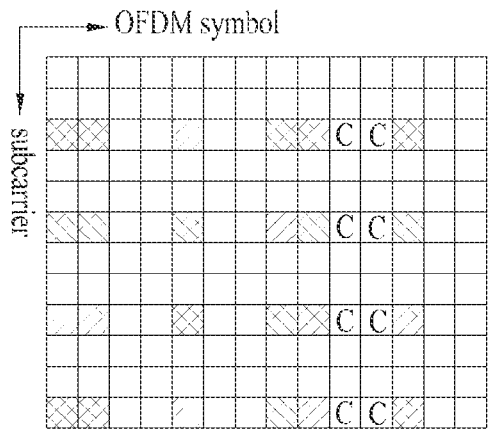
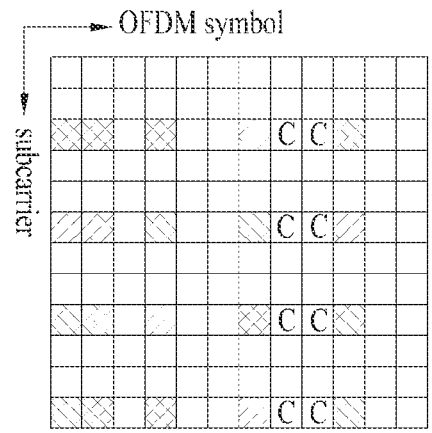
(a)
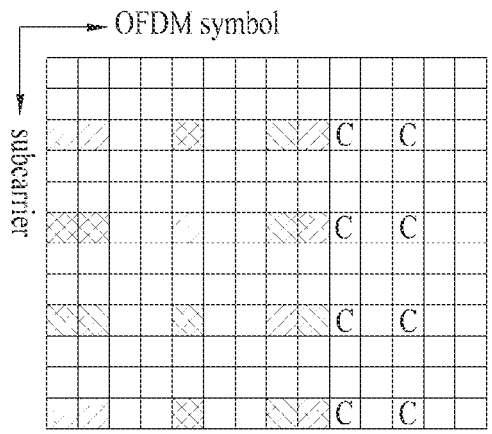
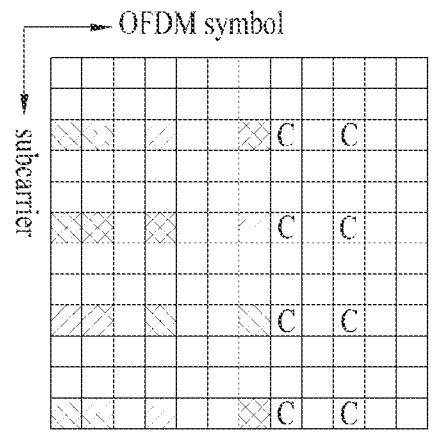
(b)
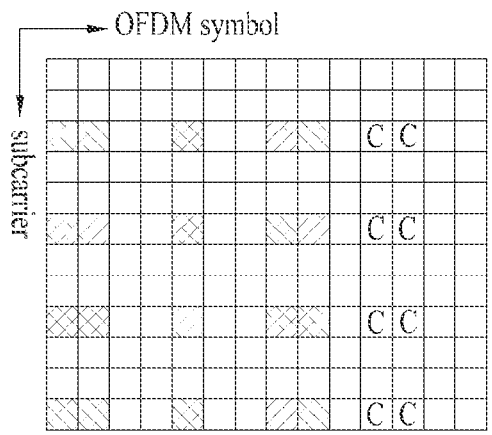
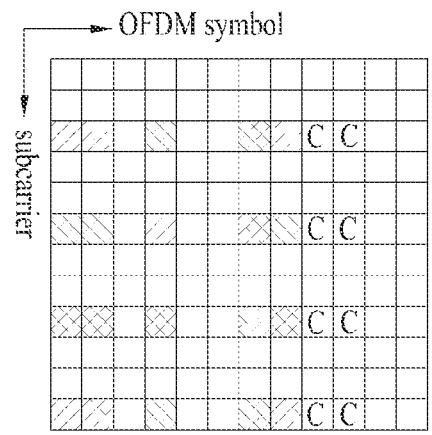
(c)

FIG. 19
☒ CRS
C CSI-RS
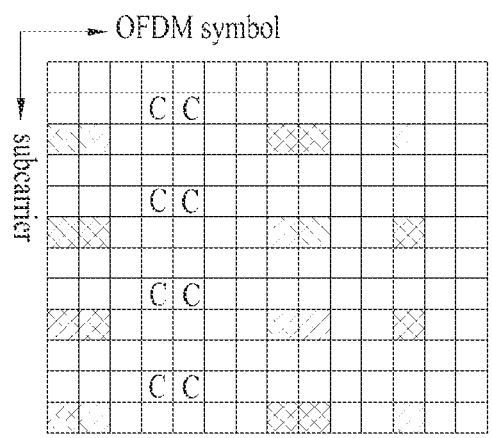
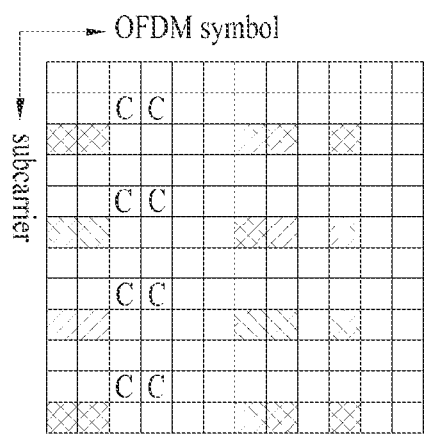
(a)
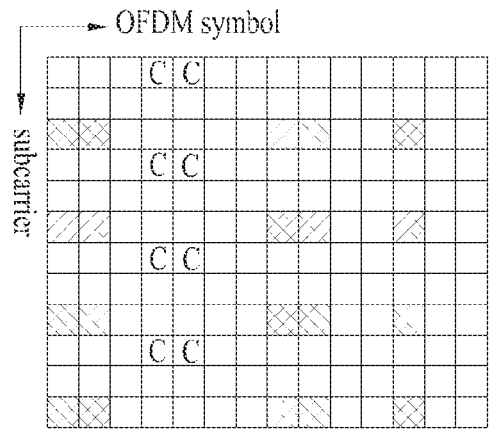
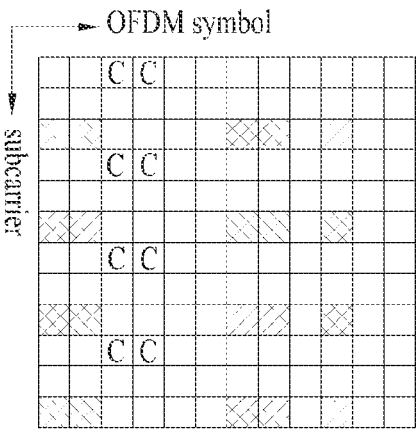
(b)

FIG. 20
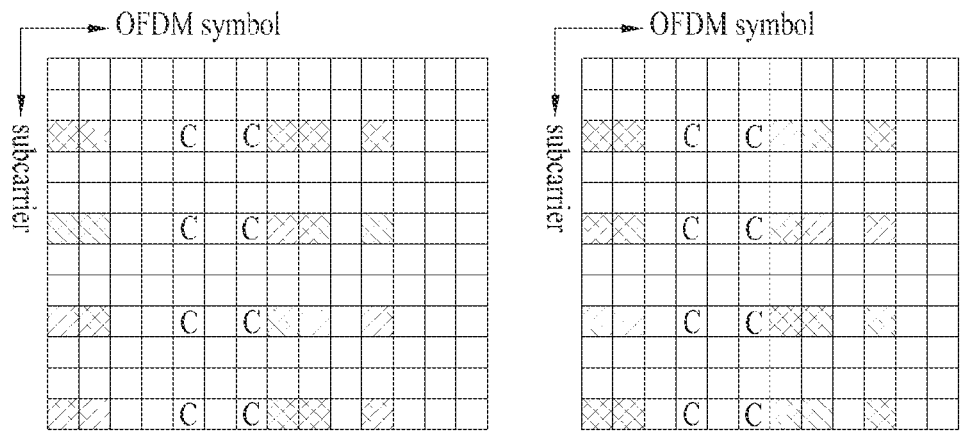
(a)
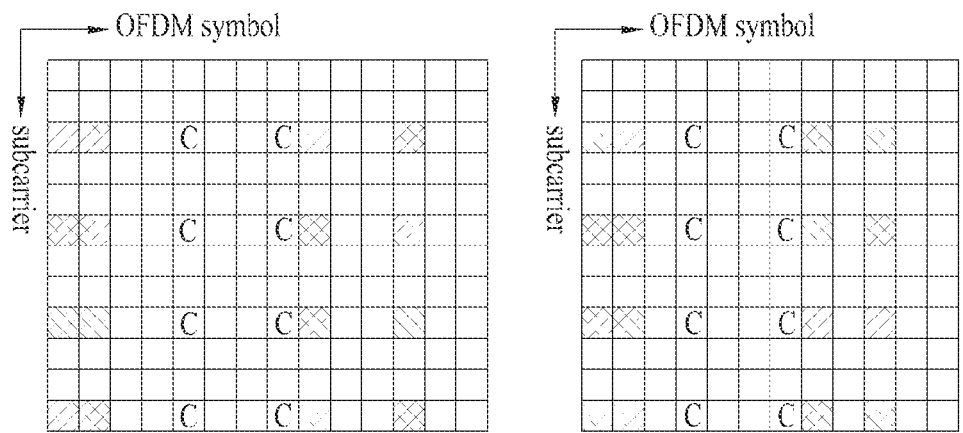
(b)
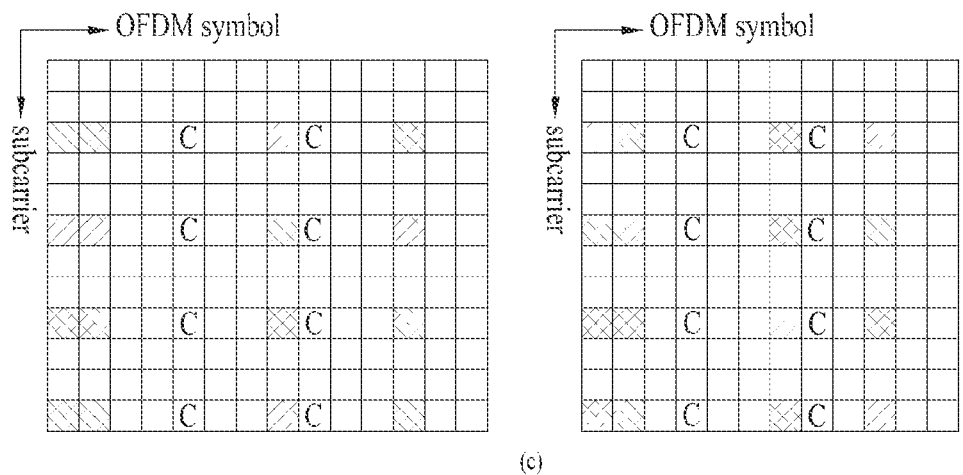
(c)

FIG. 21
☒ CRS
C CSI-RS
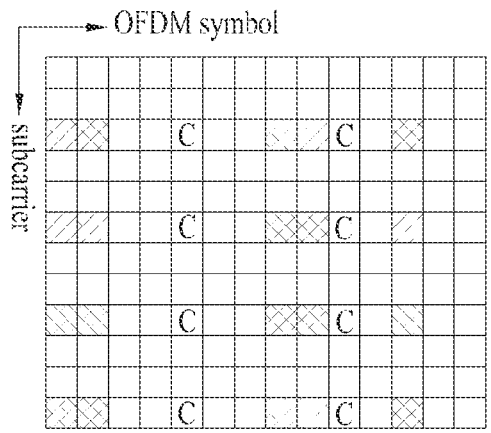
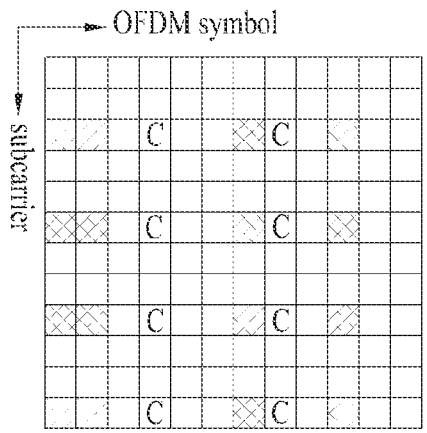
(a)
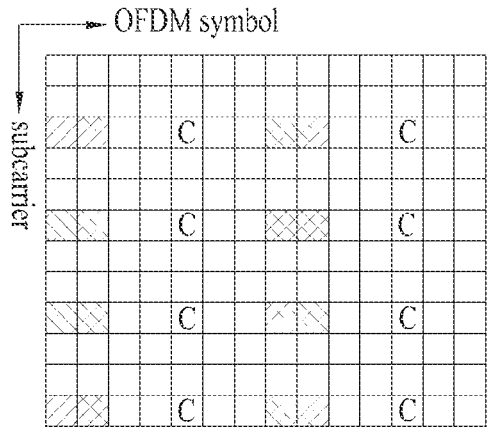
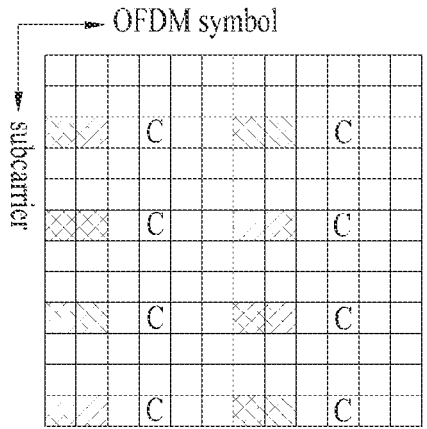
(b)
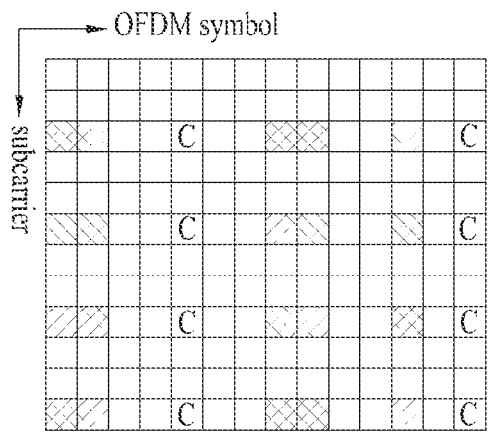
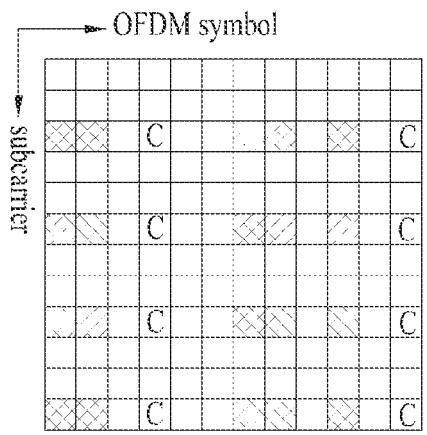
(c)

FIG. 22
⊠ CRS
C CSI-RS
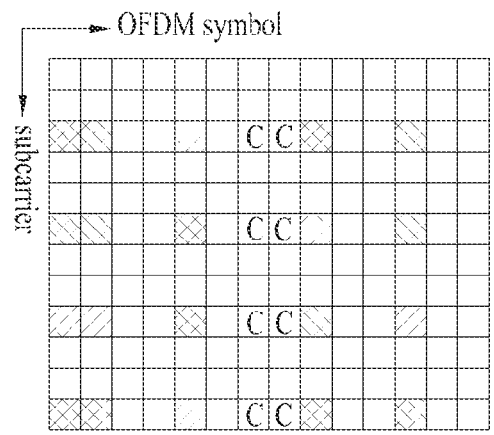
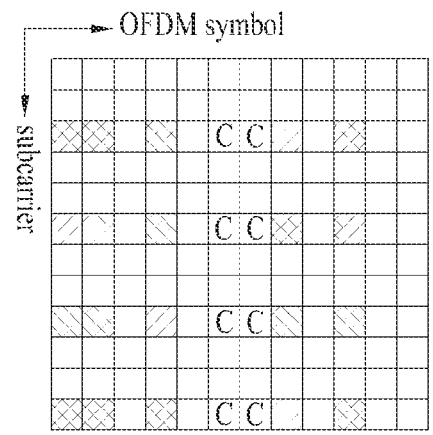
(a)
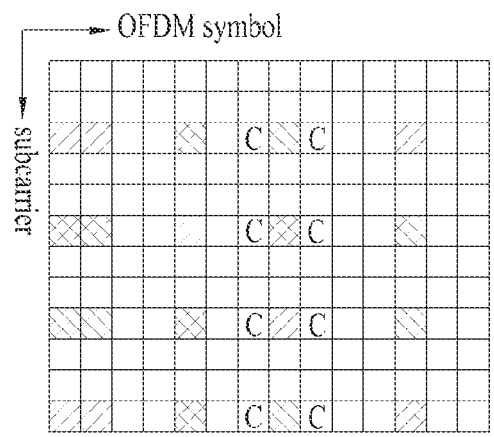
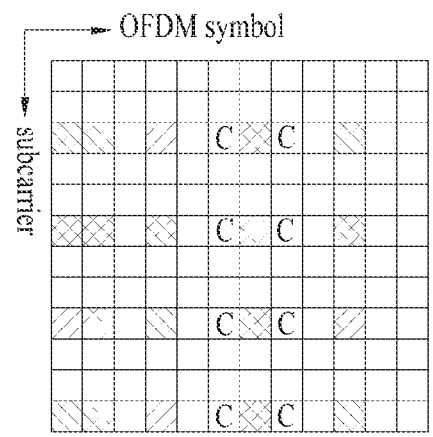
(b)
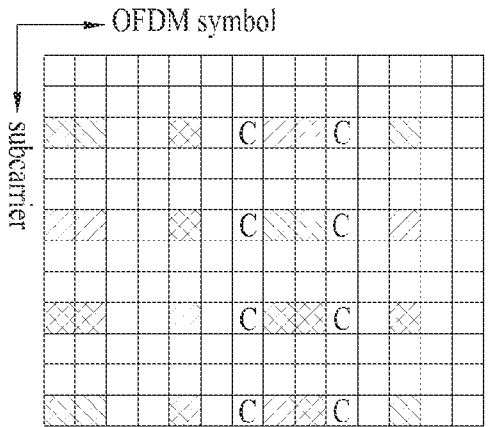
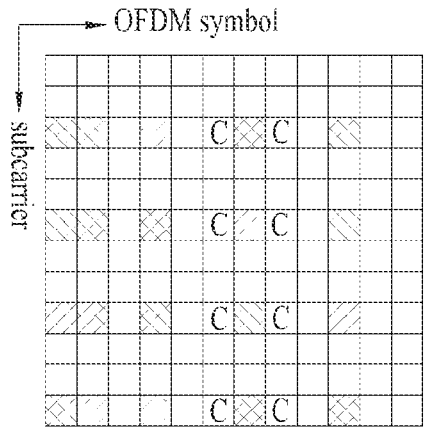
(c)

FIG. 23
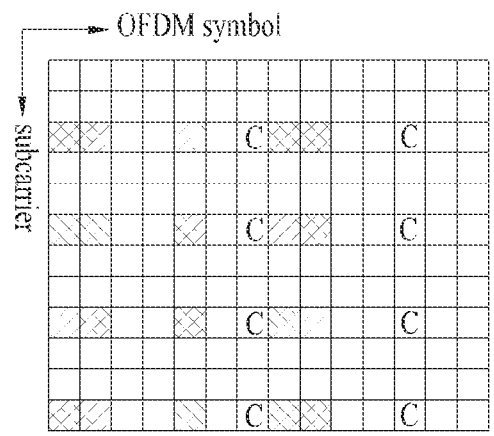
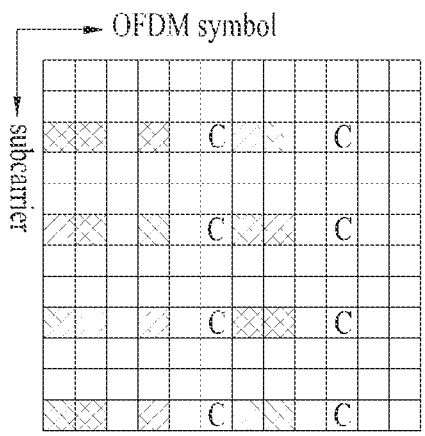
(a)
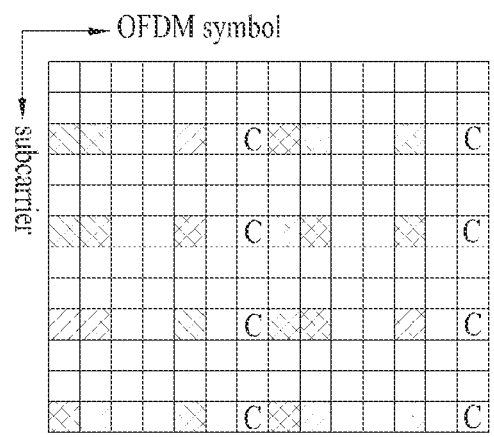
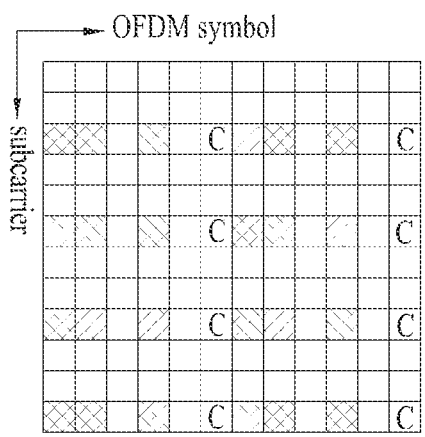
(b)
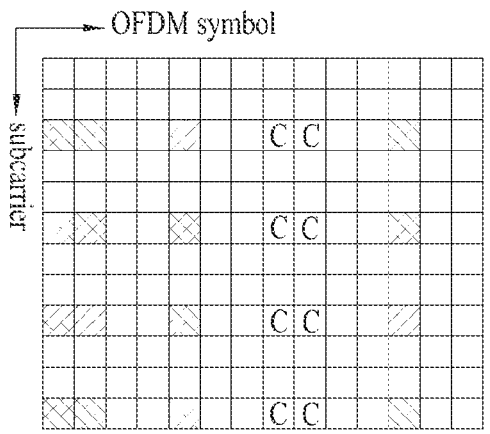
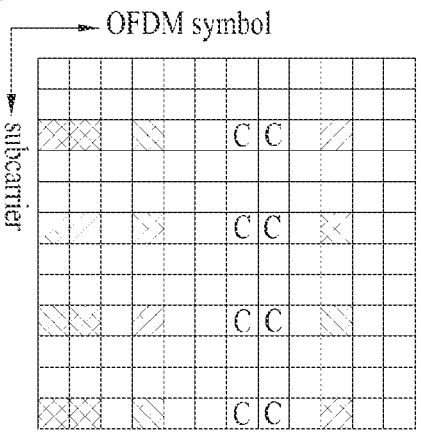
(c)

FIG. 24
▨ CRS
C CSI-RS
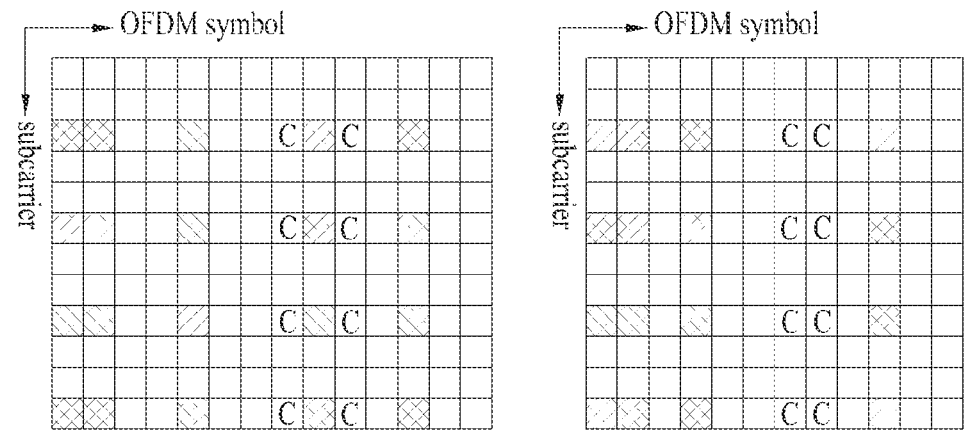
(a)
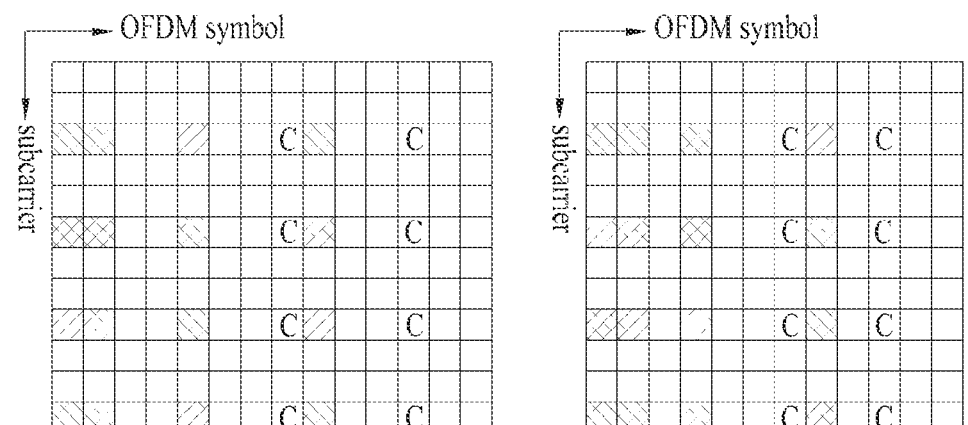
(b)
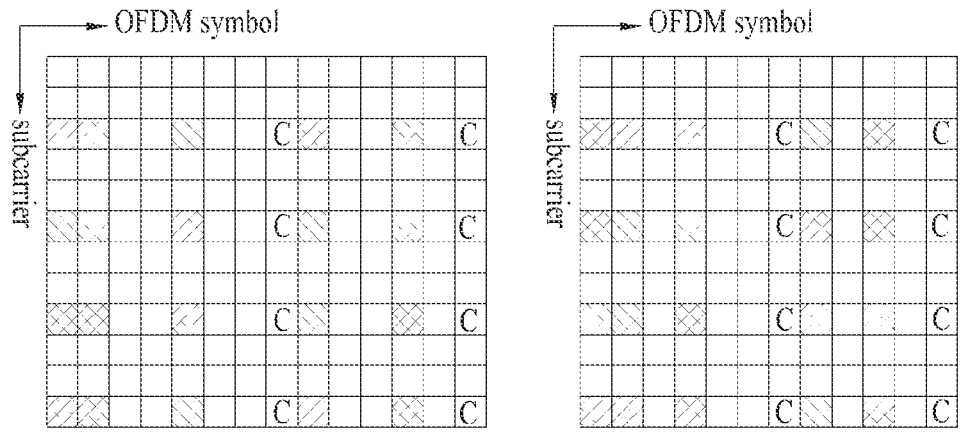
(c)

FIG. 27
☒ CRS
C CSI-RS
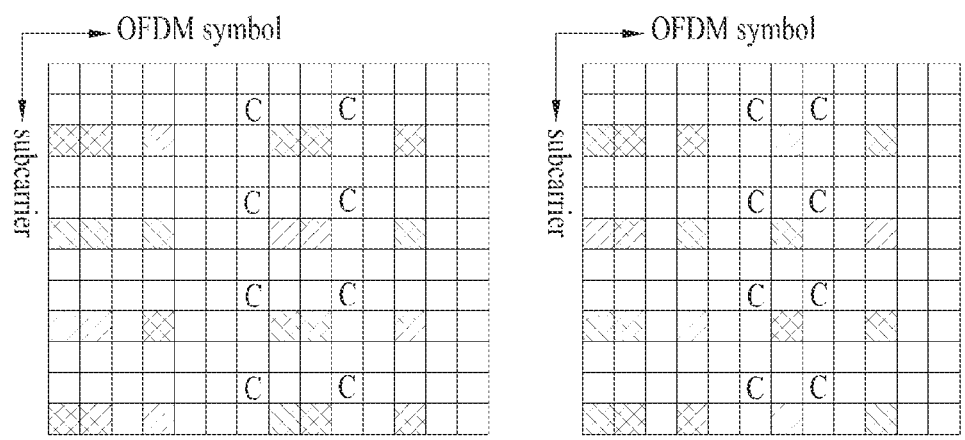
(a)
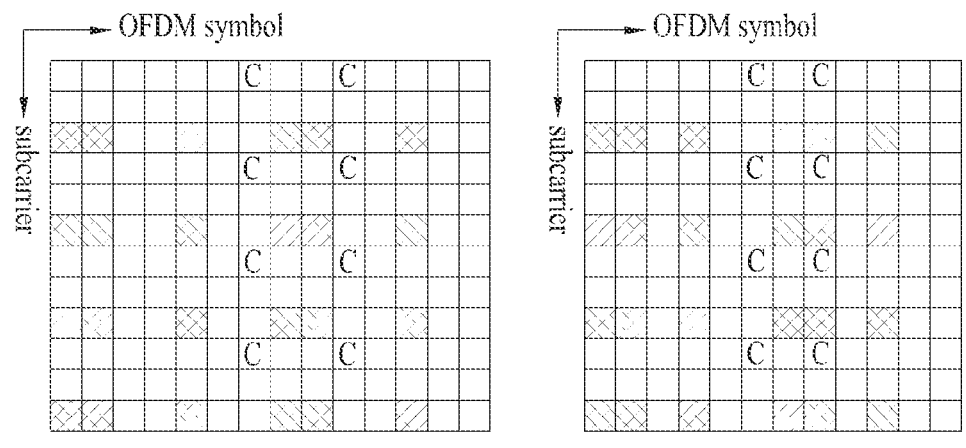
(b)

FIG. 34
☒ CRS
C CSI-RS
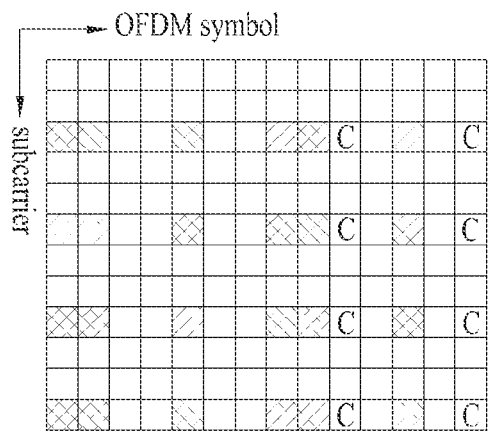
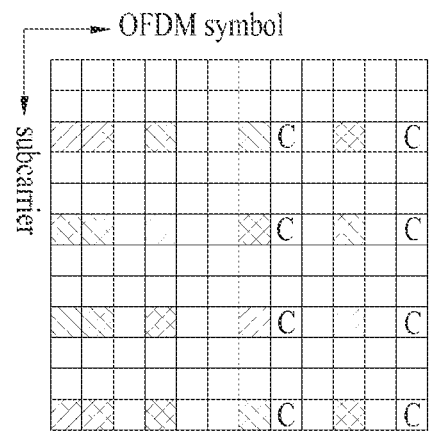
(a)
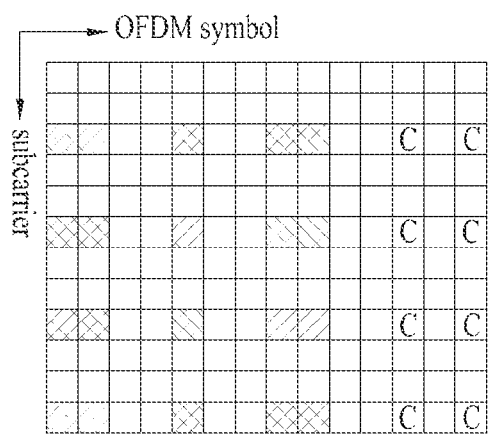
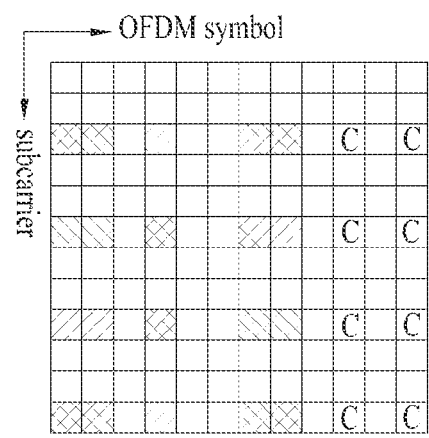
(b)

FIG. 35
⊠ CRS
C CSI-RS
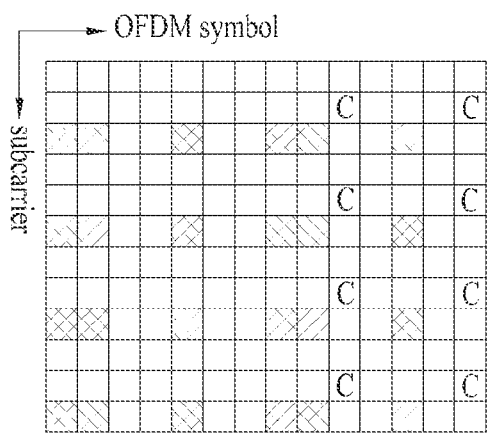
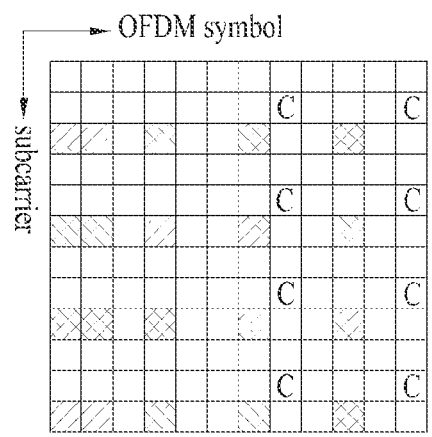
(a)
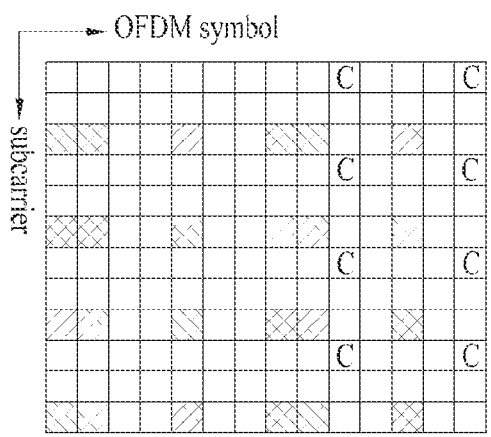
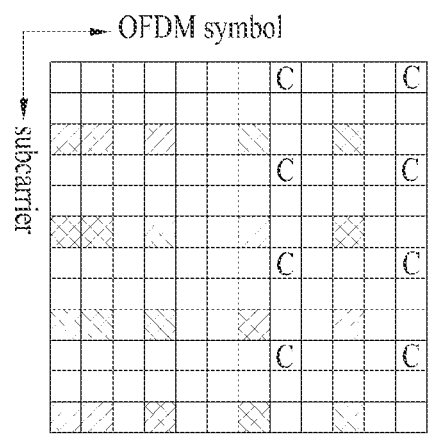
(b)

FIG. 37
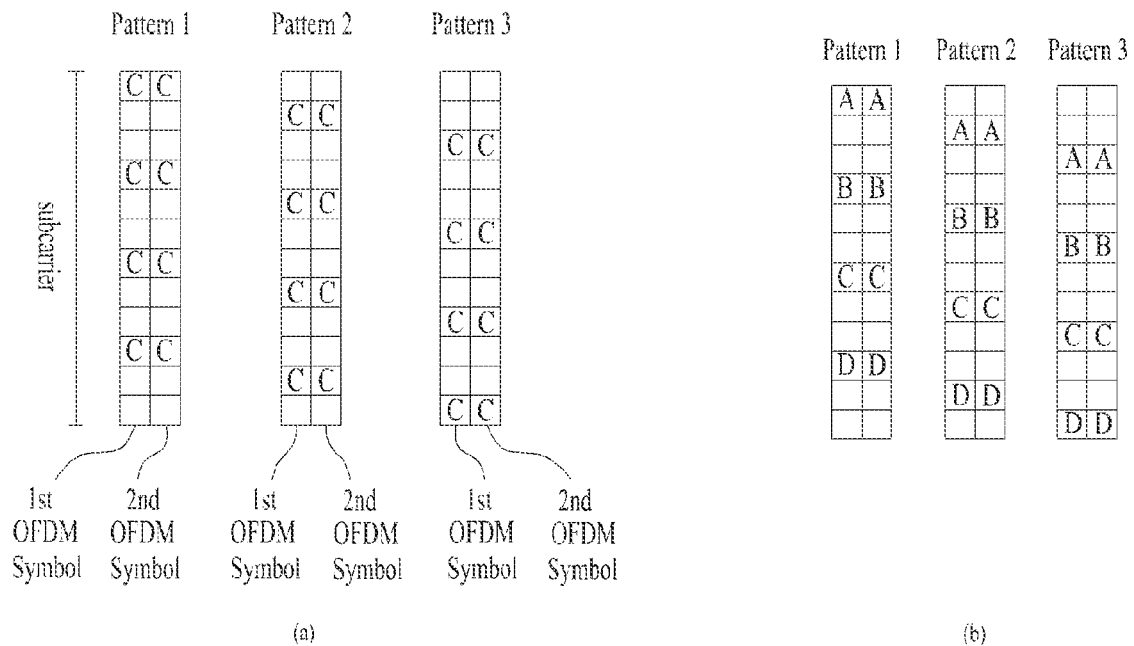
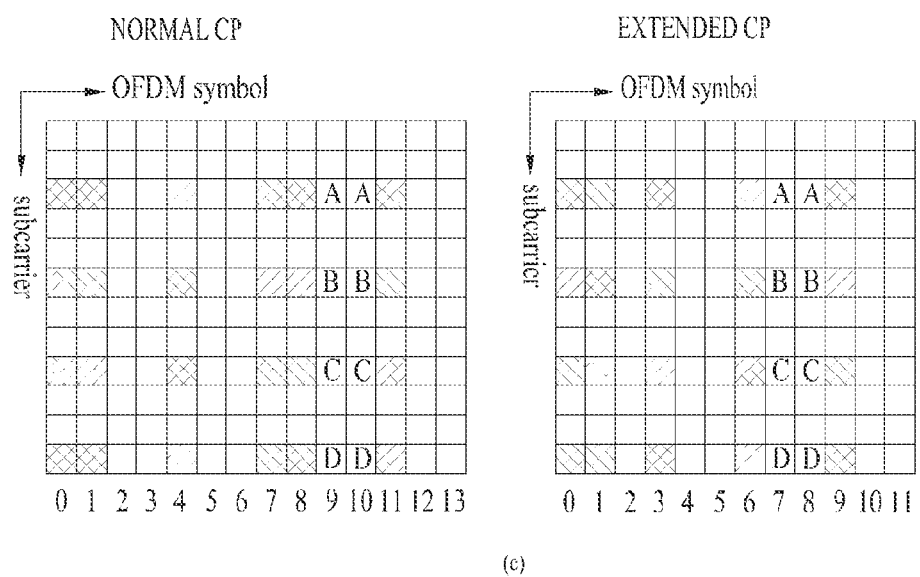

FIG. 40
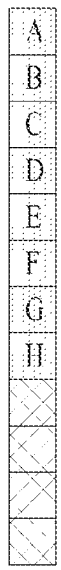 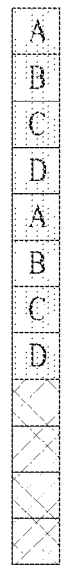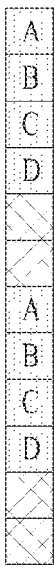
PATTERN 1　PATTERN 2　PATTERN 3　　　　PATTERN 1　PATTERN 2　PATTERN 3
(a)　　　　　　　　　　　　　　　(b)
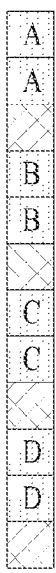
PATTERN 1　PATTERN 2　PATTERN 3
(c)

FIG. 41

FIG. 45
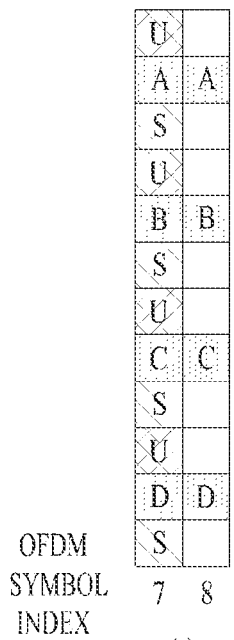
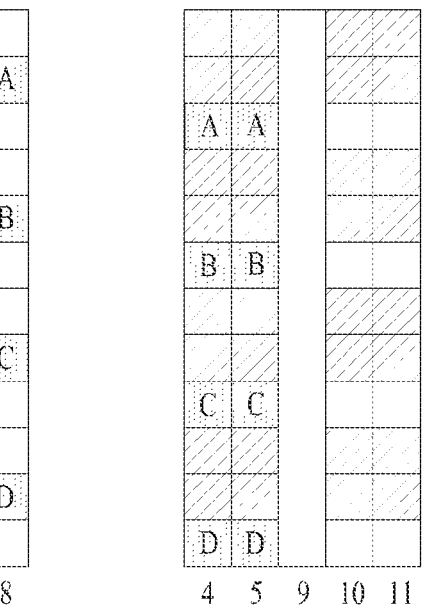
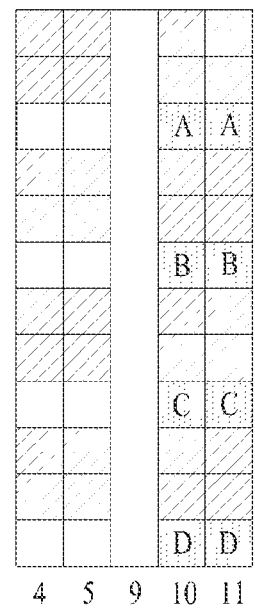
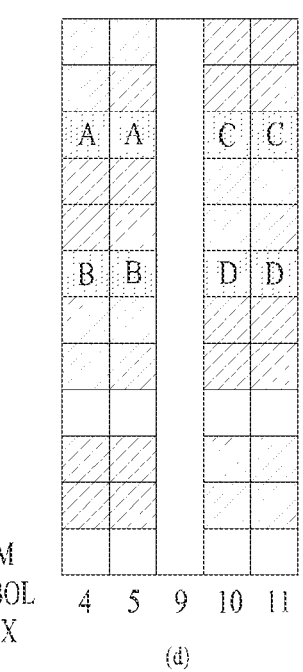
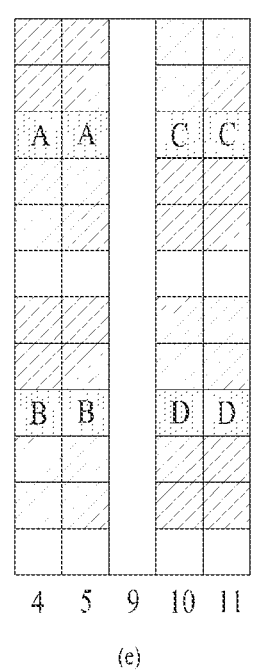

FIG. 47
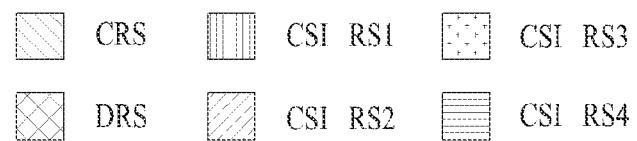
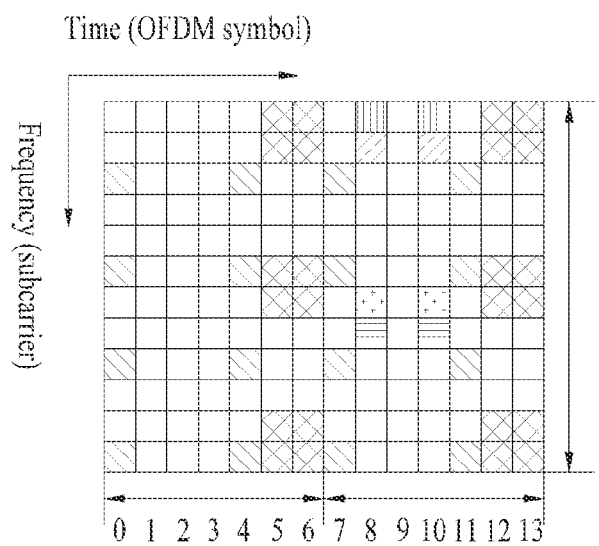
(a)
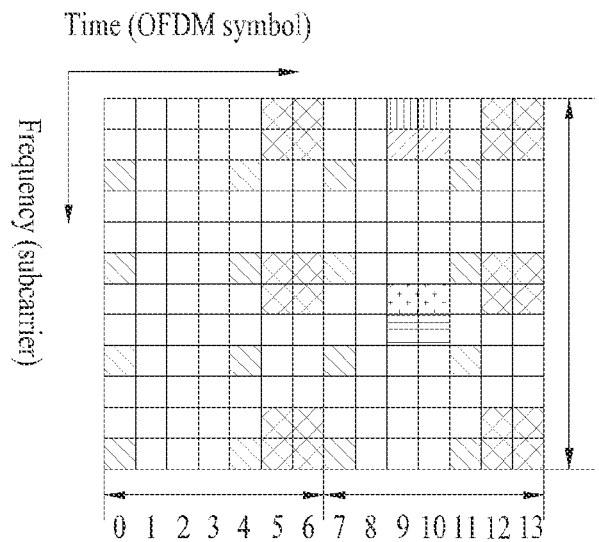
(b)

US 8,675,589 B2

METHOD AND DEVICE FOR TRANSMITTING A DOWNLINK REFERENCE SIGNAL IN A WIRELESS COMMUNICATION SYSTEM SUPPORTING MULTIPLE ANTENNAS

CROSS-REFERENCE TO RELATED APPLICATIONS

This application is the National Stage filing under 35 U.S.C. 371 of International Application No. PCT/KR2010/005351, filed on Aug. 13, 2010, which claims the benefit of earlier filing date and right of priority to Korean Application No. 10-2010-0078057, filed on Aug. 13, 2010, and also claims the benefit of U.S. Provisional Application Ser. Nos. 61/346,044, filed on May 19, 2010, 61/333,719, filed on May 11, 2010, 61/299,354, filed on Jan. 29, 2010, and 61/233,843, filed on Aug. 14, 2009, the contents of which are all incorporated by reference herein in their entirety.

TECHNICAL FIELD

The following description relates to a wireless communication system and, more particularly, to a method and apparatus for transmitting a downlink reference signal in a wireless communication system which supports multiple antennas.

BACKGROUND ART

A Multiple Input Multiple Output (MIMO) system refers to a system for improving data transmission/reception efficiency using multiple transmission antennas and multiple reception antennas. MIMO technology includes a spatial diversity scheme and a spatial multiplexing scheme. The spatial diversity scheme is suitable for data transmission of a user equipment (UE) which moves at a high speed, because transmission reliability is increased or a cell radius is increased through diversity gain. The spatial multiplexing scheme can increase data transfer rate without increasing system bandwidth by simultaneously transmitting different data.

In a MIMO system, each transmission antenna has an independent data channel. The transmission antenna may be a virtual antenna or a physical antenna. A receiver estimates a channel with respect to each transmission antenna and receives data transmitted from each transmission antenna. Channel estimation refers to a process of compensating for signal distortion due to fading so as to restore the received signal. Fading refers to a phenomenon in which the intensity of a signal is rapidly changed due to multi-path and time delay in a wireless communication system environment. For channel estimation, a reference signal known to both a transmitter and a receiver is necessary. The reference signal may be abbreviated to RS or referred to as a pilot signal according to the standard implemented.

A downlink reference signal is a pilot signal for coherent demodulation, such as a Physical Downlink Shared Channel (PDSCH), a Physical Control Format Indicator Channel (PCFICH), a Physical Hybrid Indicator Channel (PHICH), and a Physical Downlink Control Channel (PDCCH). The downlink reference signal includes a Common Reference Signal (CRS) shared among all UEs in a cell and a Dedicated Reference Signal (DRS) for a specific UE. The CRS may be referred to as a cell-specific reference signal. The DRS may be referred to as a UE-specific reference signal.

In a system having an antenna configuration (e.g., a system according to the LTE-A standard supporting eight transmission antennas) developed as an extension of a legacy communication system (e.g., a system based on LTE release 8 or 9), it is necessary to transmit a reference signal for acquiring channel state information (CSI) at a reception side, that is, a CSI-RS.

DISCLOSURE

Technical Problem

An object of the present invention is to provide a method for arranging CSI-RSs, which is capable of reducing CSI-RS transmission overhead in MIMO transmission and optimizing channel estimation performance by CSI-RSs.

Technical Solution

The object of the present invention can be achieved by providing a method for transmitting channel state information-reference signals (CSI-RSs) for 8 or fewer antenna ports at a base station, the method including mapping the CSI-RSs for the 8 or fewer antenna ports to a data region of a downlink subframe having an extended cyclic prefix (CP) configuration according to a predetermined pattern, and transmitting the downlink subframe to which the CSI-RSs for the 8 or fewer antenna ports are mapped, wherein the predetermined pattern is defined such that the CSI-RSs for the 8 or fewer antenna ports are mapped to two orthogonal frequency division multiplexing (OFDM) symbols in the data region of the downlink subframe and are mapped to one or more of four subcarrier locations in each of the two OFDM symbols, and wherein the four subcarrier locations defined in the predetermined pattern are arranged at an interval of 3 subcarriers.

The two OFDM symbols defined in the predetermined pattern may be OFDM symbol indexes 4 and 5, OFDM symbol indexes 7 and 8, or OFDM symbol indexes 10 and 11.

The four subcarrier locations defined in the predetermined pattern may be shifted by one or two subcarriers on a per cell or cell group basis.

The CSI-RSs may be subjected to code division multiplexing (CDM) using an orthogonal code over the two OFDM symbols.

If the number of antenna ports of the base station is 2 or 4, the CSI-RSs may be mapped to some of the locations defined in the predetermined pattern.

If the two OFDM symbols are OFDM symbol indexes 4 and 5, the four subcarrier locations may be subcarrier indexes 0, 3, 6 and 9 or subcarrier indexes 2, 5, 8 and 11, if the two OFDM symbols are OFDM symbol indexes 7 and 8, the four subcarrier locations may be subcarrier indexes 0, 3, 6 and 9, subcarrier indexes 1, 2, 7 and 10 or subcarrier indexes 2, 5, 8 and 11, and, if the two OFDM symbols are OFDM symbol indexes 10 and 11, the four subcarrier locations may be subcarrier indexes 1, 4, 7 and 10 or subcarrier indexes 2, 5, 8 and 11.

The CSI-RSs for the 8 or fewer antenna ports may be grouped into a total of four groups such that CSI-RSs for two antenna ports configure one group, the CSI-RSs for two antennas of each of the four groups may be multiplexed at the same subcarrier location of the two OFDM symbols using a code division multiplexing (CDM) scheme, and the four groups may be multiplexed at different subcarrier locations using a frequency division multiplexing (FDM) scheme.

In another aspect of the present invention, there is provided a method of, at a user equipment, estimating a channel using channel state information-reference signals (CSI-RSs) for 8 or fewer antenna ports from a base station, the method including receiving a downlink subframe having an extended cyclic prefix (CP) configuration in which the CSI-RSs for the 8 or fewer antenna ports are mapped to a data region according to a predetermined pattern, and estimating the channel using the CSI-RSs, wherein the predetermined pattern is defined such that the CSI-RSs for the 8 or fewer antenna ports are mapped to two orthogonal frequency division multiplexing (OFDM) symbols in the data region of the downlink subframe and are mapped to one or more of four subcarrier locations in each of the two OFDM symbols, and wherein the four subcarrier locations defined in the predetermined pattern are arranged at an interval of 3 subcarriers.

The two OFDM symbols defined in the predetermined pattern may be OFDM symbol indexes 4 and 5, OFDM symbol indexes 7 and 8, or OFDM symbol indexes 10 and 11.

The four subcarrier locations defined in the predetermined pattern may be shifted by one or two subcarriers on a per cell or cell group basis.

The CSI-RSs may be subjected to code division multiplexing (CDM) using an orthogonal code over the two OFDM symbols.

If the number of antenna ports of the base station is 2 or 4, the CSI-RSs may be mapped to some of the locations defined in the predetermined pattern.

If the two OFDM symbols are OFDM symbol indexes 4 and 5, the four subcarrier locations may be subcarrier indexes 0, 3, 6 and 9 or subcarrier indexes 2, 5, 8 and 11, if the two OFDM symbols are OFDM symbol indexes 7 and 8, the four subcarrier locations may be subcarrier indexes 0, 3, 6 and 9, subcarrier indexes 1, 2, 7 and 10 or subcarrier indexes 2, 5, 8 and 11, and, if the two OFDM symbols are OFDM symbol indexes 10 and 11, the four subcarrier locations may be subcarrier indexes 1, 4, 7 and 10 or subcarrier indexes 2, 5, 8 and 11.

The CSI-RSs for the 8 or fewer antenna ports may be grouped into a total of four groups such that CSI-RSs for two antenna ports configure one group, the CSI-RSs for two antennas of each of the four groups may be multiplexed at the same subcarrier location of the two OFDM symbols using a code division multiplexing (CDM) scheme, and the four groups may be multiplexed at different subcarrier locations using a frequency division multiplexing (FDM) scheme.

In another aspect of the present invention, there is provided a base station for transmitting channel state information-reference signals (CSI-RSs) for 8 or fewer antenna ports, including a reception module configured to receive an uplink signal from a user equipment, a transmission module configured to transmit a downlink signal to the user equipment, and a processor configured to control the base station including the reception module and the transmission module, wherein the processor maps the CSI-RSs for the 8 or fewer antenna ports to a data region of a downlink subframe having an extended cyclic prefix (CP) configuration according to a predetermined pattern, and controls transmission of the downlink subframe, to which the CSI-RSs for the 8 or fewer antenna ports are mapped, through the transmission module, wherein the predetermined pattern is defined such that the CSI-RSs for the 8 or fewer antenna ports are mapped to two orthogonal frequency division multiplexing (OFDM) symbols in the data region of the downlink subframe and are mapped to one or more of four subcarrier locations in each of the two OFDM symbols, and wherein the four subcarrier locations defined in the predetermined pattern are arranged at an interval of 3 subcarriers.

In another aspect of the present invention, there is provided a user equipment for estimating a channel using channel state information-reference signals (CSI-RSs) for 8 or fewer antenna ports from a base station, including a reception module configured to receive a downlink signal from the base station, a transmission module configured to transmit an uplink signal to the base station, and a processor configured to control the base station including the reception module and the transmission module, wherein the processor receives a downlink subframe having an extended cyclic prefix (CP) configuration in which the CSI-RSs for the 8 or fewer antenna ports are mapped to a data region according to a predetermined pattern, and controls of estimation of the channel using the CSI-RSs, wherein the predetermined pattern is defined such that the CSI-RSs for the 8 or fewer antenna ports are mapped to two orthogonal frequency division multiplexing (OFDM) symbols in the data region of the downlink subframe and are mapped to one or more among four subcarrier locations in each of the two OFDM symbols, and wherein the four subcarrier locations defined in the predetermined pattern are arranged at an interval of 3 subcarriers.

The general description and the following detailed description of the present invention are exemplary and are provided as additional description of the claims.

Advantageous Effects

According to the embodiments of the present invention, it is possible to provide a method and apparatus capable of reducing CSI-RS transmission overhead in MIMO transmission and optimizing channel estimation performance by CSI-RSs.

The effects of the present invention are not limited to the above-described effects and other effects which are not described herein will become apparent to those skilled in the art from the following description.

DESCRIPTION OF DRAWINGS

FIG. 7 is a diagram showing an example of a pattern in which CRSs and DRSs are arranged within one resource block (RB).

FIG. 8 is a diagram explaining a method of arranging CSI-RSs using an FDM, TDM and/or CDM scheme.

FIGS. 9 to 12 are diagrams showing various embodiments of a CSI-RS pattern.

FIGS. 14 to 36 are diagrams showing various embodiments of a CSI-RS pattern.

FIGS. 37 and 38 are diagrams explaining frequency shifting of a CSI-RS pattern and various multiplexing methods.

FIG. 39 is a diagram showing a pattern of other RSs to be considered in order to determine a CSI-RS pattern.

FIG. 40 is a diagram showing an embodiment of a CSI-RS pattern allocated to one OFDM symbol.

FIG. 41 is a diagram showing an embodiment of a CSI-RS pattern allocated to two OFDM symbols.

FIGS. 43 to 46 are diagrams showing embodiments of a location of a CSI-RS pattern allocated to two OFDM symbols in a frequency domain.

FIG. 47 is a diagram showing the locations of two OFDM symbols to which CSI-RSs are allocated in a time domain.

BEST MODE

Figure 1:
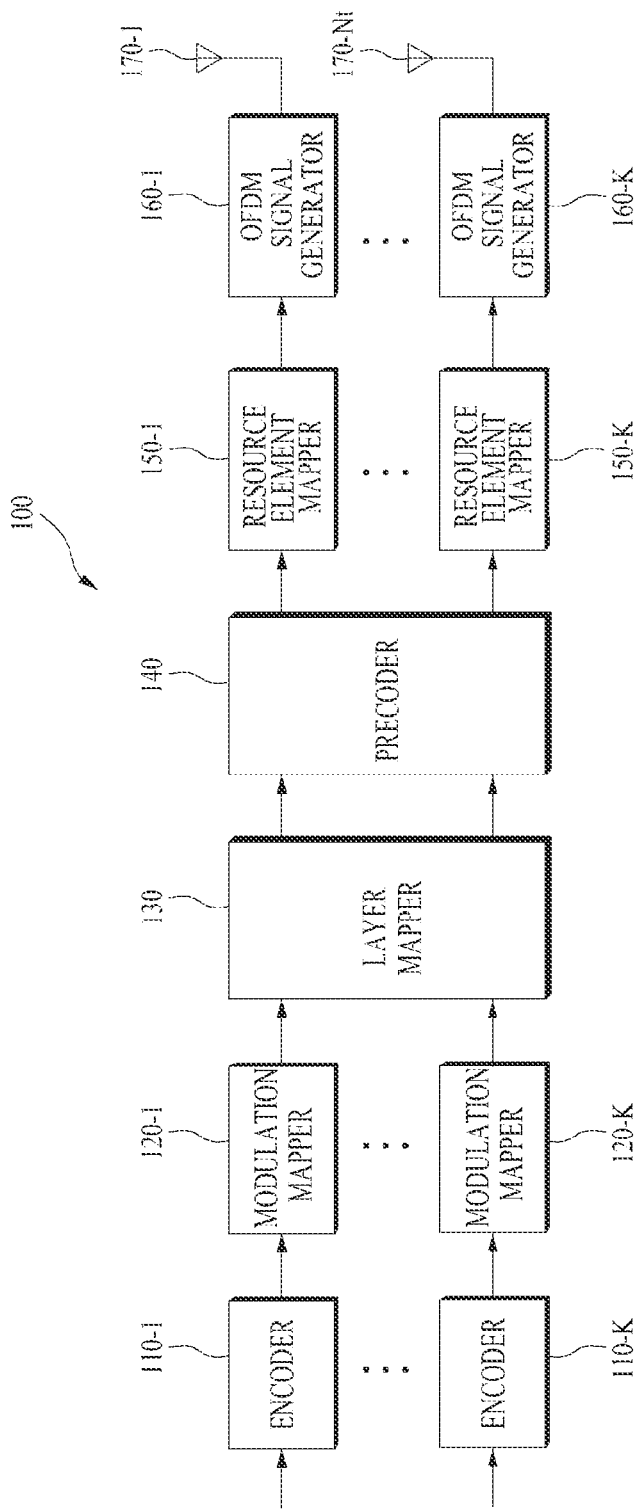
FIG. 1 is a block diagram showing the structure of a transmitter including multiple antennas.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, an LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution). The OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE—Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and LTE-A system. However, the technical spirit of the present invention is not limited thereto.

In the following description, the term "rank" denotes the number of paths for independently transmitting signals, and the term "number of layers" denotes the number of signal streams transmitted through each path. In general, since a transmitter transmits layers corresponding in number to the number of ranks used for signal transmission, the rank has the same meaning as the number of layers unless otherwise noted.

FIG. 1 is a block diagram showing the structure of a transmitter including multiple antennas.

Referring to FIG. 1, a transmitter 100 includes encoders 110-1, . . . , and 110-K, modulation mappers 120-1, . . . , and 120-K, a layer mapper 130, a predecoder 140, resource element mappers 150-1, . . . , and 150-K and OFDM signal generators 160-1, . . . , and 160-K. The transmitter 100 includes Nt transmission antennas 170-1, . . . , and 170-Nt.

The encoders 110-1, . . . , and 110-K encode input data according to a predetermined coding method and generate coded data. The modulation mappers 120-1, . . . , and 120-K map the coded data to modulation symbols representing locations on a signal constellation. A modulation scheme is not limited and may be m-phase shift keying (PSK) or m-quadrature amplitude modulation (QAM). For example, the m-PSK may be BPSK, QPSK or 8-PSK. The m-QAM may be 16-QAM, 64-QAM or 256-QAM.

The layer mapper 130 defines layers of the modulation symbols such that the precoder 140 distributes antenna-specific symbols into antenna paths. The layer is defined as an information path input to the precoder 140. The previous information path of the precoder 140 may be referred to as a virtual antenna or layer.

The precoder 140 processes the modulation symbols using a MIMO scheme according to the multiple transmission antennas 170-1, . . . , and 170-Nt and outputs antenna-specific symbols. The precoder 140 distributes the antenna-specific symbols to the resource element mappers 150-1, . . . , and 150-K of the antenna paths. Each information path transmitted to one antenna by the precoder 140 is referred to as a stream, or may be referred to as a physical antenna.

The resource element mappers 150-1, . . . , and 150-K allocate the antenna-specific symbols to appropriate resource elements and multiplex the antenna-specific symbols on a per-user basis. The OFDM signal generators 160-1, . . . , and 160-K modulate the antenna-specific symbols using an OFDM scheme and output OFDM symbols. The OFDM signal generators 160-1, . . . , and 160-K may perform Inverse Fast Fourier Transform (IFFT) with respect to the antenna-specific symbols and insert a cyclic prefix (CP) into time-domain symbols subjected to IFFT. The CP is a signal inserted into a guard interval in order to eliminate inter-symbol interference due to multiple paths in an OFDM transmission scheme. The OFDM symbols are transmitted via the transmission antennas 170-1, . . . , and 170-Nt.

Figure 2:
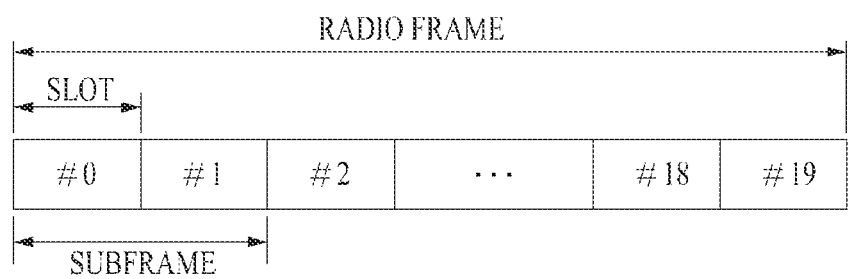
FIG. 2 is a diagram showing the structure of a downlink radio frame.

FIG. 2 is a diagram showing the structure of a downlink radio frame. Referring to FIG. 2, a downlink radio frame includes 10 subframes, and one subframe includes two slots. The downlink radio frame may be configured by frequency division duplexing (FDD) or time division duplexing (TDD). A time required for transmitting one subframe is referred to as a Transmission Time Interval (TTI). For example, one subframe may have a length of 1 ms and one slot may have a length of 0.5 ms. One slot may include a plurality of OFDM symbols in a time region and include a plurality of Resource Blocks (RBs) in a frequency region.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the case of the normal CP. In the case of the extended CP, for example, the number of OFDM symbols included in one slot may be six. If a channel state is unstable, for example, if a user equipment (UE) moves at a high speed, the extended CP may be used in order to further reduce inter-symbol interference.

In case of using the normal CP, since one slot includes seven OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

The structure of the radio frame is only exemplary. Accordingly, the number of subframes included in the radio frame, the number of slots included in the subframe or the number of symbols included in the slot may be changed in various manners.

Figure 3:
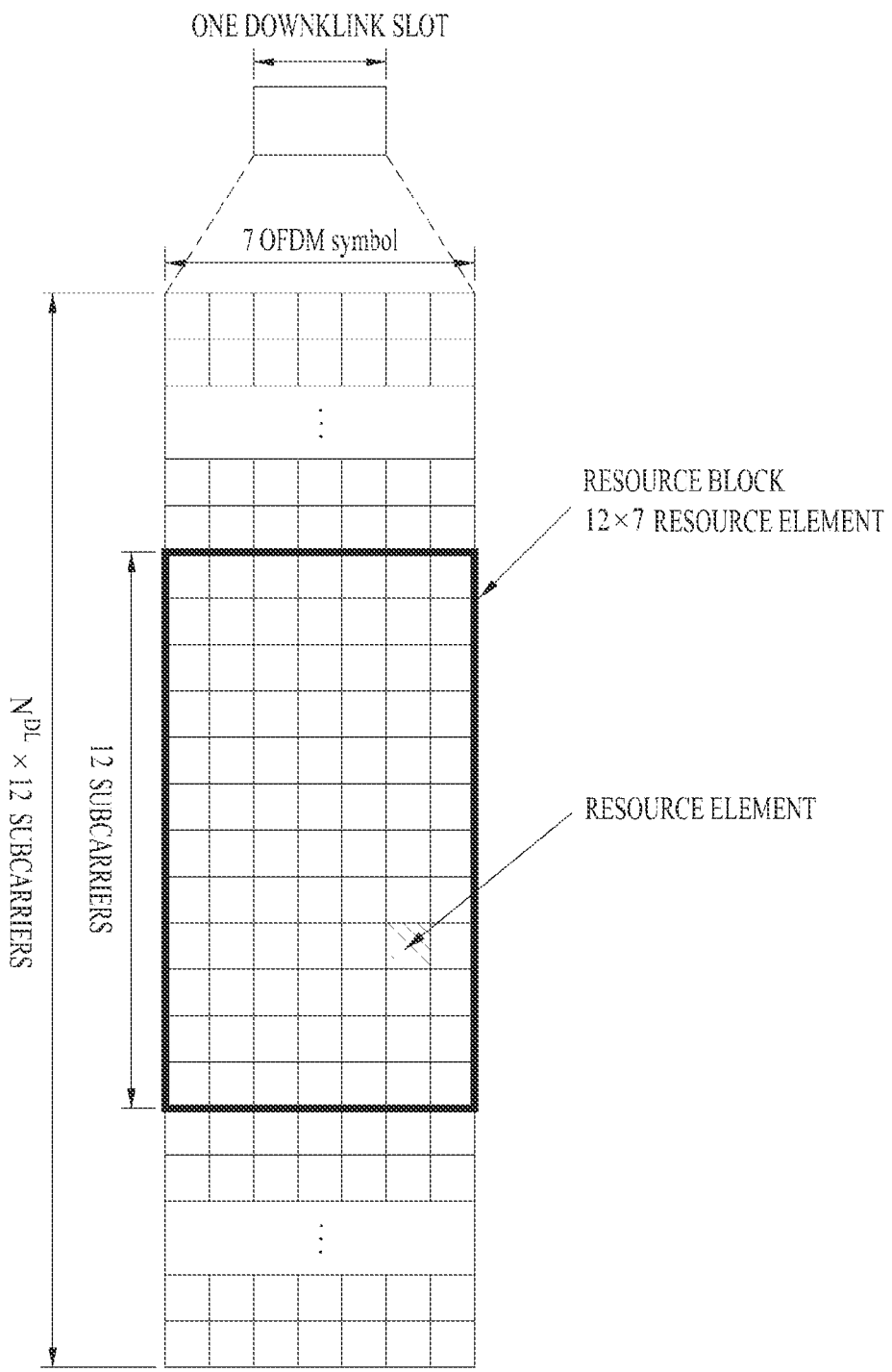
FIG. 3 is a diagram showing an example of a resource grid in one downlink slot.

FIG. 3 is a diagram showing an example of a resource grid of one downlink slot. OFDM symbols are configured by the normal CP. Referring to FIG. 3, the downlink slot includes a plurality of OFDM symbols in a time region and includes a plurality of RBs in a frequency region. Although one downlink slot includes seven OFDM symbols and one RB includes 12 subcarriers, the present invention is not limited thereto. Each element of the resource grid is referred to as a Resource Element (RE). For example, a RE a(k,l) refers to a RE located at a k-th subcarrier and an l-th OFDM symbol. In the case of the normal CP, one RB includes 12×7 REs (in the case of the extended CP, one RB includes 12×6 REs). Since an interval between subcarriers is 15 kHz, one RB includes about 180 kHz in the frequency region. $N^{DL}$ denotes the number of RBs included in the downlink slot. The value of $N^{DL}$ is determined based on downlink transmission bandwidth set by scheduling of a base station.

Figure 4:
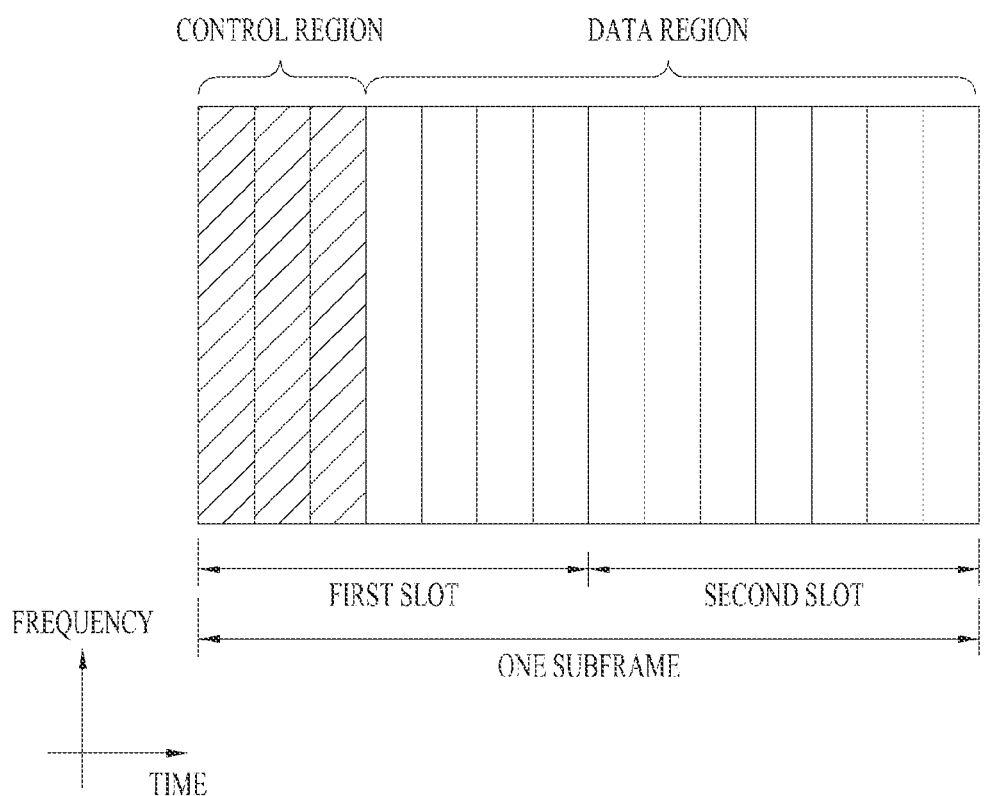
FIG. 4 is a diagram showing the structure of a downlink subframe.

FIG. 4 is a diagram showing the structure of a downlink subframe. A maximum of three OFDM symbols of a front portion of a first slot within one subframe corresponds to a control region to which control channels are allocated. The remaining OFDM symbols correspond to a data region to which Physical Downlink Shared Channels (PDSCHs) are allocated. The basic transmission unit is one subframe. That is, a PDCCH and a PDSCH are allocated over two slots. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response of uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of an higher layer control message such as a Random Access Response (RAR) transmitted on the PDSCH, a set of transmit power control commands for an individual UEs in a certain UE group, transmit power control information, activation of Voice over IP (VoIP), etc. A plurality of PDCCHs may be transmitted within the control region. A terminal may monitor the plurality of PDCCHs. The PDCCHs are transmitted on an aggregation of one or several consecutive control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the terminal, and attaches a Cyclic Redundancy Check (CRC) to control information. The CRC is masked with a Radio Network Temporary Identifier (RNTI) according to an owner or usage of the PDCCH. If the PDCCH is for a specific terminal, a cell-RNTI (C-RNTI) of the terminal may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the terminal, a random access-RNTI (RA-RNTI) may be masked to the CRC.

Common Reference Signal (CRS)

A pattern in which cell-specific reference signals, that is, common reference signals (CRSs) are arranged on resource blocks will be described with reference to FIGS. 5 and 6.

The CRS is used to estimate the channel of a physical antenna port, may be commonly used by all terminals (UEs) located in a cell, and is distributed over the entire band. The CRS may be used for acquisition of channel state information (CSI) and data demodulation.

Various CRSs may be defined according to the antenna configuration of a transmission side (base station). A 3GPP LTE (release-8) system supports various antenna configurations and a downlink signal transmission side (base station) has three types of antenna configurations such as a single antenna, two transmission antennas and four transmission antennas. If the base station performs transmission using a single antenna, RSs for the single antenna port are arranged. If the base station performs transmission using two antennas, RSs for the two antenna ports are arranged using a time division multiplexing (TDM) scheme and/or a frequency division multiplexing (FDM) scheme. That is, the RSs for the two antenna ports may be arranged on different time resources and/or different frequency resources to be distinguished from each other. If the base station performs transmission using four antennas, RSs for the four antenna ports are arranged using a TDM scheme and/or an FDM scheme. Channel information estimated by a downlink signal reception side (UE) through the CRS may be used to demodulate data transmitted using transmission methods such as single antenna transmission, transmit diversity, closed-loop spatial multiplexing, open-loop spatial multiplexing, and multi-user MIMO (MU-MIMO).

In the case in which multiple antennas are supported, if an RS is transmitted via a certain antenna port, the RS is transmitted at the location of a resource element (RE) specified according to the RS pattern and no signal is transmitted at the location of the RE specified for another antenna port.

In order to enhance channel estimation performance through the CRS, the location of the CRS in the frequency domain may be shifted on a per cell basis to be different from each other. For example, if the RSs are located at every third subcarrier, the CRS may be located on a 3k-th subcarrier in a certain cell and the CRS may be located on a (3k+1)-th subcarrier in another cell. From the viewpoint of one antenna port, the RSs may be arranged at an interval of 6 REs (that is, an interval of 6 subcarriers) in the frequency domain, and an interval between an RE in which an RS for one antenna port is arranged and an RE in which an RS for another antenna port is arranged is three REs.

In the time domain, the RSs are arranged from a first OFDM symbol (symbol index 0) of each slot as a start point at a predetermined interval. A time interval is differently defined according to CP length. In the case of the normal CP, the RSs are located at first and fifth OFDM symbols (symbol indexes 0 and 4) of the slot and, in the case of the extended CP, the RSs are located at first and fourth OFDM symbols (symbol indexes 0 and 3) of the slot. In one OFDM symbol, only RSs for a maximum of two antenna ports are defined. Accordingly, for 4-Tx antenna transmission, RSs for antenna ports 0 and 1 are located at first and fifth OFDM symbols of the slot (first and fourth OFDM symbols in the case of the extended CP) and the RSs for antenna ports 2 and 3 are located at a second OFDM symbol of the slot. The frequency locations of the RSs for the antenna ports 2 and 3 are switched in a second slot.

Figure 5:
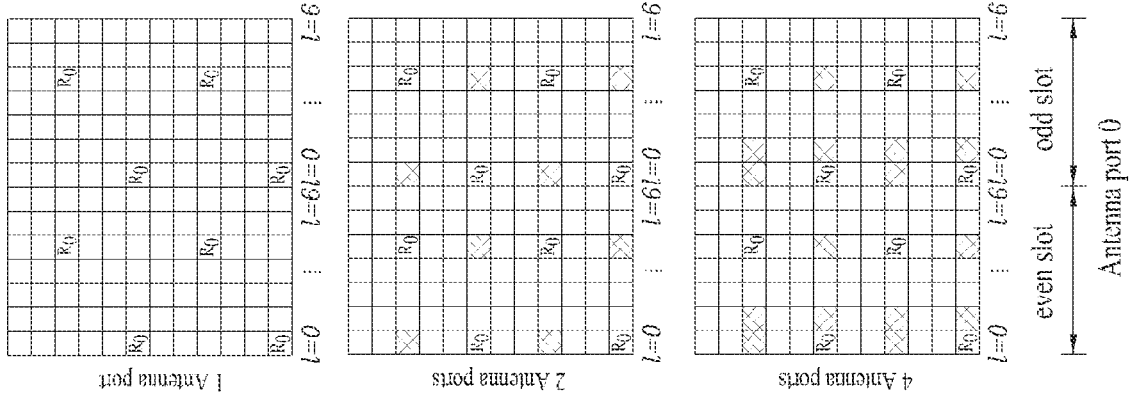
FIG. 5 is a diagram showing resource elements (REs) to which downlink cell-specific reference signals (RSs) are mapped in the case of a normal cyclic prefix (CP).
Figure 6:
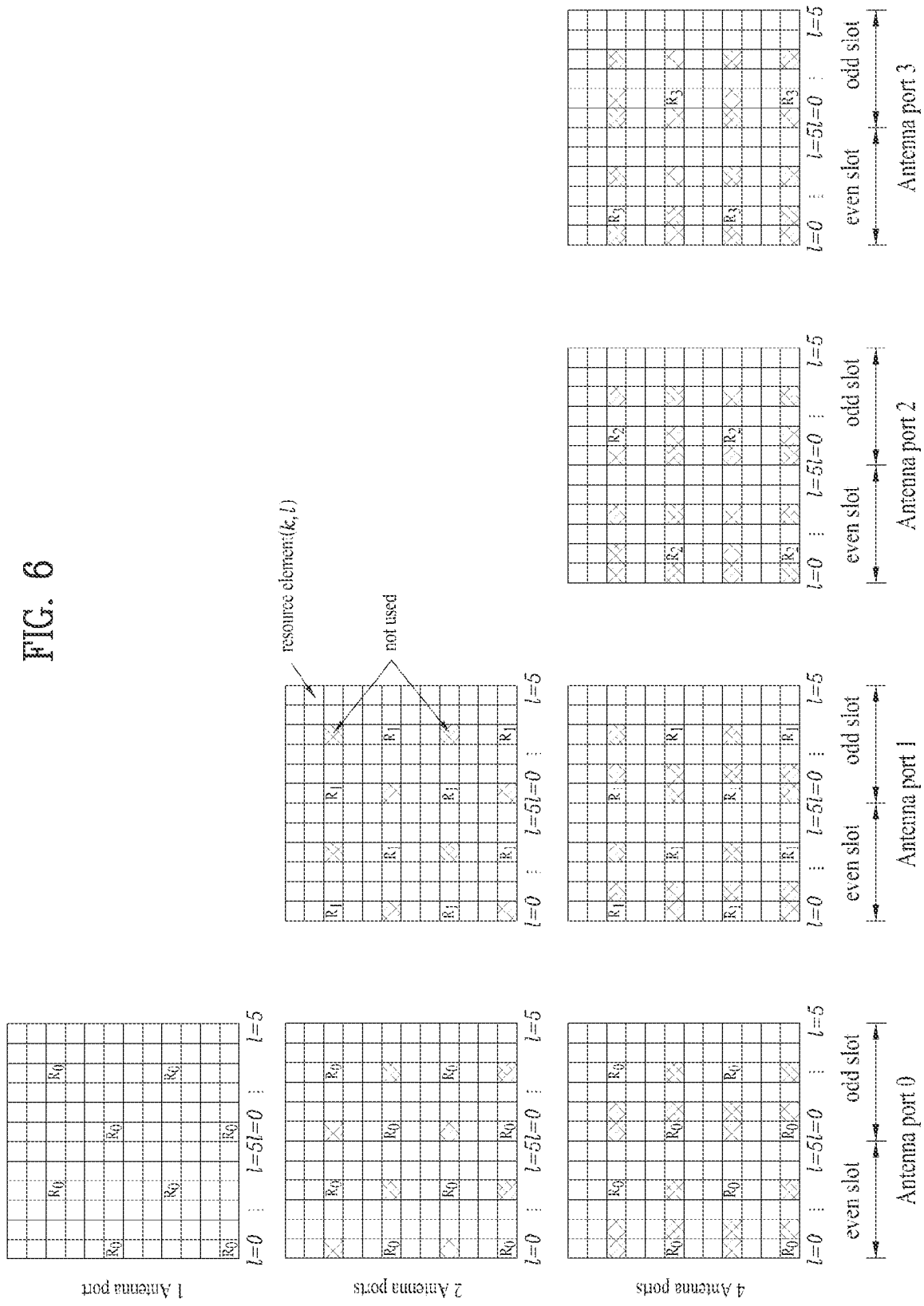
FIG. 6 is a diagram showing REs to which downlink cell-specific reference signals (RSs) are mapped in the case of an extended cyclic prefix (CP).

For the above-described locations of the CRSs, refer to FIGS. 5 and 6. More specifically, FIG. 5 shows REs to which CRSs are mapped in the case of the normal CP. In FIG. 5, a horizontal axis denotes a time domain and a vertical axis denotes a frequency domain. In FIG. 5, the mapping unit of the RE corresponds to OFDM symbols configuring one subframe (that is, two slots) in the time domain and corresponds to subcarriers configuring one RB in the frequency domain. A smallest rectangle in the time-frequency domain shown in FIG. 5 corresponds to one OFDM symbol in the time domain and corresponds to one subcarrier in the frequency domain, that is, corresponds to one RE. That is, the REs to which the RSs are mapped may be represented based on a pair of two RBs, which are consecutive in the time domain, of one subframe including 14 OFDM symbols×12 subcarriers in the frequency domain.

R0 to R3 shown in FIG. 5 indicate REs to which CRSs for antenna ports 0 to 3 are mapped. That is, Rp indicates an RE to which RS is mapped to an antenna port index p. As described above, in the case of two antenna ports and four antenna ports, an RE to which the RS of one antenna port is mapped within one slot is not used for transmission of another antenna port within that slot.

FIG. 6 shows REs to which CRSs for antenna ports 0 to 3 are mapped in the case of the extended CP. In the case of the extended CP, since one subframe includes 12 OFDM symbols, the mapping unit of the REs is represented by 12 OFDM symbols×12 subcarriers in FIG. 9.

In order to support spectral efficiency higher than that of the 3GPP LTE (release-8) system, a system (e.g., an LTE-A system) having the extended antenna configuration may be designed. The extended antenna configuration may have, for example, eight transmission antennas. In the system having the extended antenna configuration, it is necessary to support UEs which operate in the existing antenna configuration, that is, backward compatibility. Accordingly, it is necessary to support an RS pattern according to the existing antenna configuration and to design a new RS pattern for an additional antenna configuration. If CRSs for the new antenna ports are added to the system having the existing antenna configuration, RS overhead is rapidly increased and thus data transfer rate is reduced. In consideration of these problems, separate RSs for measuring the CSI for the new antenna ports need to be designed, which will be described in detail after describing a dedicated reference signal (DRS).

Dedicated Reference Signal (DRS)

In the system having the extended antenna configuration in order to reduce RS overhead, a UE-specific RS, that is, a DRS, may be considered in order to support data transmission via the added antennas.

In the design of the DRS for the new antenna port, a CRS pattern, frequency shifting of the CRS and power boosting need to be considered. More specifically, in order to enhance channel estimation performance by the CRS, frequency shifting of the CRS and power boosting are considered. Frequency shifting means that the start point of the CRS is differently set on a per cell basis as described above. Power boosting means that the RSs are transmitted using higher power by getting the powers of the REs except for the REs allocated for the RSs among the REs of one OFDM symbol. The DRS may be designed to have a frequency interval different from that of the CRS. If the CRS and the DRS are present in the same OFDM symbol, the locations of the CRS and the DRS may overlap according to the frequency shifting of the CRS and power boosting of the CRS may adversely affect DRS transmission.

Accordingly, in the case in which the DRS and the CRS are designed to have different frequency intervals, the two RSs are preferably designed to be located at different OFDM symbols. More specifically, the CRSs are located at first, second, fifth, eighth, ninth and twelfth OFDM symbols in the case of the normal CP and are located at first, second, fourth, seventh, eighth and tenth OFDM symbols in the extended CP.

Since the DRS is an RS for data demodulation, the DRS is located in a region to which a data channel is allocated. First to third OFDM symbols (or first and second OFDM symbols) of one subframe are used for a PDCCH (control channel) and second (or third) to last OFDM symbols are allocated for a PDSCH (data channel).

Thus, if the DRSs are allocated to locations to which the CRSs are not allocated in the region to which the data channel is allocated, the DRSs may be arranged at the following OFDM symbol locations.

In the case of the normal CP: (third), fourth, sixth, seventh, tenth, eleventh, thirteenth and fourteenth OFDM symbols In the case of the extended CP: (third), fifth, sixth, ninth, eleventh and twelfth OFDM symbols Channel estimation information of an RE to which the DRS is not allocated may be acquired from channel estimation information of neighboring REs, to which the DRSs are allocated, by an interpolation method. In consideration of interpolation in the time domain, the RSs are preferably located at both ends of the data channel, that is, fourth and fourteenth OFDM symbols (in the case of the extended CP, fifth and twelfth OFDM symbols) of one subframe. However, even when the channel varies with time by a Doppler effect due to movement of the UE, the channel is not significantly changed within one to two OFDM symbols. Thus, although the DRSs are located inside the OFDM symbols located at both ends of the data channel, data transfer performance according to channel estimation is not significantly changed.

In consideration of multiple-antenna transmission, RSs for the antenna ports (or layers) may be multiplexed using a TDM, FDM and/or code division multiplexing (CDM) scheme. That is, the RSs for the antenna ports are arranged on different time resources or frequency resources to be distinguished from each other. Alternatively, even when the RSs for the antenna ports may be arranged on the same time resources or frequency resources, the RSs may be distinguished from each other using different code resources.

In multiple-antenna transmission, the RSs for the antenna ports may be transmitted using CDM or TDM in adjacent OFDM symbols. If CDM transmission is performed using two OFDM symbols, the two OFDM symbols may be adjacent to each other and the two OFDM symbols preferably have an interval of a maximum of one OFDM symbol therebetween if they are not adjacent to each other. If CDM transmission is performed using four OFDM symbols, the channel must not change with time. In this case, CDM transmission may be performed using the RSs present at different OFDM symbols and the same frequency location.

Matters which are considered when the DRSs are allocated in the frequency domain will now be described. First, when the DRSs are allocated in the frequency domain, the DRSs are preferably located at edges of allocated resources to enhance channel estimation performance. A 90% coherent bandwidth $B_{C,90}$ in the frequency domain may be determined by Equation 1 and a 50% coherent bandwidth $B_{C,50}$ may be determined by Equation 2.

$$B_{C,90} \approx 1/(50\sigma_\tau) \quad \text{Equation 1}$$

$$B_{C,50} \approx 1/(5\sigma_\tau) \quad \text{Equation 2}$$

In Equations 1 and 2, $\sigma_\tau$ denotes a root mean square (RMS) of delay spread.

In an extended typical urban (eTU) channel environment, $\sigma_\tau$ is about 0.5 μs. According to Equation 1, the 90% coherent bandwidth becomes about 10 kHz and, according to Equation 2, the 50% coherent bandwidth becomes about 100 kHz. Since the frequency bandwidth of one RE is 15 kHz, the 90% coherent bandwidth has an interval of about 1 RE and the 50% coherent bandwidth has an interval of about 6 REs. Accordingly, in order to perform interpolation of the RS in channel estimation, the interval between the RSs is preferably less than 6 REs in the frequency domain. In order to perform extrapolation, the interval between the RSs is preferably 1 RE.

When one RB is a minimum data transfer unit, in consideration that the DRSs are uniformly distributed in 12 REs in the frequency domain of one RB, a structure in which RSs are arranged at both ends of the RB and an RS is arranged on a middle portion of the RB may be used. For example, in one OFDM symbol, the RSs may be located at first, sixth and eleventh REs (or second, seventh and twelfth REs) in the frequency domain. Such a structure is advantageous in that the RSs can be efficiently used and interpolation can be efficiently performed. Since the twelfth (or first) RE is within the 90% coherent bandwidth with the eleventh (or second) RE, performance is not significantly changed even when an extrapolated channel or a channel of a neighboring RE is copied and used.

Meanwhile, the DRS is transmitted using the same weight as a precoding weight used for data transmission and the density of RSs may be changed according to the number of transmission layers (antenna ports).

FIG. 7 is a diagram showing an example of a pattern in which CRSs and DRSs are arranged within one RB (14 OFDM symbols×12 subcarriers) based on the above-described design criterion.

Although all the CRSs for the antenna port indexes 0 to 3 are shown in FIG. 7, some of the antenna ports may be used. For example, only CRSs for the antenna port indexes 0 to 1 (two transmission antennas) may be used or only CRSs for the antenna port index 0 may be used.

In FIG. 7(a), the DRSs are arranged on 12 REs within one RB. In FIG. 7(b), the DRSs are arranged on 24 REs within one RB. The DRS pattern shown in FIG. 7(b) may be used when the number of transmission layers is increased. For example, the DRS pattern shown in FIG. 7(a) may be used when the number of transmission layers is 1 to 2 and the DRS pattern shown in FIG. 7(b) may be used when the number of transmission layers is 3 to 8. However, the present invention is not limited thereto and a suitable DRS pattern may be selected according to the number of transmission layers.

Channel State Information Reference Signal (CSI-RS)

In a system (e.g., an LTE-A system supporting eight transmission antennas) developed as an extension of a legacy communication system (e.g., an LTE release 8 system supporting four transmission antennas), it is necessary to transmit new RSs for acquiring CSI. Since the above-described CRSs are RSs for the antenna ports 0 to 3, it is necessary to additionally design new RSs for acquiring the channel states of the extended antenna ports.

In the case of channel information for acquiring the CSI, as compared to channel information required for data demodulation, the CSI may be acquired even when accuracy of channel estimation through RSs is low. Accordingly, the CSI-RS designed for the purpose of acquiring the CSI may be designed with density relatively lower than that of the existing RSs. For example, the CSI-RSs may be transmitted with a duty cycle such as 2 ms, 5 ms, 10 ms or 40 ms in the time domain and RSs may be transmitted at an interval of 6 REs or 12 REs in the frequency domain. The duty cycle indicates a time unit for acquiring all the RSs for the antennas used for transmission. In addition, the CSI-RS may be transmitted over the entire frequency band.

In order to reduce overhead of the CSI-RS transmitted in one subframe, the RSs for the antenna ports may be transmitted on different subframes. However, the CSI-RSs which can support all antenna ports according to the extended transmission antennas within the duty cycle should be transmitted. For example, if CSI-RSs supporting eight antenna ports are present, CSI-RSs for four antenna ports may be transmitted on a first subframe and CSI-RSs for the remaining antenna ports may be transmitted on a second subframe. At this time, the first and second subframes may be subframes which are consecutive in the time domain or subframes with a certain time interval (a value smaller than the duty cycle).

Hereinafter, various embodiments of the present invention of the CSI-RS pattern will be described.

Embodiment 1

According to Embodiment 1, CSI-RSs may be located on OFDM symbols on which the CRSs are arranged. More specifically, CRSs may be located on first, second, fifth, eighth, ninth and twelfth OFDM symbols in the case of the normal CP and may be located on first, second, fourth, seventh, eighth and tenth OFDM symbols in the case of the extended CP. In CSI-RS arrangement, except for first to third OFDM symbols on which the control channel (PDCCH) is located, the CSI-RSs may be located on fifth, eighth, ninth and twelfth OFDM symbols in the case of the normal CP and may be located on fourth, seventh, eighth and tenth OFDM symbols in the case of the extended CP.

The CSI-RS located within one subframe may be designed to be separated from the existing CRS by the same frequency interval (that is, an interval of 3 REs).

More specifically, REs on which the CSI-RSs are arranged may be arranged at the same interval in the frequency domain. From the viewpoint of one antenna port, the CSI-RSs are arranged at an interval of 6 REs (that is, an interval of 6 subcarriers) in the frequency domain and the REs, on which RSs for one antenna port are arranged, may be arranged to be separated from the REs, on which RSs for another antenna port are arranged, by an interval of 3 REs. In this case, the CSI-RSs may be transmitted using REs other than REs, on which the CRSs are arranged, in the OFDM symbol on which the CRSs are located. RSs are located in one OFDM symbol, on which the CRSs are located, at an interval of 3 REs and two REs for data are present between the REs for CRSs. Some of the REs for data in the OFDM symbol on which the CRSs are located may be used as REs for CSI-RSs.

In one RB (14 OFDM symbols×12 subcarriers in the case of the normal CP or 12 OFDM symbols×12 subcarriers in the case of the extended CP), eight REs may be used for CSI-RSs. Two OFDM symbols may be used in one RB and CSI-RSs may be arranged on four REs in one OFDM symbol.

Hereinafter, a method of arranging CSI-RSs using an FDM, TDM and/or CDM scheme will be described with reference to FIG. 8. The left drawings of FIGS. 8(a) to 8(c) show CSI-RS patterns in the case of the normal CP and the right drawings thereof show CSI-RS patterns in the case of the extended CP. The locations of the CSI-RSs shown in FIGS. 8(a) to 8(c) are exemplary and the present invention is not limited thereto. The description of FIG. 8 is equally applicable to modified examples of the CSI-RS patterns of FIGS. 9 to 12.

As shown in FIG. 8(a), when four REs among 12 REs on a first OFDM symbol are used for CSI-RSs, two REs may be used for an antenna port index 0 (C0) and the remaining two REs may be used for an antenna port index 1 (C1). When four REs among 12 REs on a second OFDM symbol are used for CSI-RSs, two REs may be used for an antenna port index 2 (C2) and the remaining two REs may be used for an antenna port index 3 (C3). At this time, the CSI-RSs may be arranged at the same subcarrier locations in the two OFDM symbols (first and second OFDM symbols) on which the CSI-RSs are arranged. In such a CSI-RS pattern, the CSI-RSs (C0 and C1) for the antenna port indexes 0 and 1 are distinguished using the FDM scheme and the CSI-RSs (C2 and C3) for the antenna port indexes 2 and 3 are distinguished using the FDM scheme. The CSI-RSs (C0 and C2) for the antenna port indexes 0 and 2 are distinguished using the TDM scheme and the CSI-RSs (C1 and C3) for the antenna port indexes 1 and 3 are distinguished using the TDM scheme.

As shown in FIG. 8(b), when four REs among 12 REs on a first OFDM symbol are used for CSI-RSs, four REs may be used for antenna port indexes 0 to 3. When four REs among 12 REs on a second OFDM symbol are used for CSI-RSs, four REs may be used for antenna port indexes 0 to 3. CSI-RSs may be arranged at the same subcarrier locations in the two OFDM symbols (first and second OFDM symbols) on which the CSI-RSs are arranged. At this time, when a certain antenna port is defined in an RE allocated for the CSI-RS, the RE of the first OFDM symbol and the RE of the second OFDM symbol located at the same subcarrier location may be defined for different antenna ports. For example, if four REs allocated for CSI-RSs are sequentially allocated for antenna port indexes 0, 1, 2 and 3 within 12 REs of the first OFDM symbol (C0, C1, C2 and C3), four REs of the second OFDM symbol located at the same subcarrier locations may be sequentially allocated for the antenna port indexes 2, 3, 0 and 1 (C2, C3, C0 and C1). In such a CSI-RS pattern, the four antenna ports on one OFDM symbol may be distinguished using the FDM scheme. Alternatively, since the CSI-RSs for different antenna ports are arranged on different OFDM symbols, the CSI-RSs may be distinguished using the TDM scheme.

As shown in FIG. 8(c), RSs for two antenna ports may be multiplexed using the CDM scheme over two OFDM symbols at the same subcarrier location. That is, the CSI-RS (C0) for the antenna port index 0 may be arranged over two REs which are contiguous in the time domain, the CSI-RS (C1) for the antenna port index 1 may be arranged on the same RE, and C0 and C1 may be multiplexed using different code resources (e.g., an orthogonal cover code (OCC) having a length of 2). Similarly, the CSI-RS (C2) for the antenna port index 2 may be arranged over two REs which are contiguous in the time domain, the CSI-RS (C3) for the antenna port index 3 may be arranged on the same RE, and C2 and C3 may be multiplexed using different code resources. In such a method, the CSI-RSs arranged over the time domain are distinguished using orthogonal code resources. This method may be referred to as CDM-T multiplexing.

The method of multiplexing the CSI-RSs is not limited to the methods shown in FIGS. 8(a) to 8(c) and may be implemented by various methods such as TDM, FDM and/or CDM.

FIGS. 9 to 12 show various embodiments according to the above-described methods of arranging CSI-RSs. The left drawings of FIGS. 9 to 12 show CSI-RS patterns in the case of the normal CP and the right drawings thereof show CSI-RS patterns in the case of the extended CP.

Although all the CRSs for antenna port indexes 0 to 3 are shown in FIGS. 9 to 12, some of the antenna ports may be used. For example, only CRSs for the antenna port indexes 0 to 1 (two transmission antennas) may be used or only CRSs for the antenna port index 0 (single transmission antenna) may be used.

In FIGS. 9 to 12 associated with Embodiment 1, as described above, CSI-RSs are arranged on two OFDM symbols among OFDM symbols on which CRSs are arranged. That is, the CSI-RSs may be located on two OFDM symbols among fifth, eighth, ninth and twelfth OFDM symbols in the case of the normal CP and may be located on two OFDM symbols of fourth, seventh, eighth and tenth OFDM symbols in the case of the extended CP.

More specifically, in FIG. 9(a), CSI-RSs are located on fifth and eighth OFDM symbols in the case of the normal CP and are located on fourth and seventh OFDM symbols in the case of the extended CP. In FIG. 9(b), CSI-RSs are located on fifth and ninth OFDM symbols in the case of the normal CP and are located on fourth and eighth OFDM symbols in the case of the extended CP. In FIG. 9(c), CSI-RSs are located on fifth and twelfth OFDM symbols in the case of the normal CP and are located on fourth and tenth OFDM symbols in the case of the extended CP. In FIG. 10(a), CSI-RSs are located on eighth and ninth OFDM symbols in the case of the normal CP and are located on seventh and eighth OFDM symbols in the case of the extended CP. In FIG. 10(b), CSI-RSs are located on eighth and twelfth OFDM symbols in the case of the normal CP and are located on seventh and tenth OFDM symbols in the case of the extended CP. In FIG. 10(c), CSI-RSs are located on ninth and twelfth OFDM symbols in the case of the normal CP and are located on eighth and tenth OFDM symbols in the case of the extended CP.

In the embodiments of FIGS. 9 to 10, patterns in which the CSI-RSs are arranged on second, fifth, eighth and twelfth subcarriers in one OFDM symbol are shown.

OFDM symbols in which CSI-RSs are arranged in FIGS. 11(a), 11(b), 11(c), 12(a), 12(b) and 12(c) correspond to OFDM symbols in which CSI-RSs are arranged in FIGS. 9(a), 9(b), 9(c), 10(a), 10(b) and 10(c), except that the locations of subcarriers on which the CSI-RSs are arranged are different on each OFDM symbol. That is, in the embodiments of FIGS. 11 to 12, patterns in which CSI-RSs are arranged on first, fourth, seventh and tenth subcarriers in one OFDM symbol are shown.

Embodiment 2

According to Embodiment 2, CSI-RSs may be located on OFDM symbols on which the CRSs are not arranged. In the OFDM symbols on which the CRSs are not arranged, an OFDM symbol on which the DRS is located and an OFDM symbol on which only a data signal is located are present. In the case in which a subcarrier interval of a DRS is designed to be different from a subcarrier interval of a CSI-RS, if the DRS and the CSI-RS are located on the same OFDM symbol, collision therebetween may occur. Since RSs are transmitted with power higher than that of data, collision between RSs significantly decreases channel estimation performance using RSs as compared to collision between an RS and data. In the case in which CSI-RSs are arranged on an OFDM symbol on which a DRS is not arranged but only a data signal is located, even if collision between the CSI-RS and the data occurs, no problem occurs in channel estimation of a reception side using the CSI-RS. In consideration of this point, various CSI-RS arrangement patterns may be designed according to DRS arrangement patterns.

In the case of the normal CP, OFDM symbols on which CRSs are not arranged in one RB (14 OFDM symbols×12 subcarriers) include third, fourth, sixth, seventh, tenth, eleventh, thirteenth and fourteenth OFDM symbols. In the case of the extended CP, OFDM symbols on which CRSs are not arranged in one RB (12 OFDM symbols×12 subcarriers) include third, fifth, sixth, ninth, eleventh and twelfth OFDM symbols. In addition, the control channel (PDCCH) may be allocated to first to second (or third) OFDM symbols and the CSI-RSs are designed so as not to be arranged on these OFDM symbols. In consideration of the OFDM symbols on which the DRSs are located, for example, if a DRS pattern shown in FIG. 7 is used, the DRSs may be arranged on sixth, seventh, thirteenth and fourteenth OFDM symbols in the case of the normal CP. Similarly, the DRSs may be arranged on fifth, sixth, eleventh and twelfth OFDM symbols in the case of the extended CP. Accordingly, if the CSI-RSs are arranged on the OFDM symbols on which the DRSs are not located but only data signals are located, the CSI-RSs may be located on (third), fourth, tenth and eleventh OFDM symbols in the case of the normal CP and may be located on (third) ninth OFDM symbols in the case of the extended CP.

As described above, although the CSI-RSs may be arranged on the OFDM symbols on which the CRSs are not located, in case of using the CRSs for four transmission antennas, some of the REs allocated for the CRSs may be used for the CSI-RSs.

For example, in the second slot of one subframe, CSI-RSs may be arranged at RE locations (R2 and R3 of FIGS. 5 and 6) allocated for the CRSs in the OFDM symbol (the ninth OFDM symbol in the case of the normal CP and the eighth OFDM symbol in the case of the extended CP) on which the CRSs for the antenna port indexes 2 and 3 are located. This may be called reuse of CRS REs for the antenna ports 2 and 3.

In this case, if the CSI-RSs are arranged at the locations of the CRSs for the antenna port indexes 2 and 3 in the case of the extended CP, ambiguity may occur in analysis of the RSs in the legacy UE (e.g., the UE according to LTE release 8 or 9) which cannot analyze the CSI-RS. Accordingly, in the case of the normal CP, CRSs configured for a maximum of four transmission antenna ports may be specified to recognize a single transmission antenna, two transmission antennas and four transmission antennas. In contrast, in the case of the extended CP, only CRSs configured for a maximum of two transmission antenna ports may be specified to recognize only a single transmission antenna and two transmission antennas.

In a first slot of one subframe, CSI-RSs may be arranged at the RE locations allocated for the CRSs in the OFDM symbol (the second OFDM symbol) to which the CRSs for the antenna ports 2 and 3 are allocated.

Alternatively, CSI-RSs may be arranged at the RE locations allocated for the CRSs in one of the OFDM symbols (the first, fifth, eighth and twelfth OFDM symbols of one subframe in the case of the normal CP) to which the CRSs for the antenna port indexes 0 and 1 are allocated.

The OFDM symbols on which the CRI-RSs are arranged may be determined using the above-described method and the CSI-RSs may be arranged on two OFDM symbols of one subframe. The CSI-RSs may be arranged at the same interval in the frequency domain. From the viewpoint of one antenna port, the RSs may be arranged at an interval of 6 REs (that is, an interval of six subcarriers) in the frequency domain and the RE, on which the RSs for one antenna port are arranged, may be arranged to be separated from the RE, on which the RSs for another antenna port are arranged, by an interval of 3 REs in the frequency domain.

In one RB (14 OFDM symbols×12 subcarriers in the case of the normal CP or 12 OFDM symbols×12 subcarriers in the case of the extended CP), eight REs may be used for CSI-RSs.

Two OFDM symbols may be used in one RB and CSI-RSs may be arranged on four REs in one OFDM symbol.

Hereinafter, a method of arranging CSI-RSs using an FDM, TDM and/or CDM scheme will be described with reference to FIG. 13. The left drawings of FIGS. 13(*a*) to 13(*c*) show CSI-RS patterns in the case of the normal CP and the right drawings thereof show CSI-RS patterns in the case of the extended CP. The locations of the CSI-RSs shown in FIGS. 13(*a*) to 13(*c*) are exemplary and the present invention is not limited thereto. The description of FIG. 13 is equally applicable to modified examples of the CSI-RS patterns of FIGS. 14 to 36.

Figure 13:
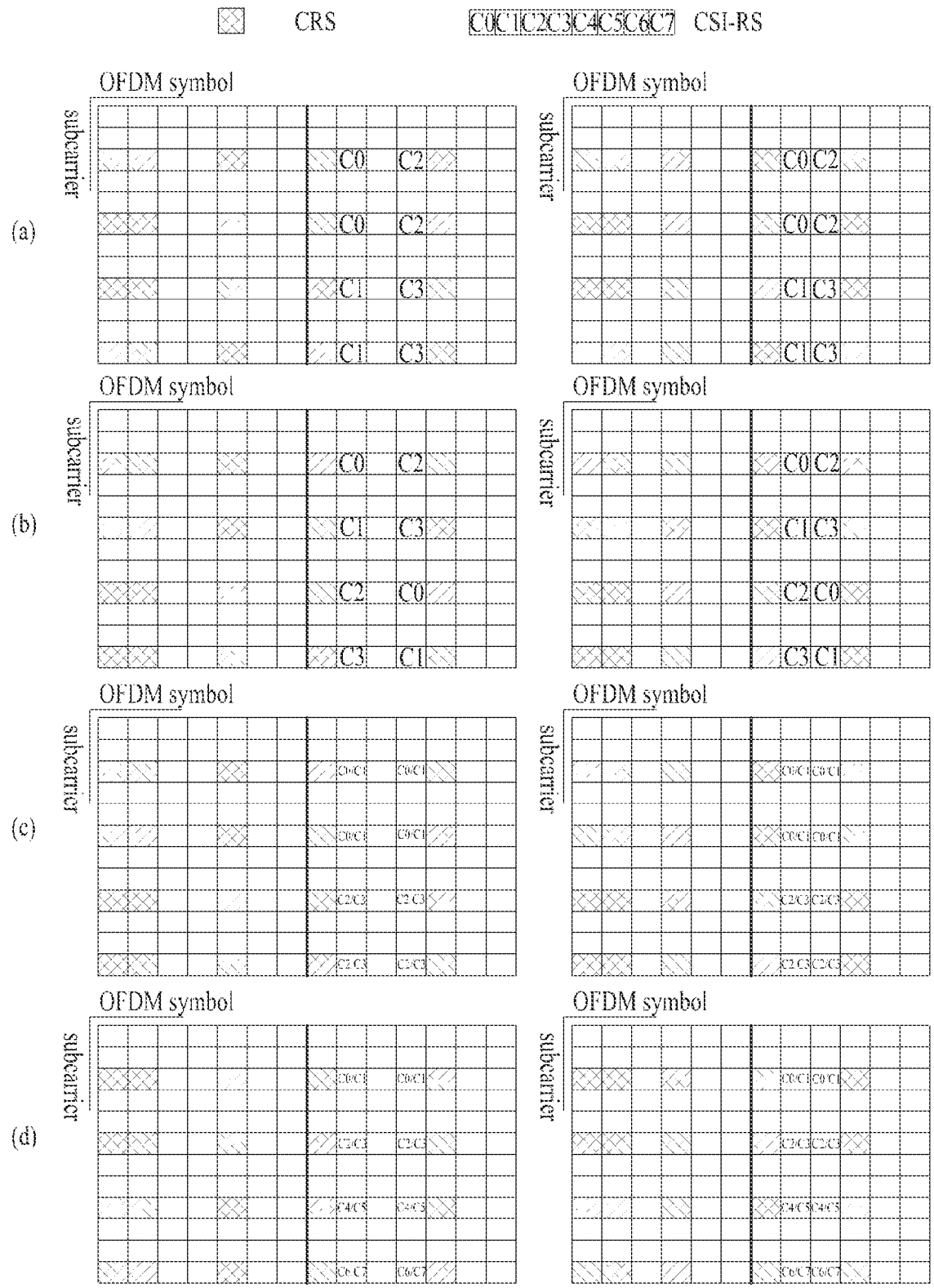
FIG. 13 is a diagram showing a method of arranging CSI-RSs using an FDM, TDM and/or CDM scheme.

As shown in FIG. 13(*a*), when four REs among 12 REs on a first OFDM symbol are used for CSI-RSs, two REs may be used for an antenna port index 0 (C0) and the remaining two REs may be used for an antenna port index 1 (C1). When four REs among 12 REs on a second OFDM symbol are used for CSI-RSs, two REs may be used for an antenna port index 2 (C2) and the remaining two REs may be used for an antenna port index 3 (C3). At this time, the CSI-RSs may be arranged at the same subcarrier locations in the two OFDM symbols (first and second OFDM symbols) on which the CSI-RSs are arranged. In such a CSI-RS pattern, the CSI-RSs (C0 and C1) for the antenna port indexes 0 and 1 are distinguished using the FDM scheme and the CSI-RSs (C2 and C3) for the antenna port indexes 2 and 3 are distinguished using the FDM scheme. The CSI-RSs (C0 and C2) for the antenna port indexes 0 and 2 are distinguished using the TDM scheme and the CSI-RSs (C1 and C3) for the antenna port indexes 1 and 3 are distinguished using the TDM scheme.

As shown in FIG. 13(*b*), when four REs among 12 REs on a first OFDM symbol are used for CSI-RSs, four REs may be used for antenna port indexes 0 to 3. When four REs of 12 REs on a second OFDM symbol are used for CSI-RSs, four REs may be used for antenna port indexes 0 to 3. CSI-RSs may be arranged at the same subcarrier locations in the two OFDM symbols (first and second OFDM symbols) on which the CSI-RSs are arranged. At this time, when a certain antenna port is defined in an RE allocated for the CSI-RS, the RE of the first OFDM symbol and the RE of the second OFDM symbol located at the same subcarrier location may be defined for different antenna ports. For example, if four REs allocated for CSI-RSs are sequentially allocated for antenna port indexes 0, 1, 2 and 3 within 12 REs of the first OFDM symbol (C0, C1, C2 and C3), four REs of the second OFDM symbol located at the same subcarrier locations may be sequentially allocated for the antenna port indexes 2, 3, 0 and 1 (C2, C3, C0 and C1). In such a CSI-RS pattern, the four antenna ports on one OFDM symbol may be distinguished using the FDM scheme. Alternatively, since the CSI-RSs for different antenna ports are arranged on different OFDM symbols, the CSI-RSs may be distinguished using the TDM scheme.

As shown in FIG. 13(*c*), RSs for two antenna ports may be multiplexed using the CDM scheme over two OFDM symbols at the same subcarrier location. That is, the CSI-RS (C0) for the antenna port index 0 may be arranged over two REs located on different OFDM symbols in the same subcarrier, the CSI-RS (C1) for antenna port index 1 may be arranged on the same RE, and C0 and C1 may be multiplexed using different code resources (e.g., an OCC having a length of 2). Similarly, the CSI-RS (C2) for the antenna port index 2 may be arranged over two REs located on different OFDM symbols in the same subcarrier, the CSI-RS (C3) for the antenna port index 3 may be arranged on the same RE, and C2 and C3 may be multiplexed using different code resources. In such a method, the CSI-RSs arranged over the time domain are distinguished using orthogonal code resources. This method may be called a CDM-T multiplexing method.

FIG. 13(*d*) shows a pattern in which CSI-RSs for eight antenna ports may be multiplexed using the CDM scheme. The CSI-RS (C0) for the antenna port index 0 may be arranged over two REs located on different OFDM symbols in the same subcarrier, the CSI-RS (C1) for the antenna port index 1 may be arranged on the same RE, and C0 and C1 may be multiplexed using different code resources (e.g., an OCC having a length of 2). In addition, the CSI-RS (C2) for antenna port index 2 may be arranged over two REs located on different OFDM symbols in the same subcarrier, the CSI-RS (C3) for the antenna port index 3 may be arranged on the same RE, and C2 and C3 may be multiplexed using different code resources. In addition, the CSI-RS (C4) for the antenna port index 4 may be arranged over two REs located on different OFDM symbols in the same subcarrier, the CSI-RS (C5) for the antenna port index 5 may be arranged on the same RE, and C4 and C5 may be multiplexed using different code resources. In addition, the CSI-RS (C6) for the antenna port index 6 may be arranged over two REs located on different OFDM symbols in the same subcarrier, the CSI-RS (C7) for the antenna port index 7 may be arranged on the same RE, and C6 and C7 may be multiplexed using different code resources.

The method of multiplexing the CSI-RSs is not limited to the methods shown in FIGS. 13(*a*) to 13(*c*) and may be implemented by various methods such as TDM, FDM and/or CDM.

FIGS. 14 to 36 show various embodiments according to the above-described methods of arranging CSI-RSs. The left drawings of FIGS. 14 to 36 show CSI-RS patterns in the case of the normal CP and the right drawings thereof show CSI-RS patterns in the case of the extended CP.

Although all the CRSs for antenna port indexes 0 to 3 are shown in FIGS. 14 to 36, some of the antenna ports may be used. For example, only CRSs for the antenna port indexes 0 to 1 (two transmission antennas) may be used or only CRSs for the antenna port index 0 (single transmission antenna) may be used.

The CSI-RS patterns shown in FIGS. 14 to 36 may be frequency-shifted. Frequency shifting may be performed on a per cell basis. That is, the locations of the CRI-RSs may be shifted in the frequency domain on a per cell basis. For example, if the CSI-RSs are located at every third subcarrier, a first cell may be arranged on a 3k-th subcarrier, a second cell may be arranged on a (3k+1)-th subcarrier, and a third cell may be arranged on a (3k+2)-th subcarrier. The CSI-RS and the CRS may be frequency-shifted with the same offset.

If the CSI-RSs are located at the same subcarrier locations as the subcarrier, on which the CRSs are located, in the CSI-RS patterns shown in FIGS. 14 to 36, the CSI-RSs may be defined at the locations shifted by one subcarrier or two subcarriers.

Hereinafter, the CSI-RS patterns shown in FIGS. 14 to 19 will first be described and the CSI-RS patterns shown in FIGS. 20 to 36 will then be described.

As shown in FIGS. 14 to 19, the CSI-RSs may be arranged on two OFDM symbols in one subframe and may be arranged at four subcarrier locations in one OFDM symbol. Thus, the CSI-RSs may be arranged on a total of eight REs.

Both of the two OFDM symbols on which the CSI-RSs are arranged may be OFDM symbols on which the CRSs and DRSs are not arranged (the case of the normal CP of FIGS. 15(*a*) and 15(*b*) and FIG. 18(*a*)).

Alternatively, four REs in one of the two OFDM symbols on which the CSI-RSs are arranged may be arranged in a manner of reusing the REs on which the existing CRSs are arranged (the case of the extended CP of FIGS. 14(*a*), 14(*b*), 14(*c*), 15(*c*), 16(*b*), 17(*a*), 17(*b*) and 18(*a*), in the case of the normal CP of FIGS. 18(*b*), and 18(*c*)). In particular, in FIG. 17(*b*), if the REs to which the CRSs for the antenna port indexes 2 and 3 are allocated are reused for the CSI-RSs, up to the CRSs supporting two transmission antennas may be specified.

Alternatively, eight REs in the two OFDM symbols on which the CSI-RSs are arranged may be arranged in a manner of reusing the REs on which the existing CRSs are arranged (the case of the extended CP of FIGS. 16(*a*), 16(*b*), 17(*c*) and 18(*b*)).

The embodiments of FIGS. 19(*a*) and 19(*b*) correspond to modified examples in which the frequency locations are shifted by one subcarrier or two subcarriers in the CSI-RS pattern of FIG. 14(*a*).

Next, the CSI-RS patterns of FIGS. 20 to 36 will be described. In the embodiments of FIGS. 20 to 36, the CSI-RSs may be arranged on two OFDM symbols in one subframe and may be arranged at four subcarrier locations in one OFDM symbol. Thus, the CSI-RSs may be arranged on a total of eight REs.

Figure 29:
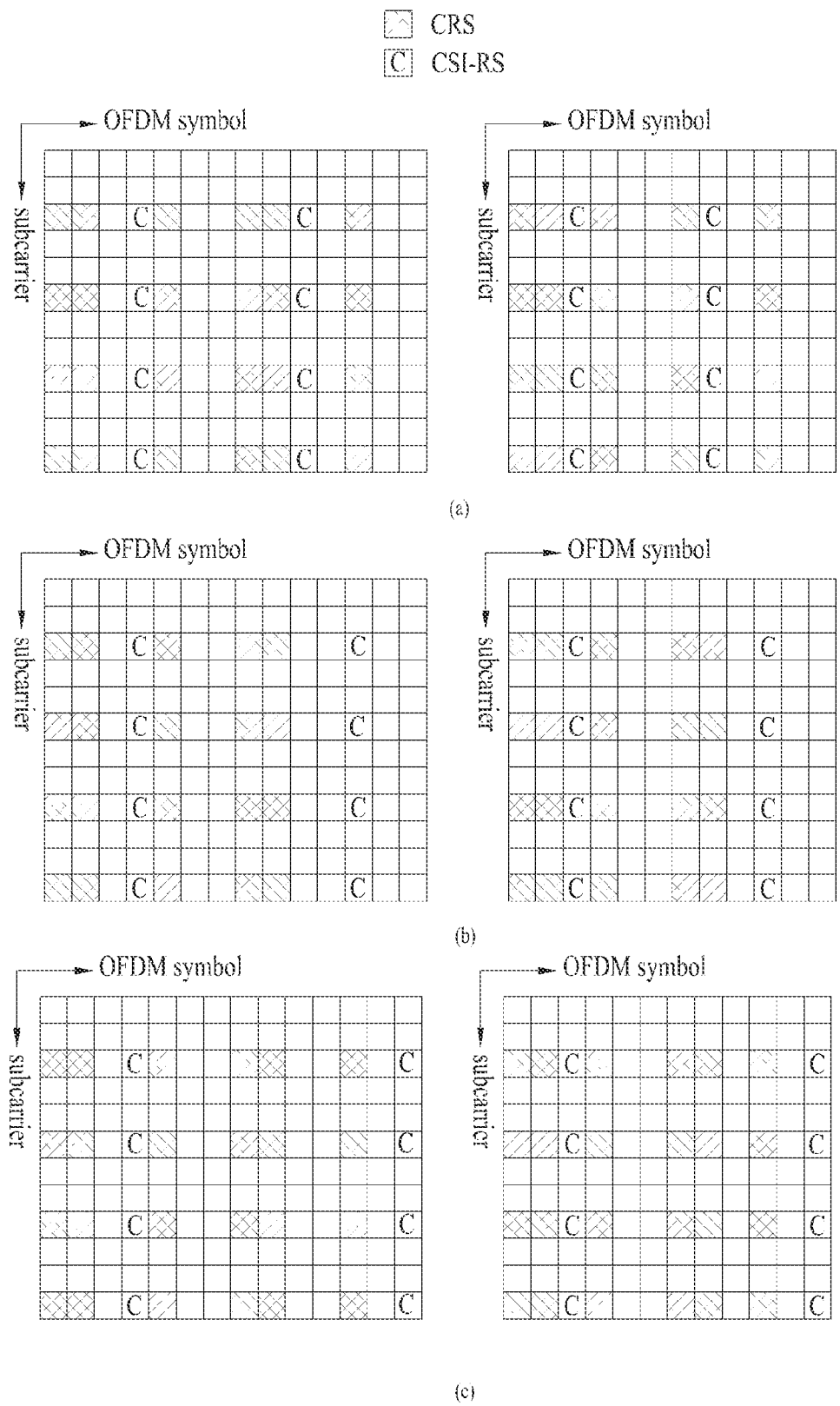
Figure 36:
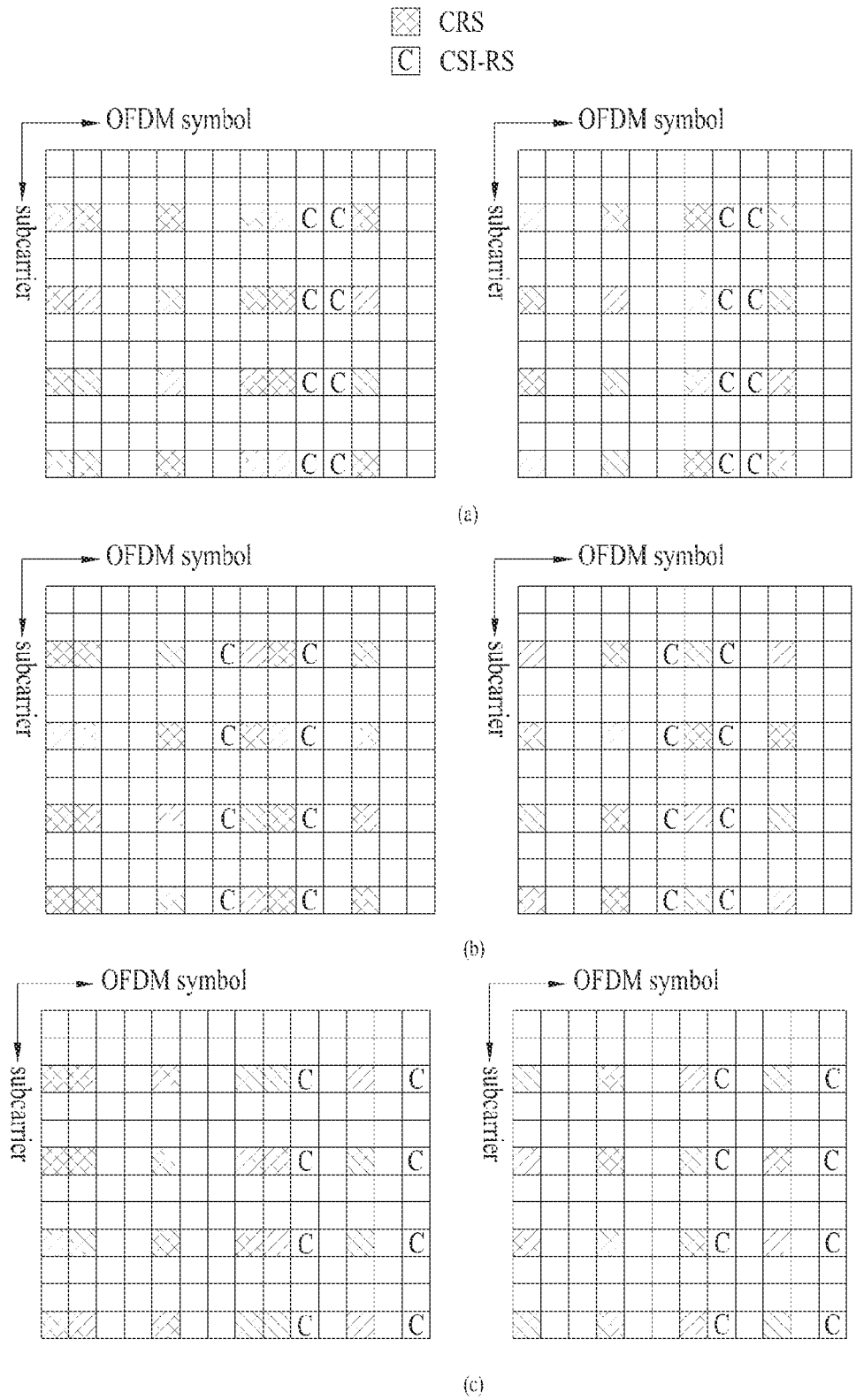

Both of the two OFDM symbols on which the CSI-RSs are arranged may be OFDM symbols on which the CRSs and DRSs are not arranged (the case of the normal CP of FIG. 29(*a*) and the case of the normal CP of FIG. 36(*a*)).

Figure 25:
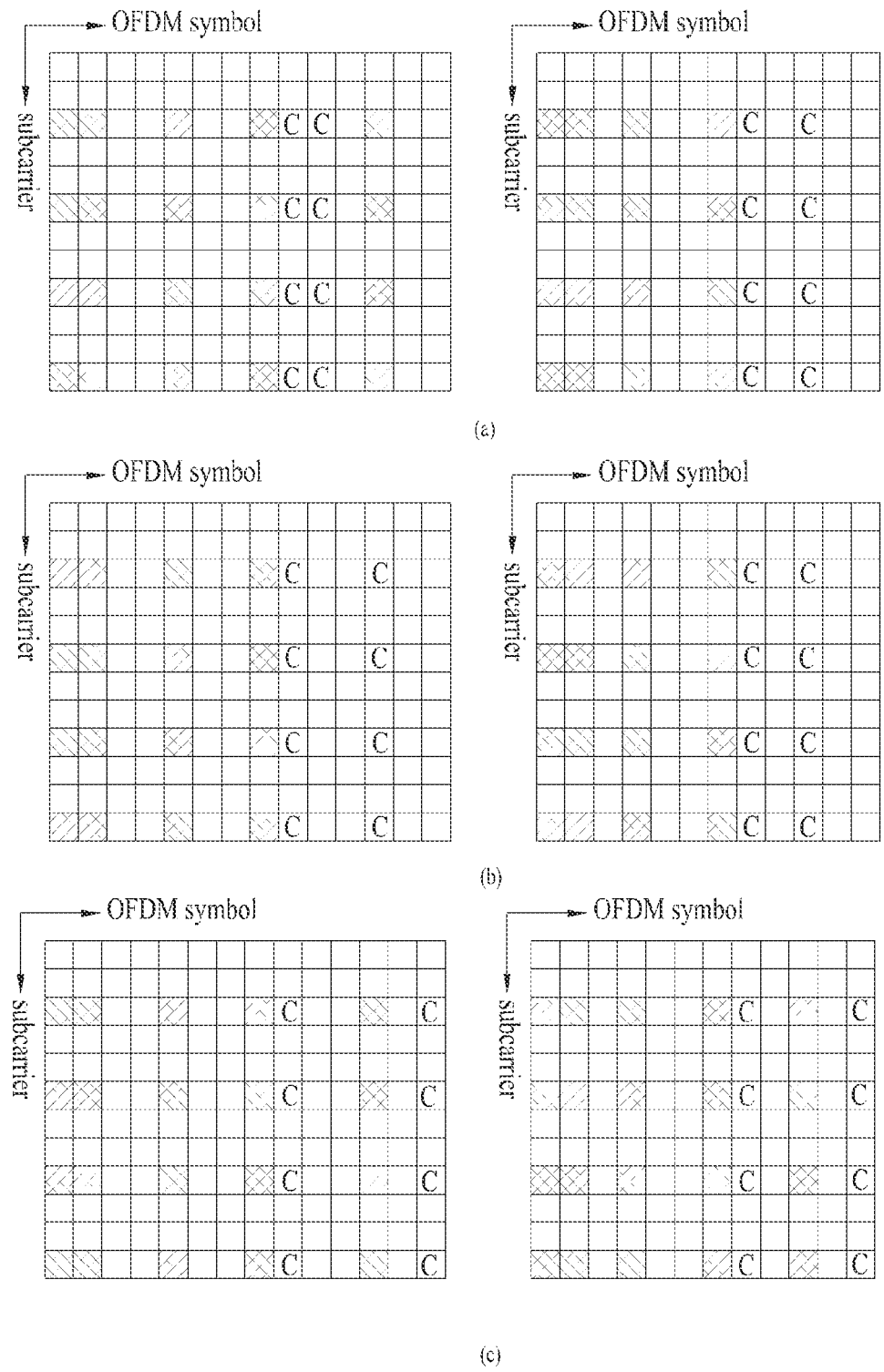
Figure 26:
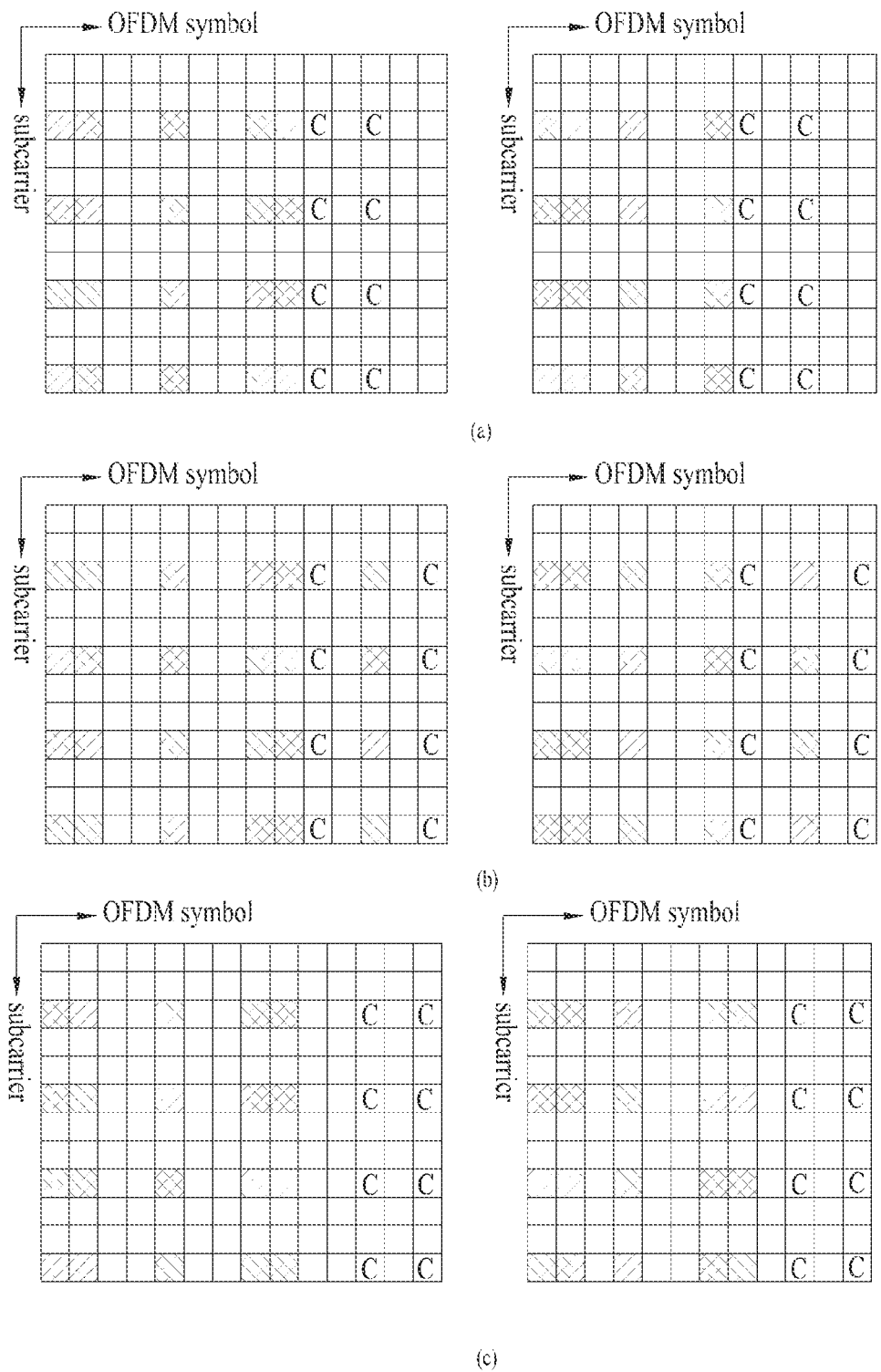
Figure 28:
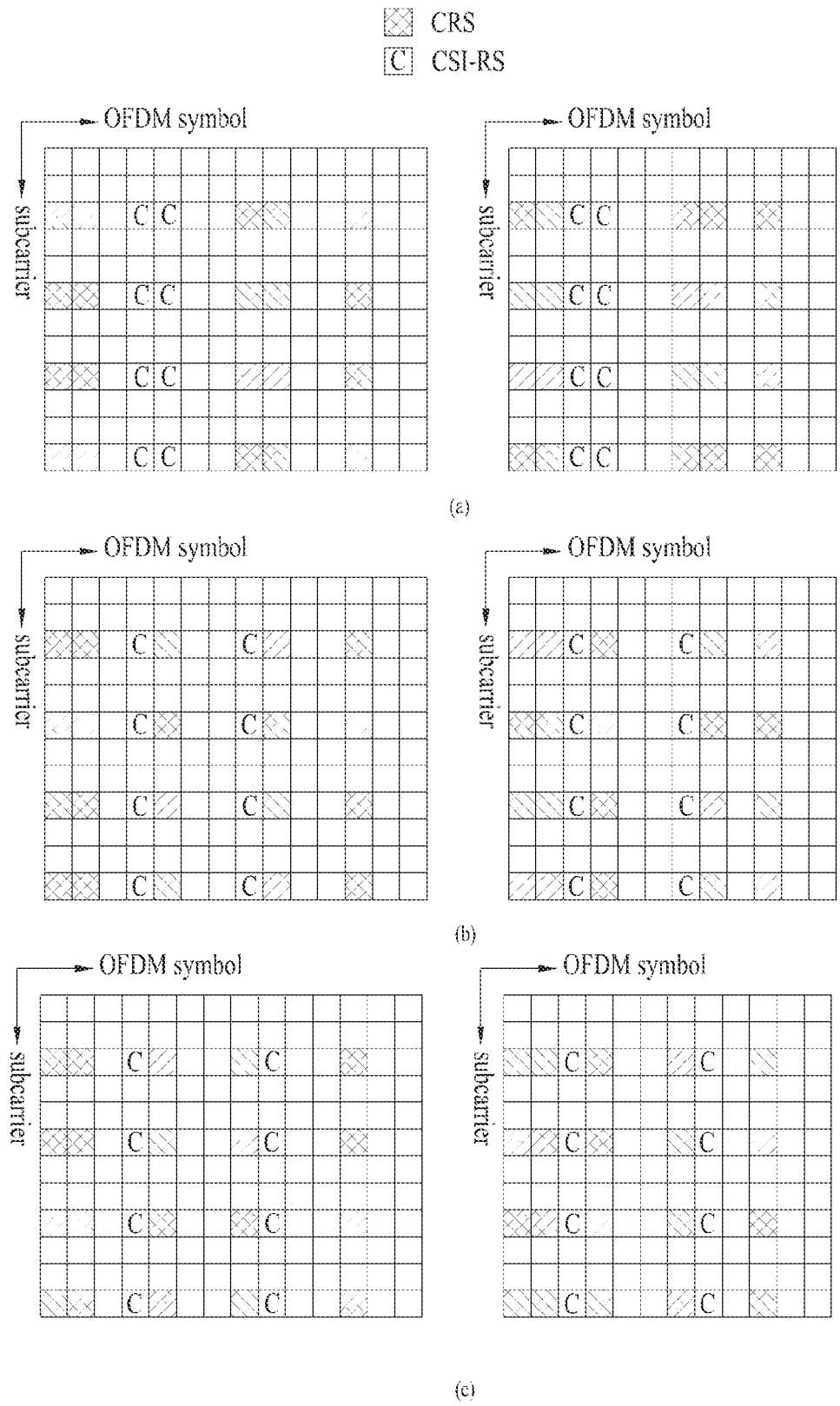
Figure 33:
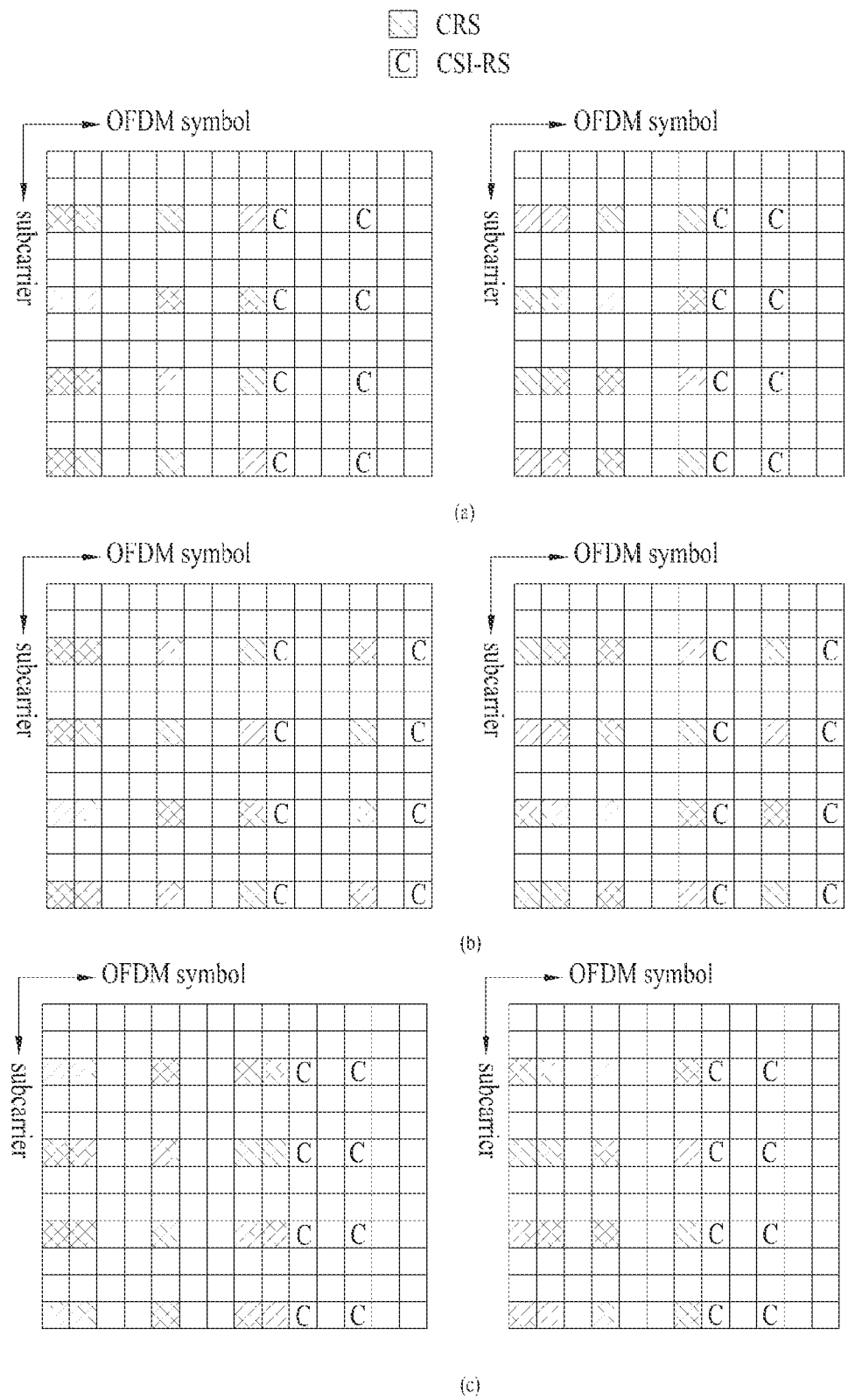

Alternatively, one of the two OFDM symbols on which the CSI-RSs are arranged is an OFDM symbol on which the CRSs and DRSs are not arranged and four REs on the remaining one OFDM symbol may be arranged in a manner of reusing the REs on which the existing CRSs are arranged (the case of the normal CP of FIGS. 21(*a*) and 24(*a*), the case of the normal CP of FIG. 25(*a*), the case of the normal CP of FIG. 26(*a*), the case of the extended CP of FIGS. 28(*a*), 28(*b*), 28(*c*) and 29(*a*), the case of the normal CP of FIGS. 29(*b*), 30(*c*) and 32(*a*), the case of the normal CP of FIG. 33(*c*) and the case of the extended CP of FIG. 36(*a*)).

Alternatively, one of the two OFDM symbols on which the CSI-RSs are arranged is an OFDM symbol on which the CRSs and DRSs are not arranged and the remaining OFDM symbol may be an OFDM symbol on which DRSs are arranged (the case of the normal CP of FIG. 22(*c*), the case of the normal CP of FIG. 26(*b*), the case of the normal CP of FIGS. 29(*c*) and 34(*a*), the case of the normal CP of FIG. 36(*b*) and the case of the normal CP of FIG. 36(*c*)).

Alternatively, one of the two OFDM symbols on which the CSI-RSs are arranged is an OFDM symbol on which the DRSs are arranged and four REs on the remaining one OFDM symbol may be arranged in a manner of reusing the RES on which the existing CRSs are arranged (the case of the extended CP of FIGS. 20(*a*), 21(*c*), 22(*a*), 22(*b*) and 22(*c*), the case of the extended CP of FIGS. 23(*a*), 24(*c*), 25(*c*) and 26(*b*), the case of the extended CP of FIGS. 26(*c*), 31(*b*), 32(*c*), 33(*b*) and 34(*a*), the case of the extended CP of FIGS. 34(*b*) and 36(*b*), and the case of the extended CP of FIG. 36(*c*)).

Alternatively, both of the OFDM symbols on which the CRI-RSs are arranged may be OFDM symbols on which the DRSs are arranged (FIG. 23(*b*)).

Figure 30:
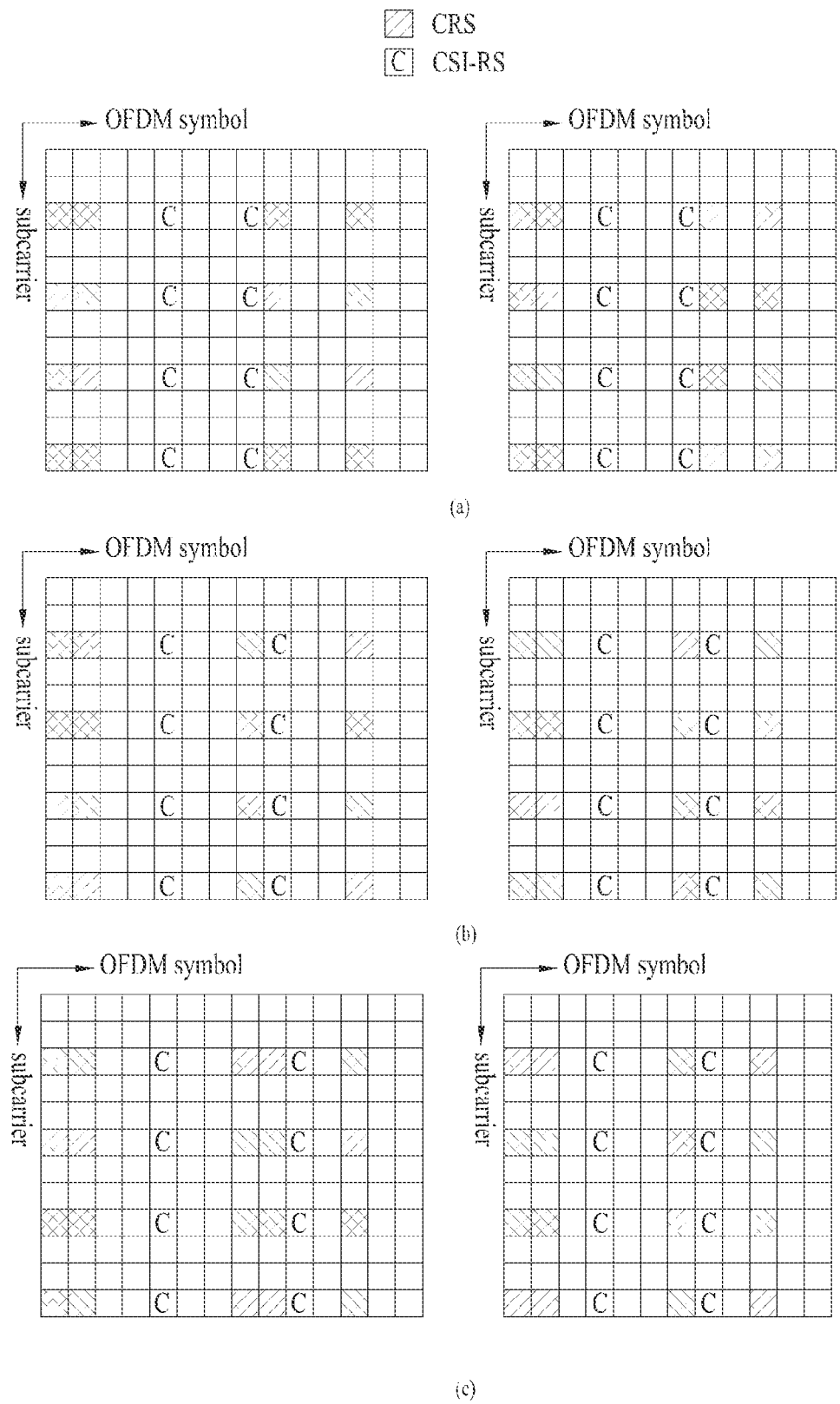
Figure 31:
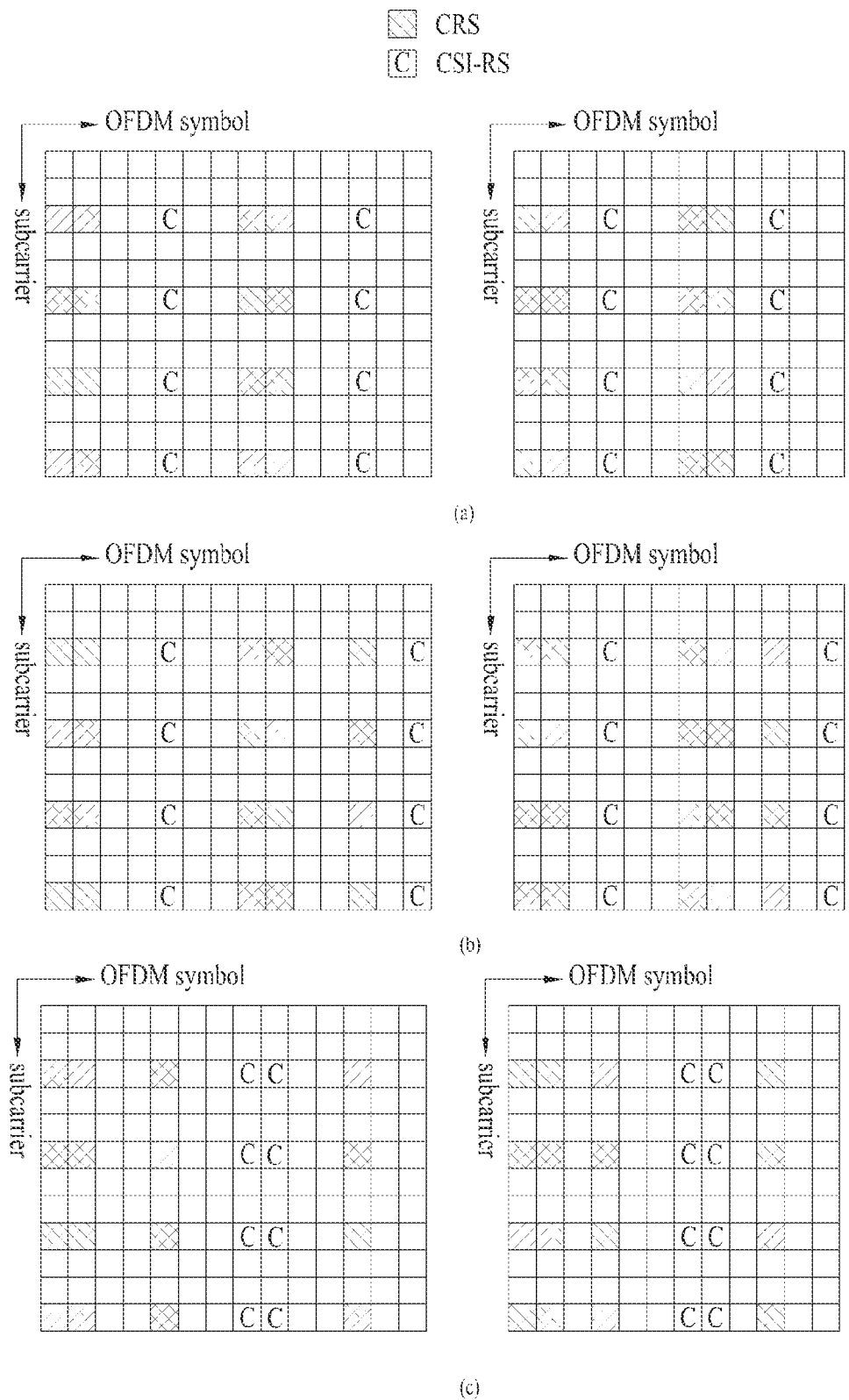
Figure 32:
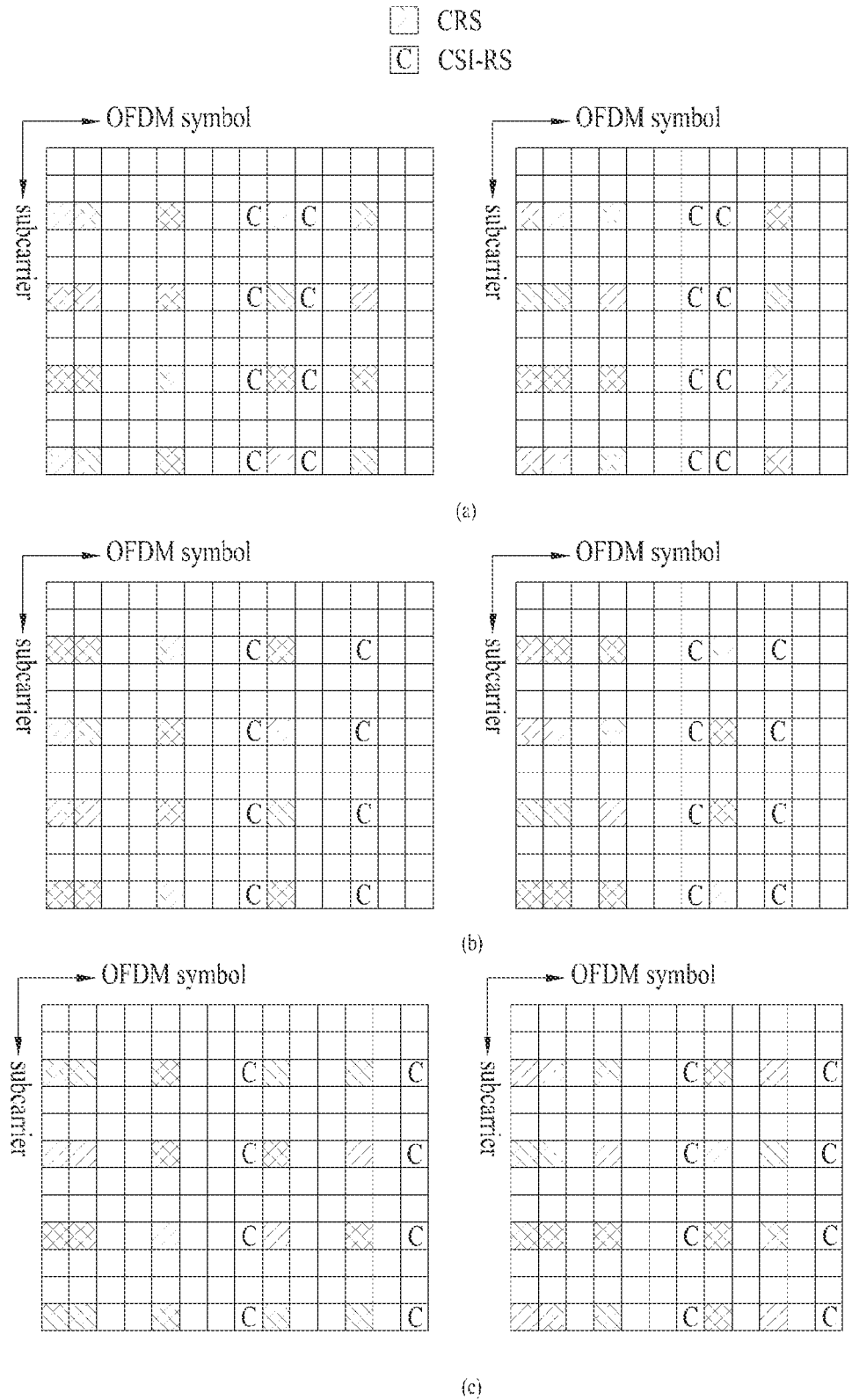

Alternatively, eight REs on the two OFDM symbols on which the CSI-RSs are arranged may be arranged in a manner of reusing the RES on which the existing CRSs are arranged (the case of the extended CP of FIGS. 20(*b*), 20(*c*), 21(*b*), 23(*c*) and 24(*a*), the case of the extended CP of FIGS. 24(*b*) and 25(*a*), the case of the extended CP of FIGS. 25(*b*) and 26(*a*), the case of the extended CP of FIGS. 30(*a*), 30(*b*) and 30(*c*), the case of the extended P of FIGS. 31(*a*), 31(*c*) and 32(*a*), and the case of the extended CP of FIGS. 32(*b*), 33(*a*) and 33(*c*)).

The embodiments of FIGS. 27(*a*) and 27(*b*) correspond to modified examples in which the frequency locations are shifted from the CSI-RS pattern of FIG. 22(*c*) by one subcarrier or two subcarriers. The embodiments of FIGS. 35(*a*) and 35(*b*) correspond to modified examples in which the frequency locations are shifted from the CSI-RS pattern of FIG. 34(*a*) by one subcarrier or two subcarriers.

Embodiment 3

Embodiment 3 relates to a method of multiplexing CSI-RSs for a plurality of antenna ports based on the various examples of the locations of the CSI-RSs (that is, the locations of the OFDM symbols on which the CSI-RSs are arranged) on the time axis described in the above-described Embodiments 1 and 2. The frequency locations of the CSI-RSs described in the embodiments of FIGS. 37 and 38 are applicable to both the normal CP and the extended CP of Embodiments 1 and 2 for the locations of the CSI-RSS on the time axis.

As shown in FIG. 37, in Embodiment 3, it is assumed that eight REs (two OFDM symbols and four REs of one OFDM symbol) are used for CSI-RSs in one RB (one subframe of the time domain×12 subcarriers of the frequency domain). In Pattern 1 of FIG. 37(*a*), the locations of two OFDM symbols may correspond to various OFDM symbol locations proposed in the above-described Embodiments 1 and 2. The CSI-RSs located on the respective OFDM symbols may be arranged at an interval of 3 REs. In addition, the locations of the CSI-RSs shown in Pattern 1 of FIG. 37(*a*) may be shifted by 1 RE (Pattern 2) or 2 REs (Pattern 3) in the frequency domain.

Figure 38:
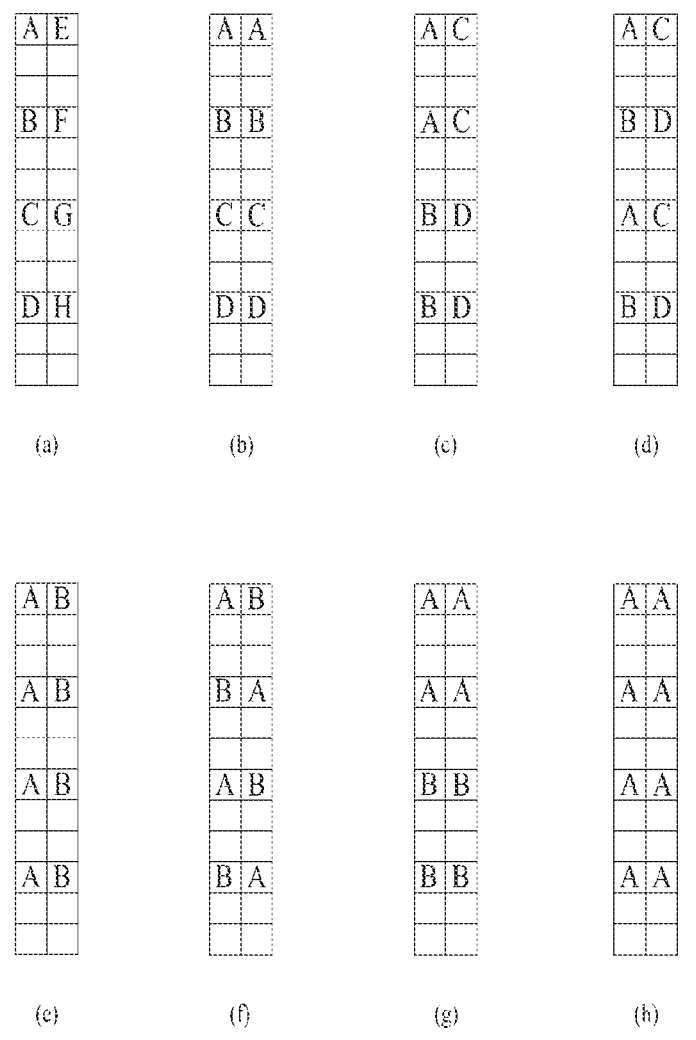

FIG. 37(*b*) shows a detailed example in which frequency shifting is performed with respect to the pattern in which the CSI-RSs are arranged using the CDM-T scheme as shown in FIG. 38(*b*). FIG. 37(*c*) shows an example in which the pattern in which the CSI-RSs are arranged using the CDM-T scheme as shown in FIG. 38(*b*) is arranged on an RB. More specifically, two OFDM symbols may be arranged on OFDM symbol indexes 9 and 10 in one RB in the case of the normal CP and may be arranged on OFDM symbol indexes 7 and 8 in the case of the extended CP.

In order to acquire channels of N transmission antennas using the CSI-RSs, independent frequency/time/code resources for the N antenna ports may be allocated. That is, the CSI-RSs for the N antenna ports may be multiplexed using the FDM/TDM/CDM scheme.

FIG. 38 shows various embodiments of the method of multiplexing CSI-RSs. The locations of the two OFDM symbols on which the CSI-RSs are arranged as shown in FIG. 38 may correspond to various OFDM symbol locations proposed in the above-described Embodiments 1 and 2. Although omitted for clarity of description, even in the various embodiments described with reference to FIG. 38, similarly to Patterns 1 to 3 of FIG. 37(*a*), the locations of the REs to which the CSI-RSs are mapped may be frequency-shifted by 1 RE or 2 REs.

In the embodiment of FIG. 38(*a*), the CSI-RSs (A, B, C, D, E, F, G and H) for eight antenna ports may be mapped to eight REs, respectively. The antenna ports A, B, C and D may be distinguished using the FDM scheme. In addition, the antenna ports E, F, G and H may be distinguished using the FDM scheme. A first antenna port group (A, B, C and D) and a second antenna port group (E, F, G and H) may be distinguished using the TDM scheme.

In the embodiment of FIG. 38(b), two of the eight antenna ports may be multiplexed using the CDM-T scheme. For example, the antenna ports 0 and 1 may be spread in the time domain using an orthogonal code having a length of 2 (e.g., Walsh code, DFT code, random code, etc.). That is, the CSI-RSs for the antenna port indexes 0 and 1 are spread by code resources in the time domain and are arranged on the same REs (A of the first OFDM symbol and A of the second OFDM symbol). Although the antenna ports 0 and 1 are described as an example, the multiplexing method using the CDM-T scheme is applicable to any two of the eight antenna ports. The eight antenna ports may be grouped into four antenna groups (that is, A, B, C and D) each including two antenna ports and the four antenna groups may be distinguished using the FDM scheme.

In the embodiment of FIG. 38(c), two of the eight antenna ports may be multiplexed using the CDM-F scheme. For example, the antenna ports 0 and 1 may be spread in the frequency domain using an orthogonal code having a length of 2 (e.g., Walsh code, DFT code, random code, etc.). That is, the CSI-RSs for the antenna port indexes 0 and 1 are spread by code resources in the frequency domain and are arranged on the same REs (A and A of the first OFDM symbol). Although the antenna ports 0 and 1 are described as an example, the multiplexing method using the CDM-F scheme is applicable to any two of the eight antenna ports. The eight antenna ports may be grouped into four antenna groups (that is, A, B, C and D) each including two antenna ports and the four antenna groups may be distinguished using the FDM/TDM scheme.

FIG. 38(d) shows an embodiment in which two of the eight antenna ports are multiplexed using the CDM-F scheme similarly to FIG. 38(c) and four antenna groups are multiplexed using the FDM/TDM scheme, which is different from the embodiment of FIG. 38(c) in that the REs (e.g., A and A) to which the CDM-F scheme is applied are located at an interval of 6 REs, not at an interval of 3 REs).

In the embodiment of FIG. 38(e), four of the eight antenna ports may be multiplexed using the CDM-F scheme. For example, the antenna ports 0, 1, 2 and 3 may be spread in the frequency domain using an orthogonal code having a length of 4 (e.g., Walsh code, DFT code, random code, etc.). That is, the CSI-RSs for the antenna port indexes 0, 1, 2 and 3 are spread by code resources in the frequency domain and are arranged on the same REs (A, A, A and A of the first OFDM symbol). Although the antenna ports 0, 1, 2 and 3 are described as an example, the multiplexing method using the CDM-F scheme is applicable to any four of the eight antenna ports. The eight antenna ports may be grouped into two antenna groups (that is, A and B) each including four antenna ports and the two antenna groups may be distinguished using the TDM scheme.

In the embodiment of FIG. 38(f), four of the eight antenna ports may be multiplexed using the CDM scheme. For example, the antenna ports 0, 1, 2 and 3 may be spread in the time domain and the frequency domain using an orthogonal code (e.g., Walsh code, DFT code, random code, etc.). That is, the CSI-RSs for the antenna port indexes 0, 1, 2 and 3 are spread by code resources in the time domain and the frequency domain and are arranged on the same REs (A, A, A and A of the first and second OFDM symbols). Although the antenna ports 0, 1, 2 and 3 are described as an example, the multiplexing method using the CDM scheme is applicable to any four of the eight antenna ports. The eight antenna ports may be grouped into two antenna groups (that is, A and B) each including four antenna ports and the two antenna groups may be distinguished using the FDM/TDM scheme.

In the embodiment of FIG. 38(g), four of the eight antenna ports may be multiplexed using the CDM-T/F scheme. For example, the antenna ports 0, 1, 2 and 3 may be spread in the time domain and the frequency domain using an orthogonal code (e.g., Walsh code, DFT code, random code, etc.). That is, the CSI-RSs for the antenna port indexes 0, 1, 2 and 3 are spread by code resources in the time domain and the frequency domain and are arranged on the same REs (A, A, A and A of the first and second OFDM symbols). Although the antenna ports 0, 1, 2 and 3 are described as an example, the multiplexing method using the CDM scheme is applicable to any four of the eight antenna ports. The eight antenna ports may be grouped into two antenna groups (that is, A and B) each including four antenna ports and the two antenna groups may be distinguished using the FDM scheme.

In the embodiment of FIG. 38(h), the eight antenna ports may be multiplexed using the CDM scheme. For example, the antenna ports 0, 1, 2, 3, 4, 5, 6 and 7 may be spread in the time domain and the frequency domain using an orthogonal code (e.g., Walsh code, DFT code, random code, etc.). That is, the CSI-RSs for the antenna port indexes 0, 1, 2, 3, 4, 5, 6 and 7 are spread by code resources in the time domain and the frequency domain and are arranged on the same REs (A, A, A, A, A, A, A and A of the first and second OFDM symbols). Alternatively, the CSI-RSs for the antenna ports may be spread in the frequency domain and the same signal may be transmitted in the time domain.

In the above-described embodiments, the CSI-RS patterns defined for eight antenna ports may be used for CSI-RSs for four antenna ports or CSI-RSs for two antenna ports as the same patterns (that is, the CSI-RSs are arranged at the same RE locations). At this time, all REs of the CSI-RS pattern for eight antenna ports may be used or a subset of some of the antenna ports may be used. This property may be called a nested property.

The CSI-RS pattern in the case of the extended CP may be defined in a state in which CRSs for two transmission antennas are arranged. That is, the above-described various CSI-RS patterns are applicable to the extended CP on the assumption that a CRS pattern indicated by R2 and R3 (third and fourth antenna ports) is not used and only a CRS pattern indicated by R0 and R1 (first and second antenna ports) is used in FIG. 6. The UE may recognize that the base station uses two antenna ports via a previously defined PBCH.

Alternatively, in a state in which the UE recognizes that the base station uses four transmission antennas via a PBCH, CRSs indicated by R2 and R3 of a second slot of one subframe of FIG. 6 may not be used and symbols corresponding thereto may be used as symbols for transmitting CSI-RSs. In addition, CRSs indicated by R2 and R3 of a second slot of one subframe may not be used and RE locations of the corresponding CRSs may be reused for CSI-RSs.

Embodiment 4

Embodiment 4 relates to additional embodiments of a CSI-RS pattern.

Figure 39:
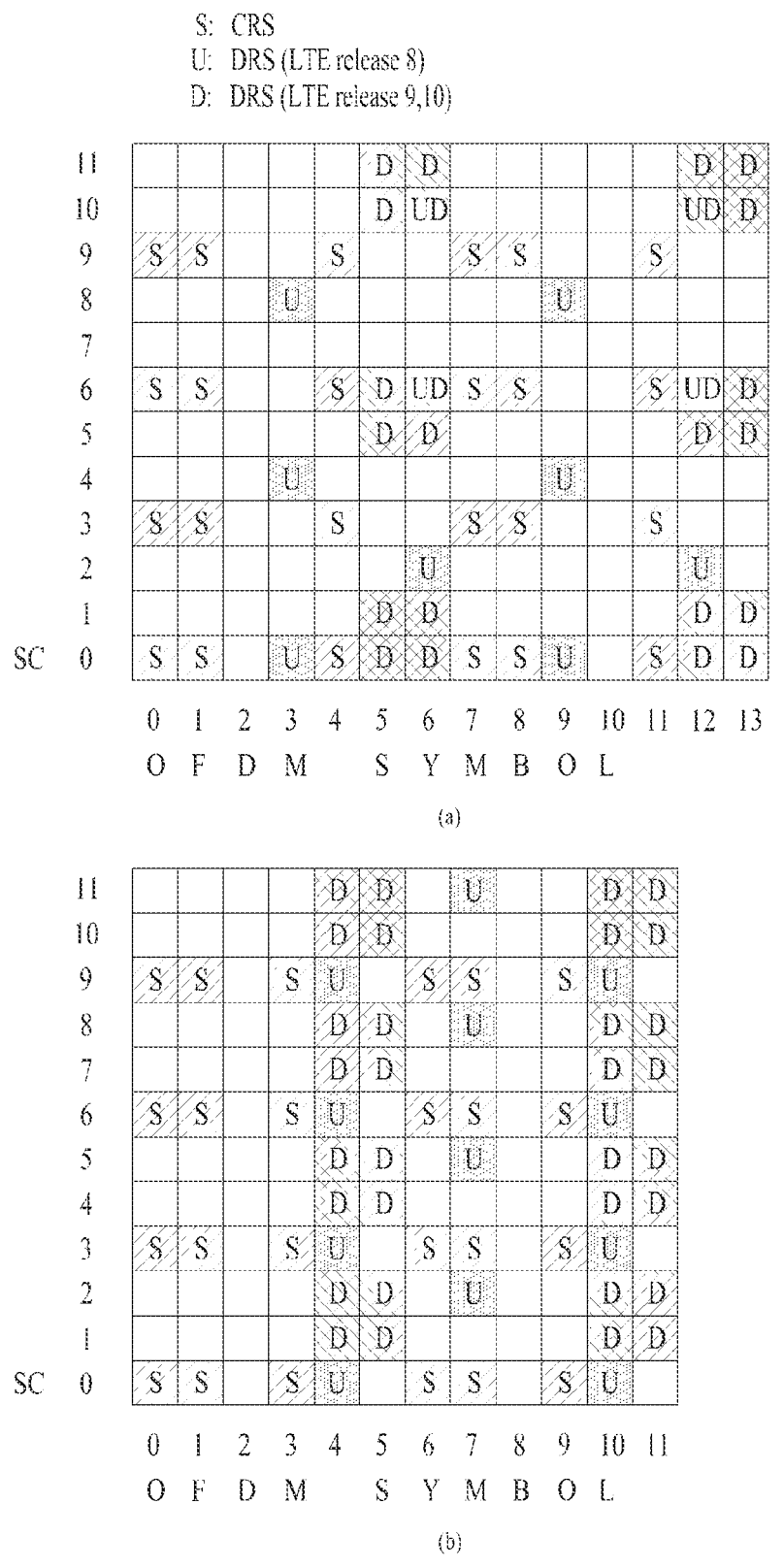

FIG. 39 is a diagram showing a pattern of other RSs to be considered in order to determine a CSI-RS pattern. In FIG. 39, S denotes a cell-specific RS (that is, CRS), U denotes a UE-specific RS (that is, DRS) defined in the conventional LTE standard (e.g., LTE release 8), and D denotes a UE-specific RS (DRS) which is newly defined in the LTE standard (e.g., release 9 and 10).

Locations of various types of RSs allocated to one RE (one subframe in the time domain×12 subcarriers in the frequency domain) will be described with reference to FIG. 39.

FIG. 39(a) shows the case of the normal CP. CRSs S are located on OFDM symbol indexes 0, 1, 4, 7, 8 and 11 and subcarrier indexes 0, 3, 6 and 9. Existing LTE DRSs U are located on OFDM symbol indexes 3, 6, 9 and 12 and subcarrier indexes 0, 4 and 8 or subcarrier indexes 2, 6 and 10. DRSs D are located on OFDM symbol indexes 5, 6, 12 and 13 and subcarrier indexes 0, 1, 5, 6, 10 and 11.

FIG. 39(b) shows the case of the extended CP. CRSs S are located on OFDM symbol indexes 0, 1, 3, 6, 7 and 9 and subcarrier indexes 0, 3, 6 and 9. Existing LTE DRSs U are located on OFDM symbol indexes 4, 7 and 10 and subcarrier indexes 0, 3, 6 and 9 or subcarrier indexes 2, 5, 8 and 11. DRSs D are located on OFDM symbol indexes 4, 5, 10 and 11 and subcarrier indexes 1, 2, 4, 5, 6, 7, 8, 10 and 11.

CSI-RSs may be defined for eight transmission antennas, four transmission antennas and two transmission antennas. CSI-RS patterns for four transmission antennas and two transmission antennas may be defined as a set or a subset of CSI-RS patterns for eight transmission antennas. That is, a nested property may be satisfied.

In determination of the locations of the CSI-RSs in the time domain, OFDM symbols including CRSs, DRSs (including DRSs defined in LTE release 8, 9 and 10, that is, U and D of FIG. 39) and PDCCH may be excluded. Thus, only the OFDM symbol index 10 may be used for CSI-RS allocation in the case of the normal CP and only the OFDM symbol index 8 may be used for CSI-RS allocation in the case of the extended CP.

Hereinafter, the locations of the CSI-RSs allocated to one OFDM symbol (the OFDM symbol index 10) in the frequency domain in the case of the normal CP will be described with reference to FIG. 40. For clarity of description, although only the normal CP is described, the description of FIG. 40 is equally applicable to the locations of the CSI-RSs allocated to one OFDM symbol (the OFDM symbol index 8) in the frequency domain in the case of the extended CP.

First, a CSI-RS structure of an FDM scheme will be described. The FDM scheme is a scheme for distinguishing CSI-RSs for transmission antennas using frequency resources in the case of two transmission antennas, four transmission antennas or eight transmission antennas. The structure supporting eight antennas includes a structure in which eight REs are consecutively arranged (Pattern 1 of FIG. 40(a), a structure in which units of two consecutive REs are arranged at a predetermined interval (Pattern 2 of FIG. 40(a) and a structure in which units of four consecutive REs are arranged at a predetermined interval (Pattern 3 of FIG. 40(a)). If eight consecutive REs are arranged, a CSI-RS for one antenna port corresponds to each RE.

Next, a CSI-RS structure of a CDM-FDM scheme will be described. Eight REs are divided into pairs of two. That is, pairs of A-A, B-B, C-C and D-D are formed. An orthogonal code having a length of 2 may be allocated to one pair to distinguish between two antenna ports. At this time, in order to distinguish between pairs, frequency resources may be used. As the CSI-RS structure for the case in which two REs forming a pair are arranged at a certain interval, Patterns 1 to 3 of FIG. 40(b) may be considered. Alternatively, as the CSI-RS structure for the case in which two REs forming a pair may be located on consecutive subcarriers, Patterns 1 to 3 of FIG. 40(c) may be considered.

Indicators A, B, C and D of the CSI-RSs shown in FIG. 40 indicate antenna ports (antenna ports 0 to 7) or antenna groups and exemplary correspondence thereof is shown in Table 1.

The present invention is not limited to the correspondence shown in Table 1 and the order of A, B, C and D may be arbitrarily changed to correspond to antenna ports or antenna groups.

TABLE 1

|   | Method 1 8Tx | Method 2 8Tx | Method 3 4Tx | Method 4 4Tx | Method 5 2Tx | Method 6 2Tx |
|---|---|---|---|---|---|---|
| A | 0, 1 | 0, 4 | 0, 1 | 0 | 0, 1 | 0 |
| B | 2, 3 | 1, 5 | 2, 3 | 1 |  | 1 |
| C | 4, 5 | 2, 6 |  | 2 |  |  |
| D | 6, 7 | 3, 7 |  | 3 |  |  |

In determination of the locations of the CSI-RSs arranged in the time domain, OFDM symbols including CRSs, DRSs (including DRSs defined in LTE release 9 and 10, that is, D of FIG. 39) and PDCCH may be excluded. Thus, unlike the embodiment described with reference to FIG. 40, a pattern in which CSI-RSs are arranged on OFDM symbols, on which DRSs (U of FIG. 39) defined in the conventional LTE are located, may be considered. In the case of the normal CP, OFDM symbol indexes 3, 9 and 10 may be used for CSI-RS allocation.

Figure 41:
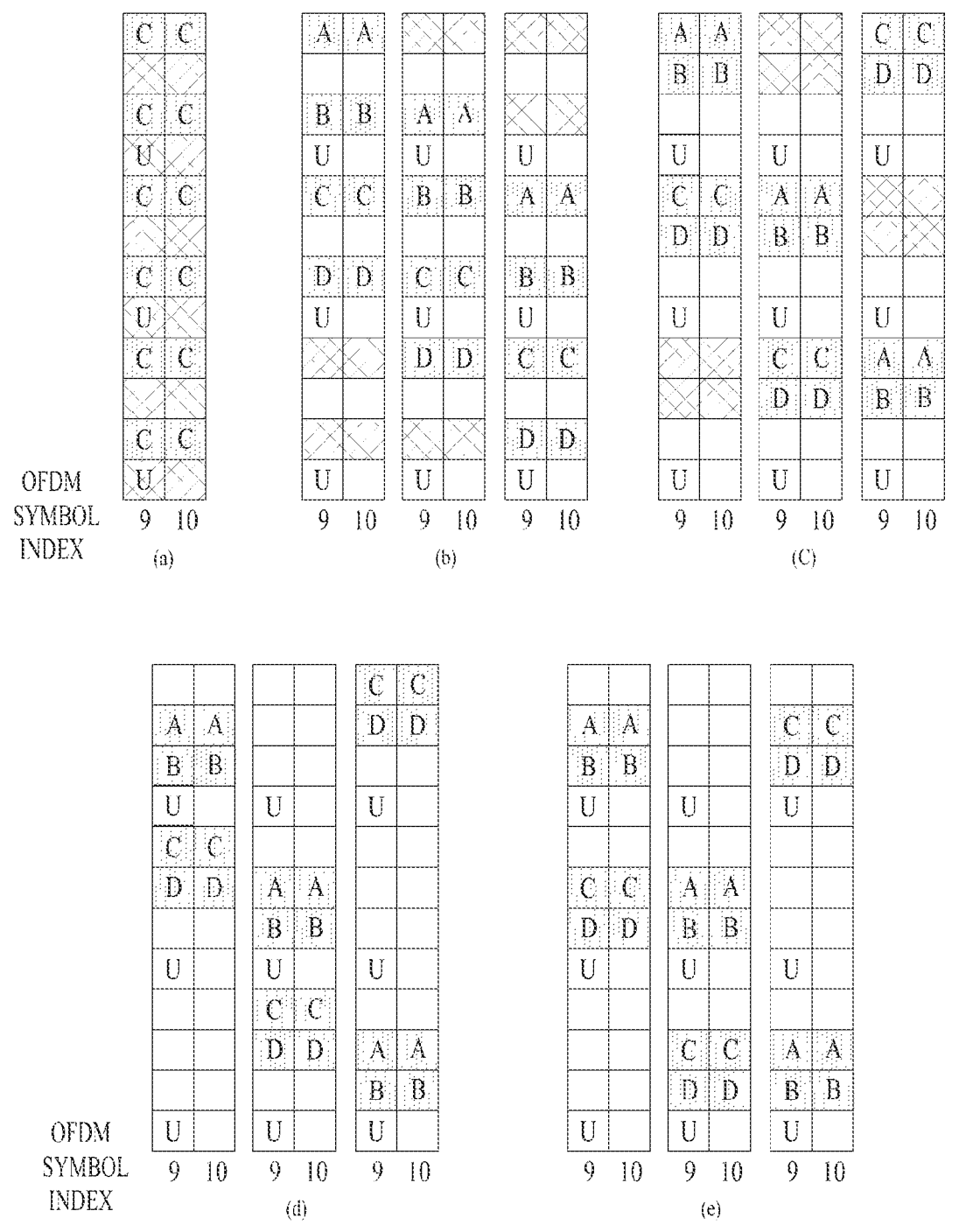

A CSI-RS pattern in the case of the normal CP will be described with reference to FIG. 41. CSI-RSs may be located on OFDM symbol indexes 9 and 10. The CSI-RSs may be located on six subcarriers in the frequency domain at an interval of two subcarriers. At this time, the CSI-RSs may not be arranged at subcarrier locations (subcarrier indexes 0, 4 and 8) in which DRSs U defined in the conventional LTE system are present. That is, CSI-RSs may be arranged on 12 REs in two OFDM symbols with the pattern shown in FIG. 41(a).

In FIG. 41(a), in order to distinguish between CSI-RSs for the channels of eight antenna ports, eight distinguished resources (time, frequency and/or code resources) must be used. Eight antenna ports may be multiplexed through two distinguished time resources, six distinguished frequency resources and an orthogonal code. For example, an orthogonal code may be allocated to contiguous time resources (contiguous OFDM symbols) to distinguish between two antenna ports and four orthogonal frequency resources may be allocated to distinguish between a total of eight antenna ports. At this time, any four frequency resources may be selected from among the six frequency resources shown in FIG. 41(a). The number of cases of selecting any four frequency resources from among the six frequency resources is 360 (6p4=360) and three patterns may be used for three cells. That is, frequency-shifted patterns may be set to be respectively used in three cells.

FIG. 41(b) shows an example of multiplexing CSI-RSs using four frequency resources, two time resources and two orthogonal code resources. In FIG. 41(b), two antenna ports may be distinguished through orthogonal code at the A-A location. In Patterns 1 to 3 of FIG. 41(b), frequency shifting is performed at an interval of 2 subcarriers. Each pattern may be selected and used according to various criteria. For example, one pattern may be selected according to the elapse of time.

FIGS. 41(c) to 41(e) show various modified examples of selecting four frequency resources from among six frequency resources. In the embodiments of FIGS. 41(c) to 41(e), three frequency-shifted patterns may be defined and each pattern may be selected according to various criteria.

In determination of the locations of the CSI-RSs, the CSI-RSs may be arranged on REs other than the locations of the DRSs in the OFDM symbol on which the DRSs (including DRSs defined in LTE release 8, 9 and 10, that is, U and D of FIG. 39) are located. Then, in the case of the normal CP, OFDM symbol indexes 3, 5, 6, 9, 10, 12 and 13 may be used. Although the CSI-RSs are described as being arranged on the OFDM symbol indexes 9 and 10 in the above-described embodiments, the case in which the CSI-RSs are arranged on the OFDM symbol indexes 5, 6, 12 and 13, on which the DRSs D are located, in the case of the normal CP will now be described.

Figure 42:
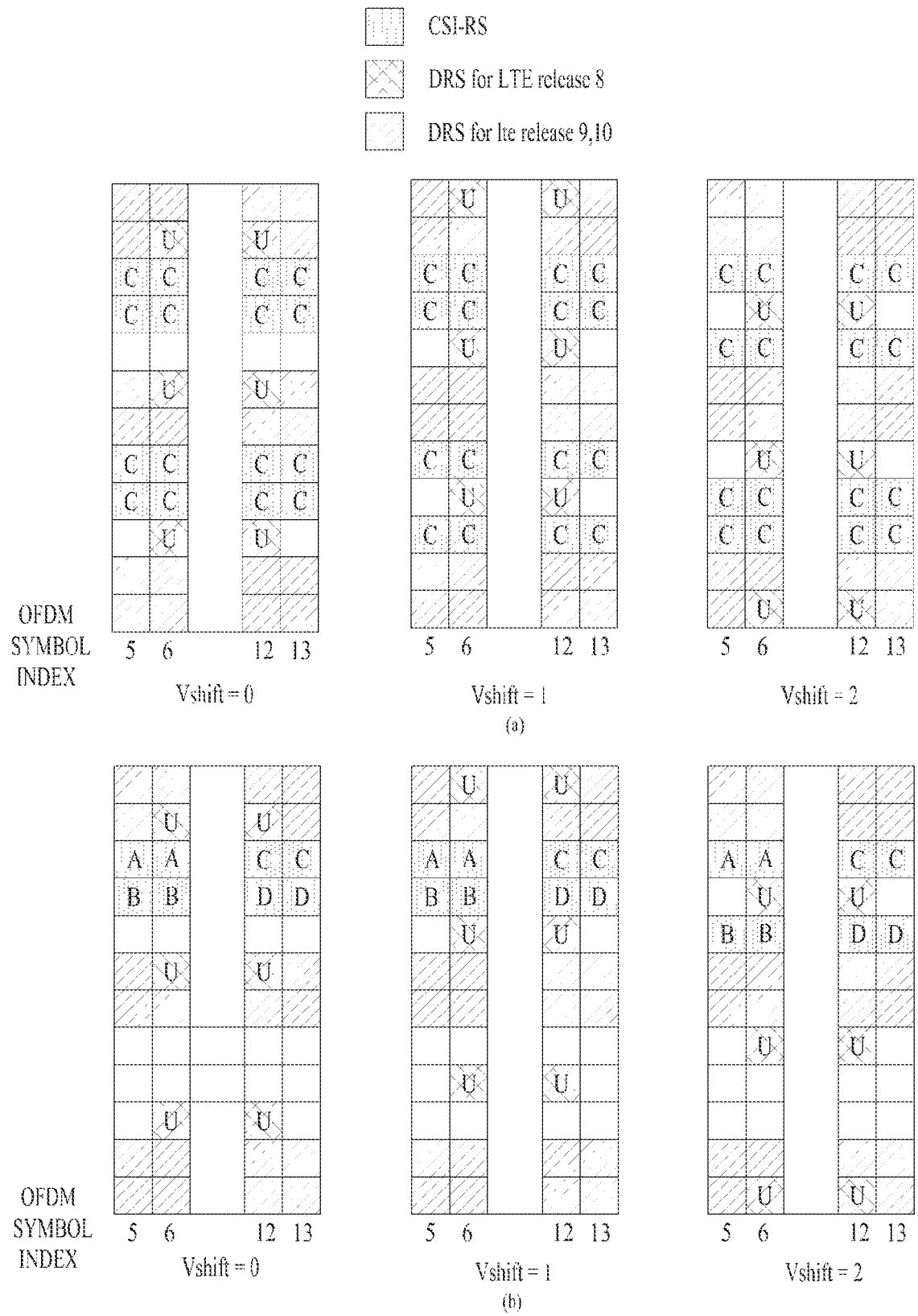
FIG. 42 is a diagram showing an embodiment of frequency shifting of a CSI-RS pattern.

FIG. 42(a) shows a CSI-RS pattern according to frequency shifting Vshift of the DRSs (U of FIG. 39) defined in the conventional LTE standard (LTE release 8). The DRSs U are frequency-shifted by 0, 1 or 2 subcarriers based on a cell ID. The locations of the DRSs (that is, D of FIG. 39) defined in LTE release 9 and 10 are fixed.

The CSI-RSs are located in the OFDM symbol on which the DRSs D are arranged and may be arranged on REs other than the frequency locations on which the DRSs (U and D) are arranged. In consideration of CDM, two contiguous OFDM symbols may be paired to configure a CSI-RS. At this time, two or four frequency locations may be selected in one OFDM symbol.

Figure 43:
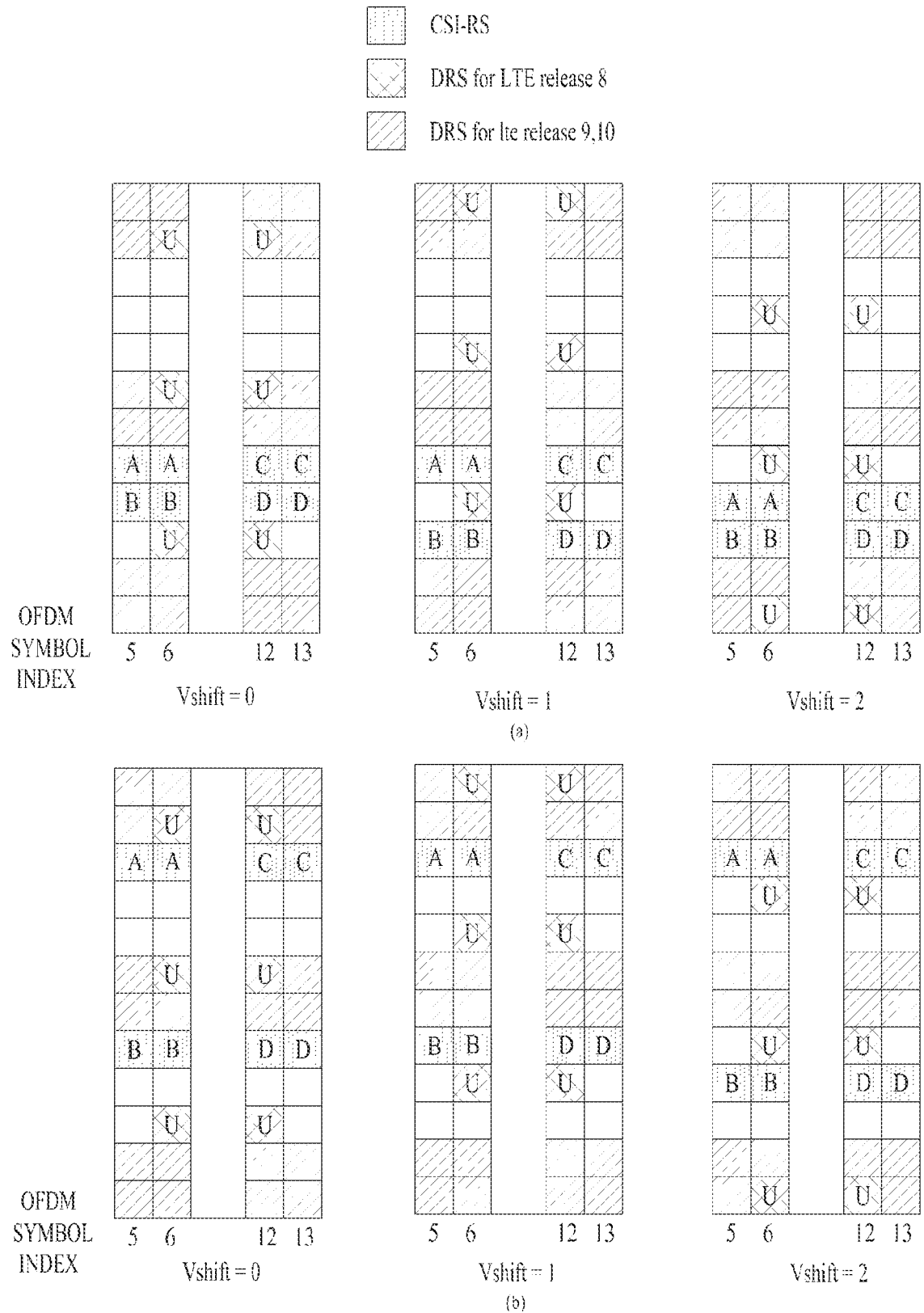

If two frequency locations are selected in one OFDM symbol, the CSI-RSs may be arranged at two frequency locations of each of the OFDM symbol indexes 5, 6, 12 and 13, an example of which is shown in FIG. 42(b). FIGS. 43(a) and 43(b) show modified examples in which the frequency locations are changed in the CSI-RS pattern.

If two frequency locations are selected in one OFDM symbol in order to arrange the CSI-RSs, a total of four OFDM symbols are used for the CSI-RS pattern. At this time, the antenna ports mapped to the REs set in the CSI-RS pattern may be changed in certain frequency units. For example, in an odd-numbered RB, antenna ports 0, 1, 2 and 3 may be mapped to two OFDM symbols (OFDM symbol indexes 5 and 6) from the front portion and antenna ports 4, 5, 6 and 7 may be mapped to two OFDM symbols (OFDM symbol indexes 12 and 13) from the rear portion. In an even-numbered RB, antenna ports 4, 5, 6 and 7 may be mapped to two OFDM symbols (OFDM symbol indexes 5 and 6) from the front portion and antenna ports 0, 1, 2 and 3 may be mapped to two OFDM symbols (OFDM symbol indexes 12 and 13) from the rear portion. The mapped antenna port indexes and the frequency unit for swapping the antenna ports are exemplary and other antenna port mapping relationships and swapping frequency units may be used.

Figure 44:
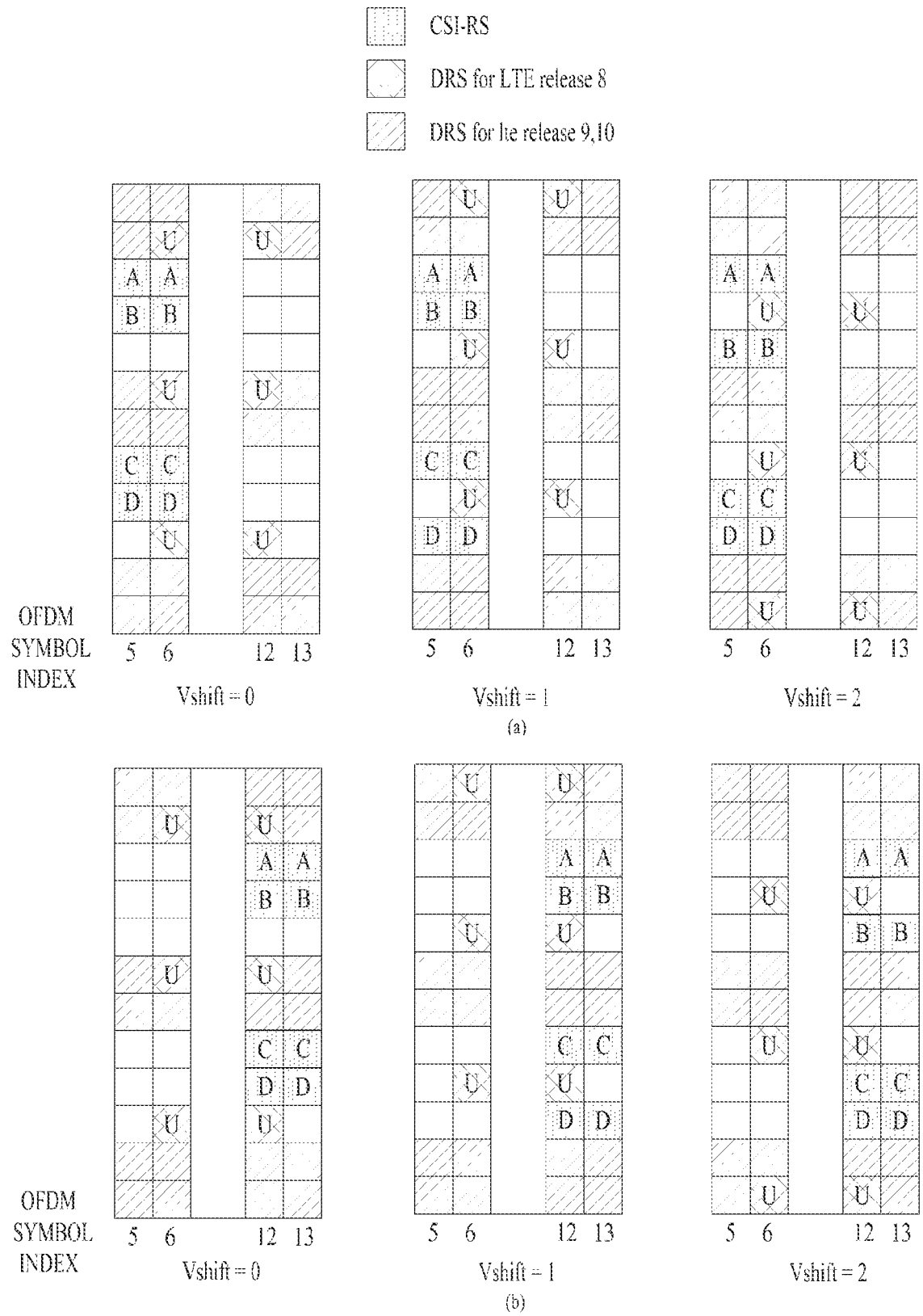

If four frequency locations are selected in one OFDM symbol, an embodiment in which the CSI-RSs are arranged on the OFDM symbols 5 and 6 is shown in FIG. 44(a). If four frequency locations are selected in one OFDM symbol, an embodiment in which the CSI-RSs are arranged on the OFDM symbols 12 and 13 is shown in FIG. 44(b).

In the above-described embodiments, AA, BB, CC and DD mean units to which the orthogonal code is applied. Walsh code, etc. may be used as the orthogonal code. The antenna ports or antenna port groups may be mapped to A to D of the drawing. A mapping relationship in the case of eight transmission antennas, four transmission antennas and two transmission antennas is shown in Table 1.

In the above-described embodiments, the CSI-RSs may be frequency-shifted using the same method as the CRSs. That is, the CSI-RSs may be frequency-shifted on a per cell basis.

Next, the locations of the CSI-RSs in the case of the extended CP will be described.

In determination of the locations of the CSI-RSs in the time domain, if OFDM symbols including CRSs, DRSs (including DRSs defined in the LTE release 9 and 10, that is, D of FIG. 39) and PDCCH may be excluded, only the OFDM symbol index 8 may be used for CSI-RS allocation in the case of the extended CP. In order to arrange the CSI-RSs on two consecutive OFDM symbols, the OFDM symbol indexes 7 and 8 may be used.

FIG. 45(a) shows a pattern in which the CSI-RSs are arranged in case of using the OFDM symbol indexes 7 and 8. The CSI-RSs may be arranged on REs on which CRSs or DRSs U are not located. The CSI-RSs may be frequency-shifted on a per cell basis, as in the CRSs and the DRSs U defined in LTE release 8. A to D of FIG. 45(a) may be mapped to antenna ports or antenna port groups and correspondence thereof is shown in Table 1.

Alternatively, in the case of the extended CP, the number of transmission antennas supported by the CRSs may be restricted to 2 and only the CRSs (R0 and R1 of FIG. 6) for two transmission antennas may be set to be allocated. In this case, the CSI-RSs may be allocated by reusing the REs to which the CRSs (R2 and R3 of FIG. 6) are allocated.

In determination of the locations of the CSI-RSs, the CSI-RSs may be arranged on the OFDM symbol on which the DRSs (including DRSs defined in LTE release 8, 9 and 10, that is, U and D of FIG. 39) are located. Thus, in the case of the extended CP, the OFDM symbol indexes 4, 5, 10 and 11 may be used.

Among the OFDM symbol indexes 4, 5, 10 and 11, two or four OFDM symbols may be used for CSI-RS allocation.

If two OFDM symbols are selected, the CSI-RSs may be arranged on four frequency locations in one OFDM symbol. FIG. 45(b) shows the case in which the OFDM symbol indexes 4 and 5 are selected FIG. 45(c) shows the case in which the OFDM symbol indexes 10 and 11 are selected. In FIGS. 45(b) and 45(c), four frequency locations in one OFDM symbol may be allocated for CSI-RSs and an interval thereof may be set to two subcarriers. The CSI-RS patterns of FIGS. 45(b) and 45(c) may be frequency-shifted by one subcarrier. The frequency-shifted CSI-RS pattern may be used on a per cell basis. Since transmission of DRSs D is required in FIGS. 45(b) and 45(c), the number of frequency-shifted patterns may be restricted to 2 such that the DRSs are transmitted at least four frequency locations in one OFDM symbol.

If four OFDM symbols are selected, the CSI-RSs may be arranged on two frequency locations in one OFDM symbol. FIG. 45(d) shows an example of a CSI-RS pattern in which the four CSI-RSs are arranged on the OFDM symbol indexes 4, 5, 10 and 11 and FIG. 45(e) corresponds to an embodiment obtained by frequency-shifting the pattern of FIG. 45(d).

In FIG. 45, the antenna ports or the antenna port groups may be mapped to A to D of the drawing. A mapping relationship in the case of eight transmission antennas, four transmission antennas and two transmission antennas is shown in Table 1.

Embodiment 5

Embodiment 5 relates to a detailed example of a CSI-RS pattern to which the above-described Embodiments 1 to 4 are applicable.

FIG. 46(a) shows an example in which the CSI-RSs are arranged on a total of eight REs in two OFDM symbols. Eight REs for the CSI-RSs may be arranged on two OFDM symbols, that is, four REs may be arranged on one OFDM symbol. In the four REs in one OFDM symbol, two REs may be consecutively arranged and the remaining two REs may be arranged to be separated therefrom by four subcarriers.

If the CSI-RSs are transmitted with a duty cycle of 1, all the CSI-RSs for eight transmission antennas may be allocated within one subframe. If the CSI-RSs for the antenna port indexes 0 to 7 are transmitted, for example, the antenna port indexes 0 and 1 may be allocated to the CSI-RS 1 of FIG. 46(a) using the CDM-T scheme, the antenna port indexes 2 and 3 may be allocated to the CSI-RS 2 using the CDM-T scheme, the antenna port indexes 4 and 5 may be allocated to the CSI-RS 3 using the CDM-T scheme, and the antenna port indexes 6 and 7 may be allocated to the CSI-RS 4 using the CDM-T scheme.

As shown in FIGS. 46(b) and 46(c), the CSI-RS pattern of FIG. 46(a) may be frequency-shifted. This may indicate that the start point of the frequency location of the CSI-RS pattern shown in FIG. 46(a) may be moved according to an offset. For example, such an offset value may have a value of 1 to 8 subcarriers and may be determined on a per cell or cell group basis. FIG. 46(b) shows an embodiment obtained by frequency shifting the pattern of FIG. 46(a) by two subcarriers and FIG. 46(c) shows an embodiment obtained by frequency shifting the pattern of FIG. 46(b) by two subcarriers.

The CSI-RS pattern may have a cell-specific frequency shift value. For example, the cell-specific frequency shifting value may be two subcarriers. That is, in three cells, the CSI-RSs may be arranged so as not to overlap the frequency locations of the CSI-RSs on the same OFDM symbol. For example, a first cell may use the CSI-RS pattern of FIG. 46(a), a second cell may use the CSI-RS pattern of FIG. 46(b) and a third cell may use the CSI-RS pattern of FIG. 46(c).

The OFDM symbols to which the CSI-RS pattern shown in FIG. 46(a) is allocated may correspond to various time locations described in the above embodiments. For example, the OFDM symbols to which the CSI-RS pattern of FIG. 46(a) may be allocated to the OFDM symbol indexes 9 and 10 in the case of the normal CP (FIG. 47(a)) or the OFDM symbol indexes 8 and 10 in the case of the normal CP (FIG. 47(b)). As described above, CSI-RS patterns obtained by frequency-shifting the CSI-RS pattern of FIG. 47 by an interval of two subcarriers may be used by other cells and the CSI-RS patterns may be used so as not to overlap in the three cells.

Next, FIG. 48(a) shows another example in which the CSI-RS are arranged on a total of eight REs in two OFDM symbols. Eight REs for the CSI-RSs may be arranged on two OFDM symbols, that is, four REs may be arranged on one OFDM symbol. The four REs in one OFDM symbol are arranged to be separated from each other by 2 subcarriers.

If the CSI-RSs are transmitted with a duty cycle of 1, all the CSI-RSs for eight transmission antennas may be allocated within one subframe. If the CSI-RSs for the antenna port indexes 0 to 7 are transmitted, for example, the antenna port indexes 0 and 1 may be allocated to the CSI-RS 1 of FIG. 46(a) using the CDM-T scheme, the antenna port indexes 2 and 3 may be allocated to the CSI-RS 2 using the CDM-T scheme, the antenna port indexes 4 and 5 may be allocated to the CSI-RS 3 using the CDM-T scheme, and the antenna port indexes 6 and 7 may be allocated to the CSI-RS 4 using the CDM-T scheme.

As shown in FIGS. 48(b) and 48(c), the CSI-RS pattern of FIG. 48(a) may be frequency-shifted. This may indicate that the start point of the frequency location of the CSI-RS pattern shown in FIG. 48(a) may be moved according to an offset. For example, such an offset value may have a value of 1 to 8 subcarriers and may be determined on a per cell or cell group basis. FIG. 48(b) shows an embodiment obtained by frequency shifting the pattern of FIG. 48(a) by one subcarrier and FIG. 48(c) shows an embodiment obtained by frequency shifting the pattern of FIG. 48(b) by one subcarrier.

The CSI-RS pattern may have a cell-specific frequency shift value. For example, the cell-specific frequency shifting value may be one subcarrier. That is, in three cells, the CSI-RSs may be arranged so as not to overlap the frequency locations of the CSI-RSs on the same OFDM symbol. For example, a first cell may use the CSI-RS pattern of FIG. 48(a), a second cell may use the CSI-RS pattern of FIG. 48(b) and a third cell may use the CSI-RS pattern of FIG. 48(c).

Figure 48:
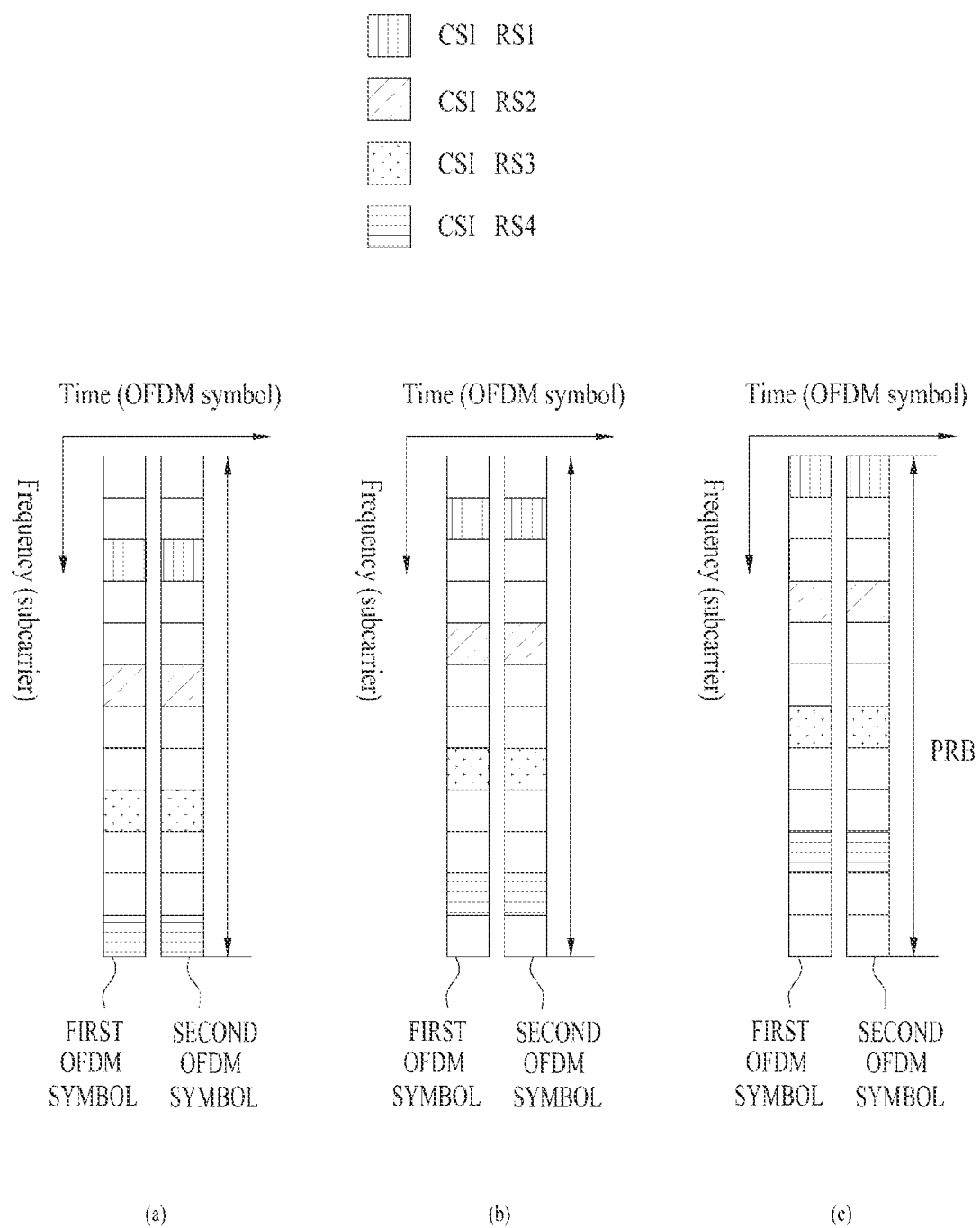
FIG. 48 is a diagram showing an embodiment of the location of a CSI-RS pattern allocated to two OFDM symbols in a frequency domain.
Figure 49:
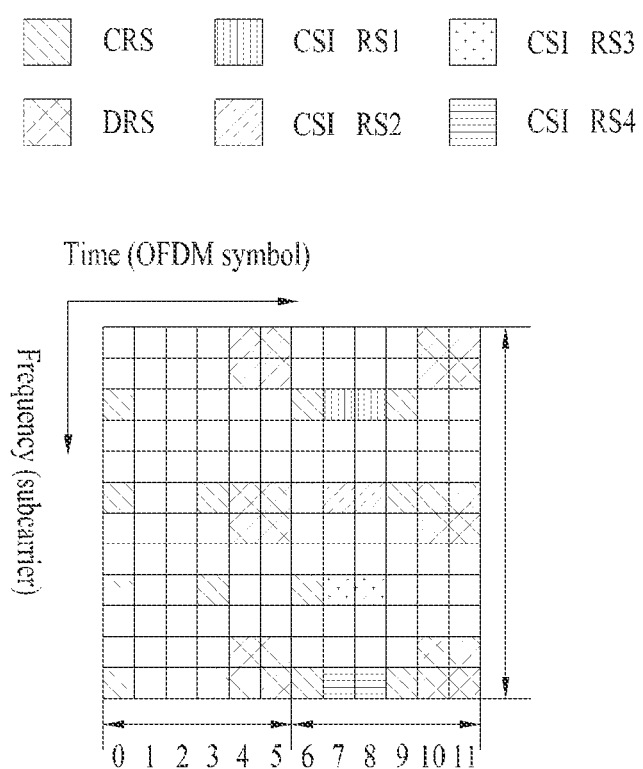
FIG. 49 is a diagram showing the locations of two OFDM symbols to which CSI-RSs are allocated in a time domain.

The OFDM symbols to which the CSI-RS pattern shown in FIG. 48(a) is allocated may correspond to various time locations described in the above embodiments. For example, the OFDM symbols to which the CSI-RS pattern of FIG. 46(a) may be allocated to the OFDM symbol indexes 7 and 8 in the case of the extended CP (FIG. 49). As described above, CSI-RS patterns obtained by frequency-shifting the CSI-RS pattern of FIG. 48 may be used by other cells and the CSI-RS patterns may be used so as not to overlap in the three cells.

Figure 50:
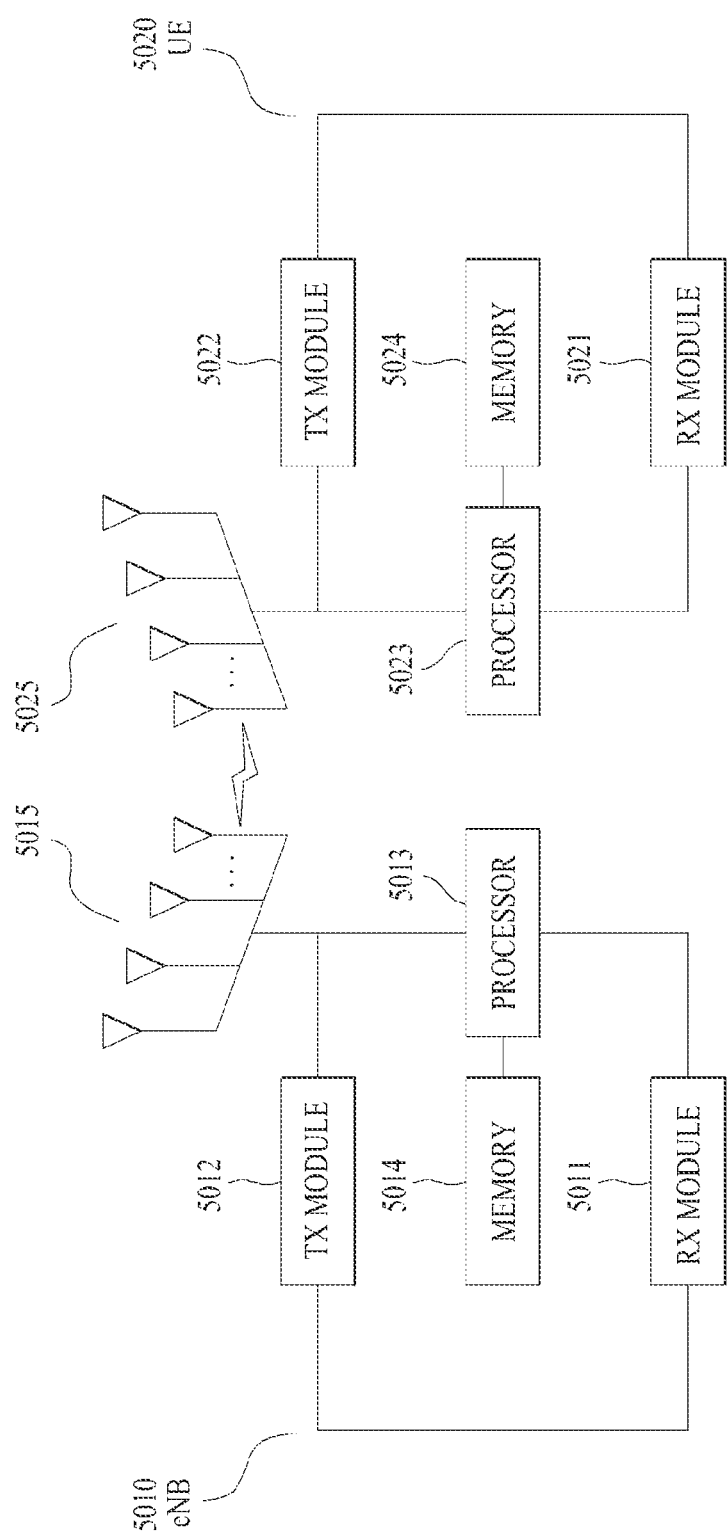
FIG. 50 is a diagram showing the configuration of an exemplary embodiment of a wireless communication system including a base station and a UE according to the present invention.

FIG. 50 is a diagram showing the configuration of a wireless communication system including a UE and a base station according to an exemplary embodiment of the present invention.

The base station (eNB) 5010 may include a reception (Rx) module 5011, a transmission (Tx) module 5012, a processor 5013, a memory 5014 and an antenna 5015. The Rx module 5011 may receive a variety of signals, data, information, etc. from a UE. The Tx module 5012 may transmit a variety of signals, data, information, etc. to a UE. The processor 5013 may be configured to perform overall control of the base station 5010 including the Rx module 5011, the Tx module 5012, the memory 5014 and the antenna 5015. The antenna 5015 may include a plurality of antennas.

The processor 5013 may map CSI-RSs for 8 or fewer antenna ports on a data region of a downlink subframe having the normal CP configuration according to a predetermined pattern and control the downlink subframe to which the CSI-RSs for the 8 or fewer antenna ports are mapped.

The processor 5013 serves to process information received by the UE and information to be transmitted to an external device. The memory 5014 may store the processed information for a predetermined time and may be replaced with a component such as a buffer (not shown).

The UE 5020 may include an Rx module 5021, a Tx module 5022, a processor 5023 and a memory 5024. The Rx module 5021 may receive a variety of signals, data, information, etc. from a base station. The Tx module 5022 may transmit a variety of signals, data, information, etc. to a base station. The processor 5023 may be configured to perform overall control of the base station 5020 including the Rx module 5021, the Tx module 5022, the memory 5024 and the antenna 5025. The antenna 5025 may include a plurality of antennas.

The processor 5023 may receive CSI-RSs for 8 or fewer antenna ports mapped according to a predetermined pattern on a data region of a downlink subframe having the normal CP configuration and control estimation of the channel using the CSI-RSs.

The processor 5033 serves to process information received by the UE and information to be transmitted to an external device. The memory 5034 may store the processed information for a predetermined time and may be replaced with a component such as a buffer (not shown).

Matters which are commonly applied to channel estimation in which the base station 5010 transmits the CSI-RSs and the UE 5020 receives the CSI-RSs will be described.

The predetermined pattern according to which the CSI-RSs are mapped may be determined in advance and may be shared by the base station 5010 and the UE 5020. The predetermined pattern may be defined such that the CSI-RSs mapped for 8 or fewer antenna ports are mapped to two OFDM symbols in the data region of the downlink subframe and are mapped to one or more of four subcarrier locations in one of the two OFDM symbols. The four subcarrier locations defined in the predetermined pattern may include two consecutive subcarrier locations and two other consecutive subcarrier locations separated therefrom by four subcarriers (see FIG. 47).

When the processor maps the CSI-RSs according to the predetermined pattern, the two OFDM symbols may be OFDM symbol indexes 5 and 6, OFDM symbol indexes 9 and 10, OFDM symbol indexes 12 and 13 or OFDM symbol indexes 8 and 10. If the two OFDM symbol are OFDM symbol indexes 5 and 6 or OFDM symbol indexes 12 and 13, the four subcarrier locations are subcarrier indexes 2, 3, 8 and 9 and, if the two OFDM symbols are OFDM symbol indexes 9 and 10 or OFDM symbol indexes 8 and 10, the four subcarrier locations may be subcarrier indexes 0, 1, 6 and 7, subcarrier indexes 2, 3, 8 and 9 or subcarrier indexes 4, 5, 10 and 11 (see FIGS. 44 and 47).

Figure 46:
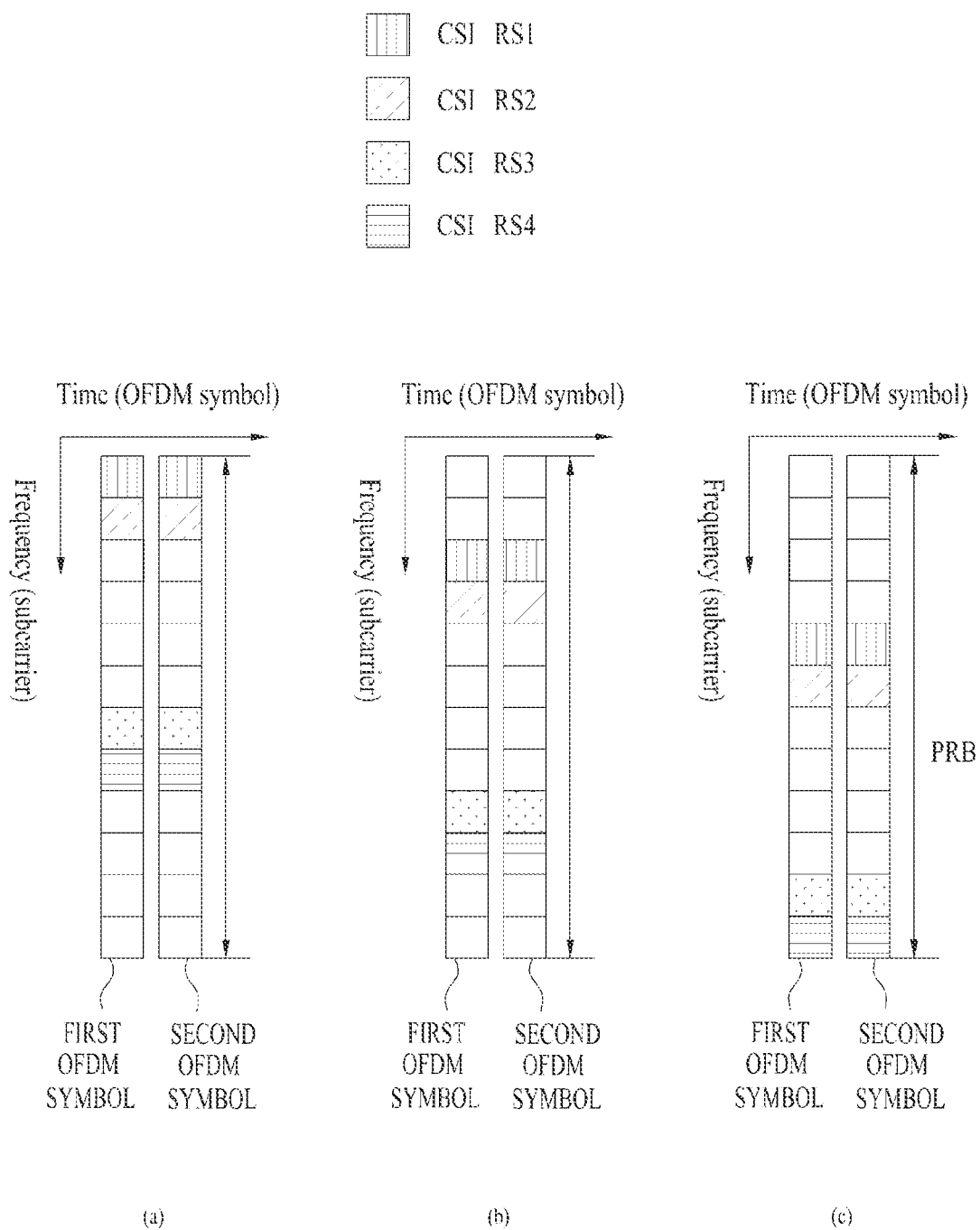

When the processor maps the CSI-RSs according to the predetermined pattern, the four subcarrier locations may be shifted by two subcarriers on a per cell or cell group basis (see FIG. 46). In addition, when the processor maps the CSI-RSs according to the predetermined pattern, the CSI-RSs may be subjected to CDM using orthogonal code over the two OFDM symbols (see FIG. 46). When the processor maps the CSI-RSs according to the predetermined pattern, if the number of antenna ports of the base station is 2 or 4, the CSI-RSs may be mapped to some of the locations defined in the predetermined pattern (the above-described nested property).

The embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in a variety of formats, for example, modules, procedures, functions, etc. The software code may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

INDUSTRIAL APPLICABILITY

The above-described embodiments of the present invention are applicable to various mobile communication systems.

The invention claimed is:

1. A method for transmitting channel state information-reference signals (CSI-RSs) for 8 or fewer antenna ports at a base station, the method comprising:
transmitting the CSI-RSs for the 8 or fewer antenna ports, wherein the CSI-RSs are mapped according to a predetermined pattern to a data region of a downlink subframe having an extended cyclic prefix (CP) configuration,
wherein the predetermined pattern is defined such that the CSI-RSs for the 8 or fewer antenna ports are mapped to two consecutive orthogonal frequency division multiplexing (OFDM) symbols in the data region of the downlink subframe and are mapped to one or more of four subcarrier locations in each of the two consecutive OFDM symbols, in one resource block pair,
wherein the two consecutive OFDM symbols are OFDM symbols to which User Equipment (UE)-specific reference signals are allowed to be mapped, and
wherein the four subcarrier locations are defined in the predetermined pattern and include "n"-th subcarrier index, "n+3"-th subcarrier index, "n+6"-th subcarrier index, and "n+9"-th subcarrier index.

2. The method according to claim 1, wherein the two consecutive OFDM symbols are defined in the predetermined pattern and are OFDM symbol indexes 4 and 5 or OFDM symbol indexes 10 and 11.

3. The method according to claim 1, wherein the four subcarrier locations defined in the predetermined pattern are shifted by one or two subcarriers on a per cell or per cell group basis.

4. The method according to claim 1, wherein:
the CSI-RSs are subjected to code division multiplexing (CDM) using orthogonal codes; and
CSI-RSs for two antenna ports of the 8 or fewer antenna ports are mapped to same OFDM symbols and same subcarriers, and are multiplexed by the CDM over the two consecutive OFDM symbols.

5. The method according to claim 2, wherein the four subcarrier locations are subcarrier indexes 0, 3, 6, and 9 or subcarrier indexes 2, 5, 8, and 11 when the two OFDM symbols are the OFDM symbol indexes 4 and 5, and
wherein the four subcarrier locations are subcarrier indexes 1, 4, 7, and 10 or subcarrier indexes 2, 5, 8, and 11 when the two OFDM symbols are the OFDM symbol indexes 10 and 11.

6. The method according to claim 1, wherein:
the CSI-RSs for the 8 or fewer antenna ports are grouped into a total of four groups such that CSI-RSs for two antenna ports configure one group;
the CSI-RSs for two antennas of each of the four groups are multiplexed at a same subcarrier location of the two consecutive OFDM symbols using a code division multiplexing (CDM) scheme; and the four groups are multiplexed at different subcarrier locations using a frequency division multiplexing (FDM) scheme.

7. A method of estimating a channel at a user equipment (UE) using channel state information-reference signals (CSI-RSs) for 8 or fewer antenna ports received from a base station, the method comprising:

receiving the CSI-RSs for the 8 or fewer antenna ports in a downlink subframe having an extended cyclic prefix (CP) configuration in which the CSI-RSs for the 8 or fewer antenna ports are mapped to a data region according to a predetermined pattern; and estimating the channel using the CSI-RSs, wherein the predetermined pattern is defined such that the CSI-RSs for the 8 or fewer antenna ports are mapped to two consecutive orthogonal frequency division multiplexing (OFDM) symbols in the data region and are mapped to one or more of four subcarrier locations in each of the two consecutive OFDM symbols, in one resource block pair, wherein the two consecutive OFDM symbols are OFDM symbols to which UE-specific reference signals are allowed to be mapped, and wherein the four subcarrier locations are defined in the predetermined pattern and include "n"-th subcarrier index, "n+3"-th subcarrier index, "n+6"-th subcarrier index, and "n+9"-th subcarrier index.

8. A base station (BS) for transmitting channel state information-reference signals (CSI-RSs) for 8 or fewer antenna ports, the BS comprising:

a reception module configured to receive an uplink signal from a user equipment (UE);

a transmission module configured to transmit a downlink signal to the UE; and a processor configured to control the reception module and the transmission module, wherein the processor is further configured to control the transmission module to transmit the CSI-RSs for the 8 or fewer antenna ports to a data region of a downlink subframe having an extended cyclic prefix (CP) configuration, the CSI-RSs for the 8 or fewer antenna ports mapped according to a predetermined pattern, wherein the predetermined pattern is defined such that the CSI-RSs for the 8 or fewer antenna ports are mapped to two consecutive orthogonal frequency division multiplexing (OFDM) symbols in the data region of the downlink subframe and are mapped to one or more of four subcarrier locations in each of the two consecutive OFDM symbols, in one resource block pair, wherein the two consecutive OFDM symbols are OFDM symbols to which UE-specific reference signals are allowed to be mapped, and wherein the four subcarrier locations defined in the predetermined pattern include "n"-th subcarrier index, "n+3"-th subcarrier index, "n+6"-th subcarrier index, and "n+9"-th subcarrier index.

9. A user equipment (UE) for estimating a channel using channel state information-reference signals (CSI-RSs) for 8 or fewer antenna ports received from a base station (BS), the UE comprising:

a reception module configured to receive a downlink signal from the BS;

a transmission module configured to transmit an uplink signal to the BS; and a processor configured to control the reception module and the transmission module, wherein the processor is further configured to receive the CSI-RSs for the 8 or fewer antenna ports in a downlink subframe having an extended cyclic prefix (CP) configuration in which the CSI-RSs for the 8 or fewer antenna ports are mapped to a data region according to a predetermined pattern, to estimate the channel using the CSI-RSs, wherein the predetermined pattern is defined such that the CSI-RSs for the 8 or fewer antenna ports are mapped to two consecutive orthogonal frequency division multiplexing (OFDM) symbols in the data region of the downlink subframe and are mapped to one or more among four subcarrier locations in each of the two consecutive OFDM symbols, in one resource block pair, wherein the two consecutive OFDM symbols are OFDM symbols to which UE-specific reference signals are allowed to be mapped, and wherein the four subcarrier locations defined in the predetermined pattern include "n"-th subcarrier index, "n+3"-th subcarrier index, "n+6"-th subcarrier index, and "n+9"-th subcarrier index.

10. The method according to claim 1, wherein the CSI-RSs for the 8 antenna ports are mapped to 8 resource elements in the one resource block pair.

11. The method according to claim 1, wherein the one resource block pair is defined as 12 OFDM symbols and 12 subcarriers.

* * * * *